US010912056B2

(12) United States Patent
Eisner

(10) Patent No.: US 10,912,056 B2
(45) Date of Patent: *Feb. 2, 2021

(54) METHOD AND SYSTEM FOR LOCATING A NETWORK DEVICE IN AN EMERGENCY SITUATION INCLUDING PUBLIC LOCATION INFORMATION

(71) Applicant: Gerald R. Eisner, Pickerington, OH (US)

(72) Inventor: Gerald R. Eisner, Pickerington, OH (US)

(73) Assignee: RedSky Technologies, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/792,630

(22) Filed: Feb. 17, 2020

(65) Prior Publication Data

US 2020/0187150 A1 Jun. 11, 2020

Related U.S. Application Data

(63) Continuation-in-part of application No. 15/914,078, filed on Mar. 7, 2018, now Pat. No. 10,588,004, (Continued)

(51) Int. Cl.
*H04M 11/04* (2006.01)
*H04W 24/00* (2009.01)
(Continued)

(52) U.S. Cl.
CPC ......... *H04W 64/003* (2013.01); *H04W 4/029* (2018.02); *H04W 4/90* (2018.02)

(58) Field of Classification Search
None
See application file for complete search history.

(56) References Cited

U.S. PATENT DOCUMENTS 6,019,184 A 2/2000 Nagai
6,363,138 B1 3/2002 Aprile
(Continued)

OTHER PUBLICATIONS

US FFC document, "Consumer Guide: What you need to know about text-to-911," http://transition.fcc.gov/cgb/consumerfacts/text-to-911-consumer-guide.pdf.
(Continued)

*Primary Examiner* — Erika A Washington
(74) *Attorney, Agent, or Firm* — Lesavich High-Tech Law Group, S.C.; Stephen Lesavich

(57) ABSTRACT

A method and system for locating a network device in an emergency situation including public information. Current physical location information is obtained for a network device every time it registers on a network or moves to a new physical location. The current physical location is sent and received in an encrypted format to and from the network device. When the network device initiates an emergency message (e.g. 911, E911, NG911, text-to-911, 112, etc.) based on an emergency event (e.g., weather, crime, fire, natural disaster, medical, terrorist, military, etc.), the emergency message includes the encrypted current physical location information for the network device. The current physical location information is decrypted. Additional information is collected from one or more public location information sources for the current physical location of the network device. The emergency message with the additional information is routed in real-time to an appropriate Public Safety Answering Point (PSAP). The appropriate PSAP is immediately notified in real-time so emergency responders (e.g., police, fire, medical, etc.) can be dispatched to the current physical location of the network device.

26 Claims, 14 Drawing Sheets

Related U.S. Application Data which is a continuation-in-part of application No. 15/491,608, filed on Apr. 19, 2017, now Pat. No. 10,511,950, which is a continuation-in-part of application No. 14/806,068, filed on Jul. 22, 2015, now abandoned, which is a continuation-in-part of application No. 14/579,760, filed on Dec. 22, 2014, now Pat. No. 9,094,816, which is a continuation-in-part of application No. 14/303,842, filed on Jun. 13, 2014, now Pat. No. 8,918,075, which is a continuation-in-part of application No. 13/831,426, filed on Mar. 14, 2013, now Pat. No. 8,755,767, which is a continuation-in-part of application No. 13/098,981, filed on May 2, 2011, now Pat. No. 8,442,482, which is a continuation-in-part of application No. 11/803,671, filed on May 15, 2007, now Pat. No. 7,937,067, said application No. 13/831,426 is a continuation-in-part of application No. 12/844,972, filed on Jul. 28, 2010, now Pat. No. 8,442,481.

(60) Provisional application No. 60/800,774, filed on May 16, 2006, provisional application No. 60/800,775, filed on May 16, 2006, provisional application No. 60/800,776, filed on May 16, 2006, provisional application No. 60/800,777, filed on May 16, 2006, provisional application No. 61/229,414, filed on Jul. 29, 2009, provisional application No. 61/230,154, filed on Jul. 31, 2009.

(51) Int. Cl.
*H04W 64/00* (2009.01)
*H04W 4/90* (2018.01)
*H04W 4/029* (2018.01)

(56) References Cited

U.S. PATENT DOCUMENTS

| | | |
|---|---|---|
| 6,411,700 B1 | 6/2002 | Rojas |
| 6,424,840 B1 | 7/2002 | Fitch et al. |
| 6,445,786 B2 | 9/2002 | Rojas |
| 6,473,504 B2 | 10/2002 | Rojas |
| 6,504,924 B2 | 1/2003 | Rojas |
| 6,625,272 B2 | 9/2003 | Rojas |
| 6,665,611 B1 | 12/2003 | Oran et al. |
| 6,687,495 B2 | 2/2004 | Bhatia et al. |
| 6,744,859 B1 | 6/2004 | Koepke |
| 6,771,742 B2 | 8/2004 | McCalmont |
| 6,927,727 B2 | 8/2005 | Cleghorn |
| 6,940,950 B2 | 9/2005 | Dickinson et al. |
| 6,952,182 B2 | 10/2005 | Spilker, Jr. et al. |
| 6,963,557 B2 | 11/2005 | Knox |
| 6,983,313 B1 | 1/2006 | Korkea-Aho |
| 6,993,118 B2 | 1/2006 | Antonucci |
| 7,042,396 B2 | 5/2006 | Omura et al. |
| 7,054,611 B2 | 5/2006 | Eisner |
| 7,098,787 B2 | 8/2006 | Miller |
| 7,110,746 B2 | 9/2006 | Herzog et al. |
| 7,113,794 B2 | 9/2006 | Annamalai |
| 7,123,693 B2 | 10/2006 | Nelson |
| 7,126,536 B2 | 10/2006 | Rabinowitz et al. |
| 7,130,385 B1 | 10/2006 | Moon |
| 7,177,397 B2 | 2/2007 | McCalmont |
| 7,177,398 B2 | 2/2007 | Meer |
| 7,177,399 B2 | 2/2007 | Dawson et al. |
| 7,177,400 B2 | 2/2007 | Eisner |
| 7,200,207 B2 | 4/2007 | Meer |
| 7,218,938 B1 | 5/2007 | Lau et al. |
| 7,251,312 B2 | 7/2007 | D'Evelyn et al. |
| 7,260,186 B2 | 8/2007 | Zhu et al. |
| 7,272,386 B2 | 9/2007 | Meer |
| 7,330,464 B2 | 2/2008 | Brouwer et al. |
| 7,372,405 B2 | 5/2008 | Rabinowitz et al. |
| 7,397,424 B2 | 7/2008 | Houri |
| 7,411,940 B2 | 8/2008 | Gass |
| 7,471,244 B2 | 12/2008 | Omura et al. |
| 7,529,352 B2 | 5/2009 | Hwang |
| 7,639,792 B2 | 12/2009 | Qui et al. |
| 7,796,998 B1 | 9/2010 | Zellner et al. |
| 7,937,067 B2 | 5/2011 | Maier et al. |
| 8,009,808 B2 | 8/2011 | Montoya |
| 8,442,481 B2 | 5/2013 | Maier et al. |
| 8,442,482 B2 | 5/2013 | Maier et al. |
| 8,463,765 B2 | 6/2013 | Lesavich |
| 8,537,974 B2 | 9/2013 | Montoya |
| 8,755,767 B2 | 6/2014 | Maier et al. |
| 8,918,075 B2 | 12/2014 | Maier et al. |
| 9,037,564 B2 | 5/2015 | Lesavich et al. |
| 9,094,816 B2 | 7/2015 | Maier et al. |
| 9,137,250 B2 | 9/2015 | Lesavich et al. |
| 9,361,479 B2 | 6/2016 | Lesavich et al. |
| 9,569,771 B2 | 2/2017 | Lesavich et al. |
| 9,635,934 B1 | 4/2017 | Maier et al. |
| 10,511,590 B1 | 12/2019 | Maier et al. |
| 10,511,950 B2 * | 12/2019 | Maier ............... H04W 4/90 |
| 10,588,004 B2 * | 3/2020 | Eisner ............... H04W 4/90 |
| 2002/0012423 A1 | 1/2002 | Rojas |
| 2002/0012427 A1 | 1/2002 | Rojas |
| 2002/0054669 A1 | 5/2002 | Rojas |
| 2002/0080945 A1 | 6/2002 | Rojas |
| 2002/0144294 A1 | 10/2002 | Rabinowitz et al. |
| 2003/0156063 A1 | 8/2003 | Spilker et al. |
| 2005/0090225 A1 | 4/2005 | Muehleisen et al. |
| 2005/0105496 A1 | 5/2005 | Ambrosino |
| 2005/0169248 A1 | 8/2005 | Truesdale et al. |
| 2006/0179463 A1 | 8/2006 | Chisholm et al. |
| 2007/0013516 A1 | 1/2007 | Freitag et al. |
| 2008/0076392 A1 | 3/2008 | Khetawat et al. |
| 2008/0076393 A1 | 3/2008 | Khetawat et al. |
| 2008/0076411 A1 | 3/2008 | Khetawat et al. |
| 2008/0076412 A1 | 3/2008 | Khetawat et al. |
| 2008/0076419 A1 | 3/2008 | Khetawat et al. |
| 2008/0076420 A1 | 3/2008 | Khetawat et al. |
| 2008/0076425 A1 | 3/2008 | Khetawat et al. |
| 2008/0089316 A1 | 4/2008 | Reams |
| 2008/0176582 A1 | 7/2008 | Ghai et al. |
| 2008/0186955 A1 | 8/2008 | Puckett |
| 2008/0200143 A1 | 8/2008 | Qiu et al. |
| 2008/0253535 A1 | 10/2008 | Sherry et al. |
| 2008/0259908 A1 | 10/2008 | Hines et al. |
| 2008/0261596 A1 | 10/2008 | Khetawat et al. |
| 2008/0261619 A1 | 10/2008 | Hines et al. |
| 2008/0267172 A1 | 10/2008 | Hines et al. |
| 2008/0305792 A1 | 12/2008 | Khetawat et al. |
| 2009/0003312 A1 | 1/2009 | Velazquez et al. |
| 2009/0094235 A1 | 4/2009 | White et al. |
| 2010/0297981 A1 | 11/2010 | Ballantyne et al. |
| 2010/0311385 A1 | 12/2010 | Hurwitz |
| 2010/0317317 A1 | 12/2010 | Maier et al. |
| 2011/0009086 A1 | 1/2011 | Poremba |
| 2011/0207429 A1 | 8/2011 | Maier et al. |
| 2011/0208710 A1 | 8/2011 | Lesavich |
| 2012/0225635 A1 | 9/2012 | Esbensen |
| 2012/0278622 A1 | 11/2012 | Lesavich et al. |
| 2013/0203376 A1 | 8/2013 | Maier et al. |
| 2014/0167969 A1 | 6/2014 | Wedig |
| 2014/0189752 A1 | 7/2014 | Leavich et al. |
| 2014/0295786 A1 | 10/2014 | Maier et al. |
| 2015/0334545 A1 | 11/2015 | Maier et al. |
| 2015/0379301 A1 | 12/2015 | Lesavich et al. |
| 2016/0321654 A1 | 11/2016 | Lesavich et al. |
| 2017/0238139 A1 | 8/2017 | Maier et al. |
| 2018/0206100 A1 | 7/2018 | Eisner et al. |
| 2020/0128383 A1 | 4/2020 | Maier et al. |

(56) References Cited

U.S. PATENT DOCUMENTS

2020/0187150 A1 6/2020 Eisner
2020/0351623 A1 11/2020 Eisner

OTHER PUBLICATIONS

US FCC document, "*What you need to know about text-to-911*," http://www.fcc.gov/text-to-911.

\* cited by examiner

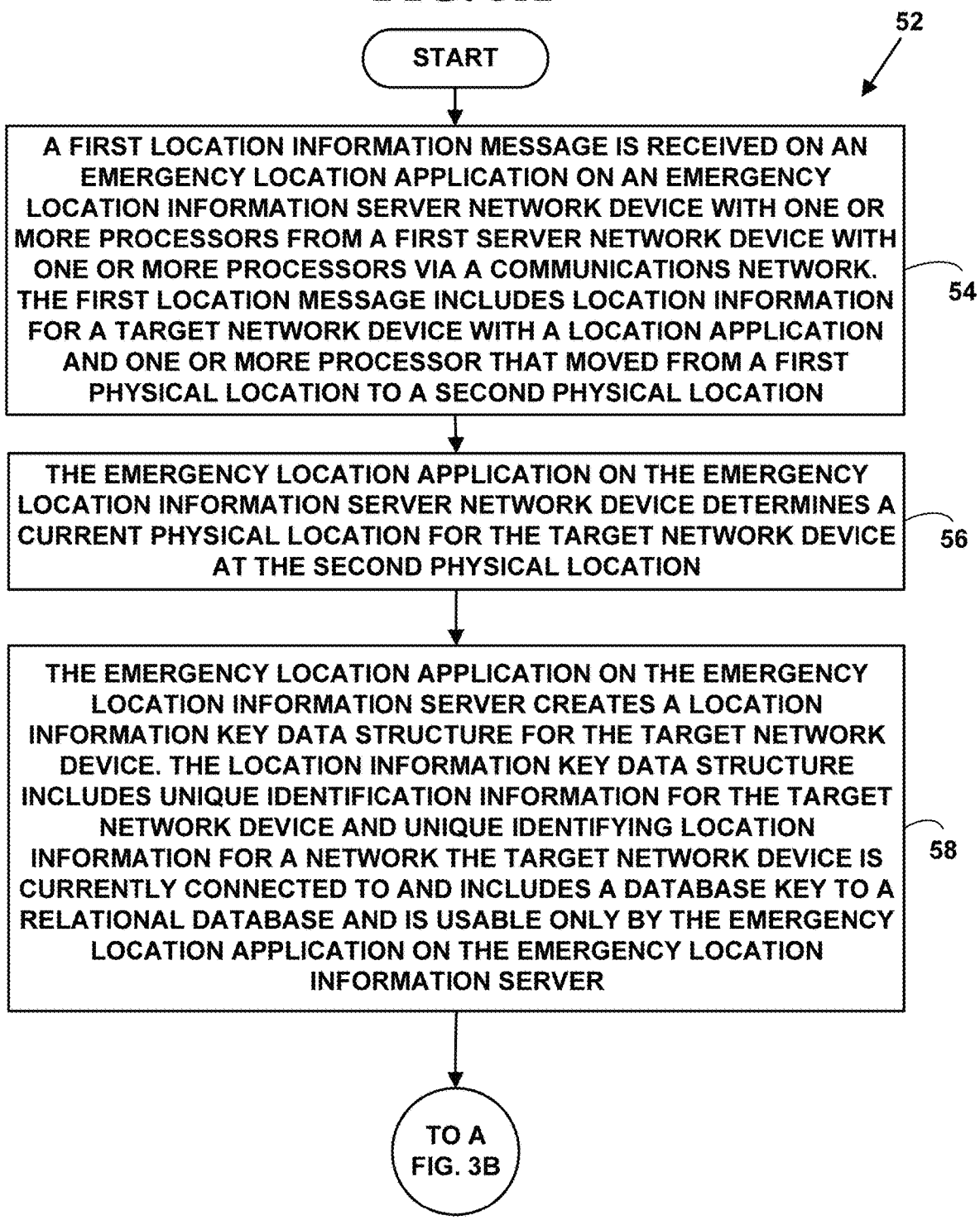

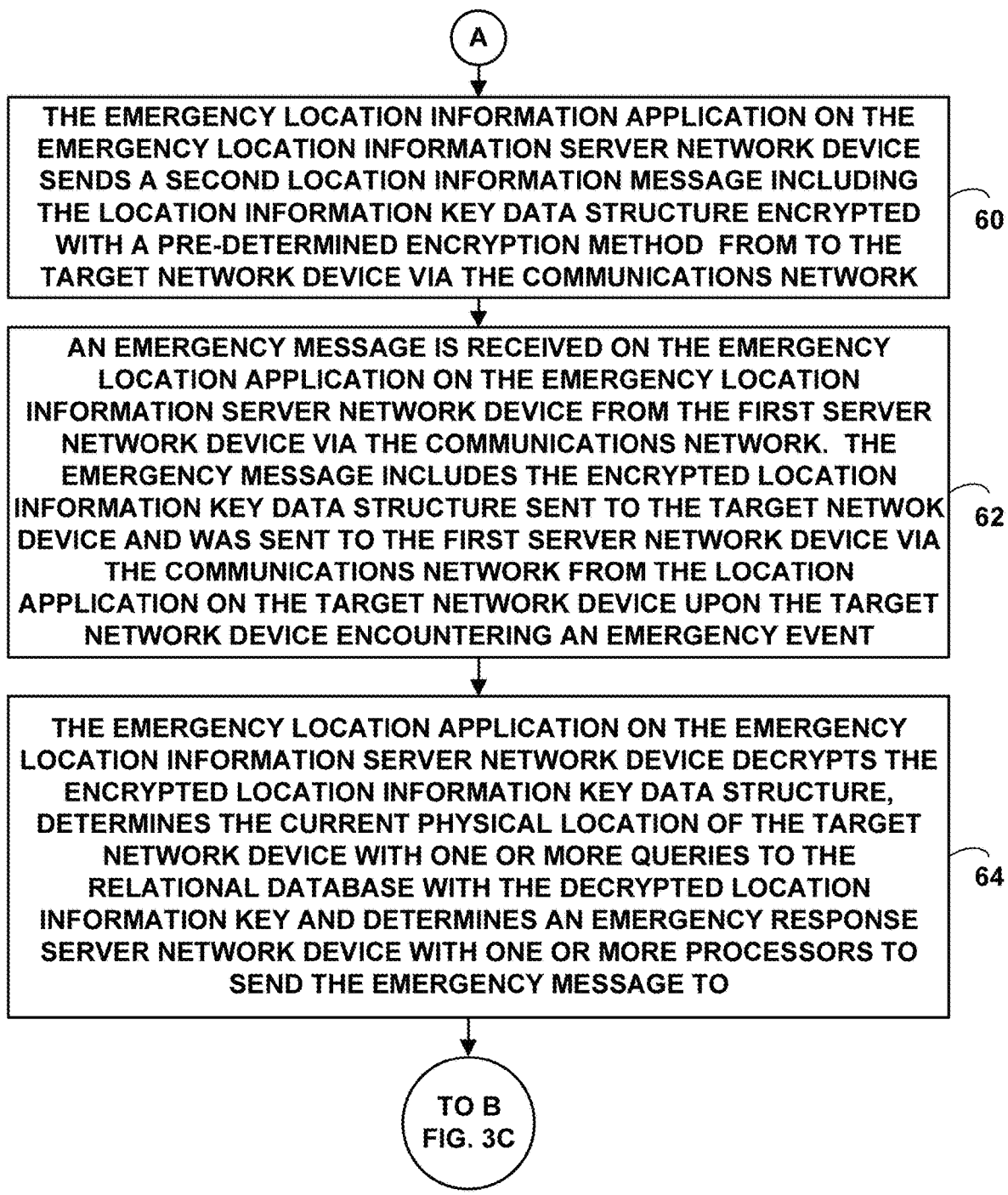

107 - UNIQUE DEVICE INFO – iPHONE 10 –
SALLY JONES -312-555-1201, (X,Y), (X, Y, Z)

| | | | | LAYER 2 | | |
|---|---|---|---|---|---|---|
| N | SWITCH | PORT | DEVICE IP | DEVICE MAC | ELIN | ERL |
| P | 022 | 01 | 193.169.1.88 | 00-04-8B-85-80-EE | 312-555-1201 | 3 N. First St. CB 1 |
| P | 023 | FA | 193.169.1.93 | 00-04-8B-85-78-8D | 312-555-1202 | 11 N. 2nd St. CB 2 |
| Q | 011 | 03 | 193.168.1.09 | 00-04-8B-85-54-9F | 312-555-1203 | 11. N. 2nd St. CB 3 |

109 – LAYER 2 – Row 1 –
UNIQUE NETWORK INFO

| | | LAYER 3 | | |
|---|---|---|---|---|
| REGION | NETWORK | IP RANGE | ELIN | ERL |
| 1 | BLUE | 193.169.2.1. -- .126 | 312-556-0000 | 3 N. First St. FLR 1 |
| 2 | ORANGE | 193.169.1.1. -- .254 | 312-555-1200 | 3 N. First St. FLR 2 |
| 3 | GREEN | 193.169.2.12. -- .254 | 312-557-1000 | 3 N. First St. FLR 3 |

111 – LAYER 3 – Row 2
UNIQUE NETWORK INFO

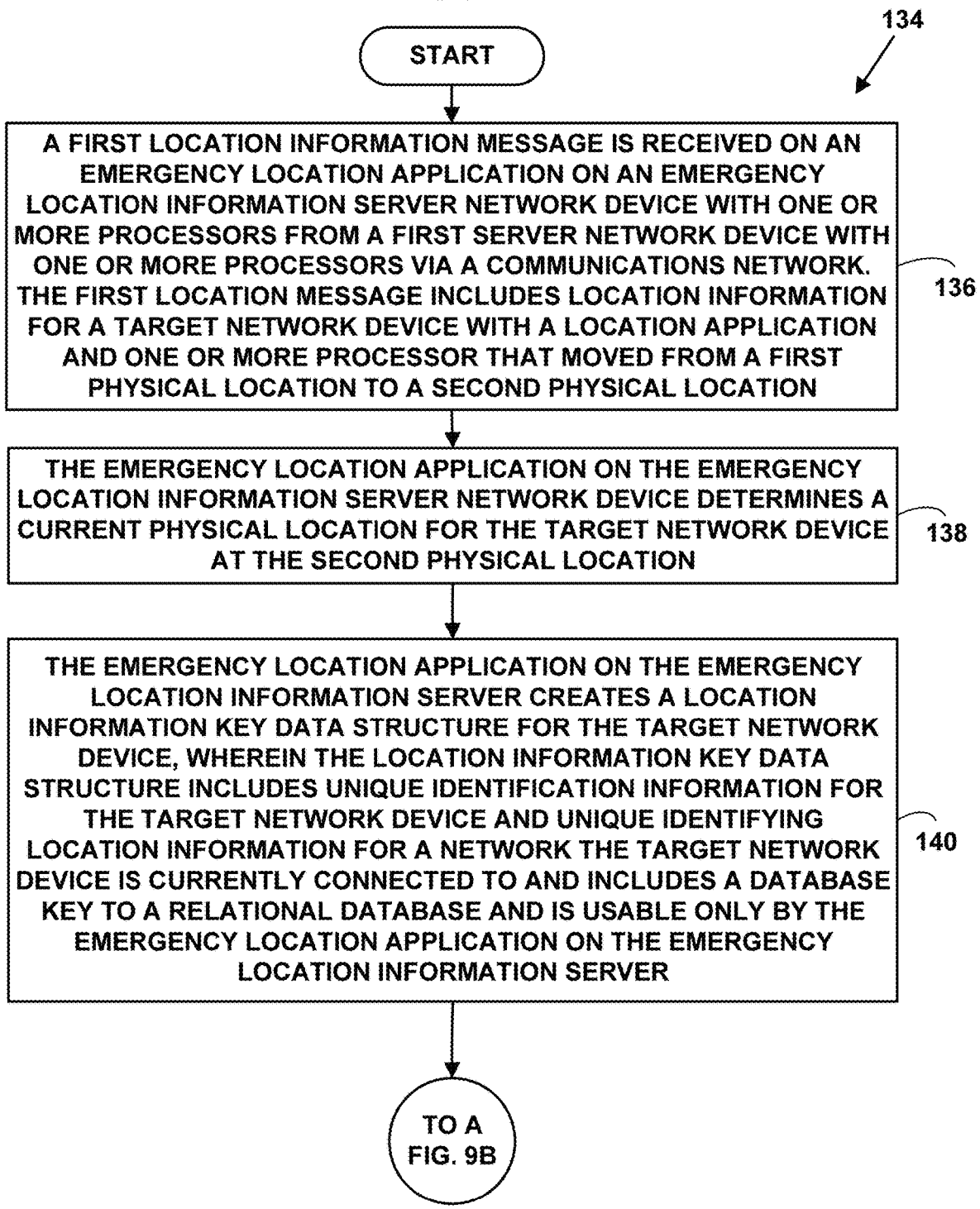

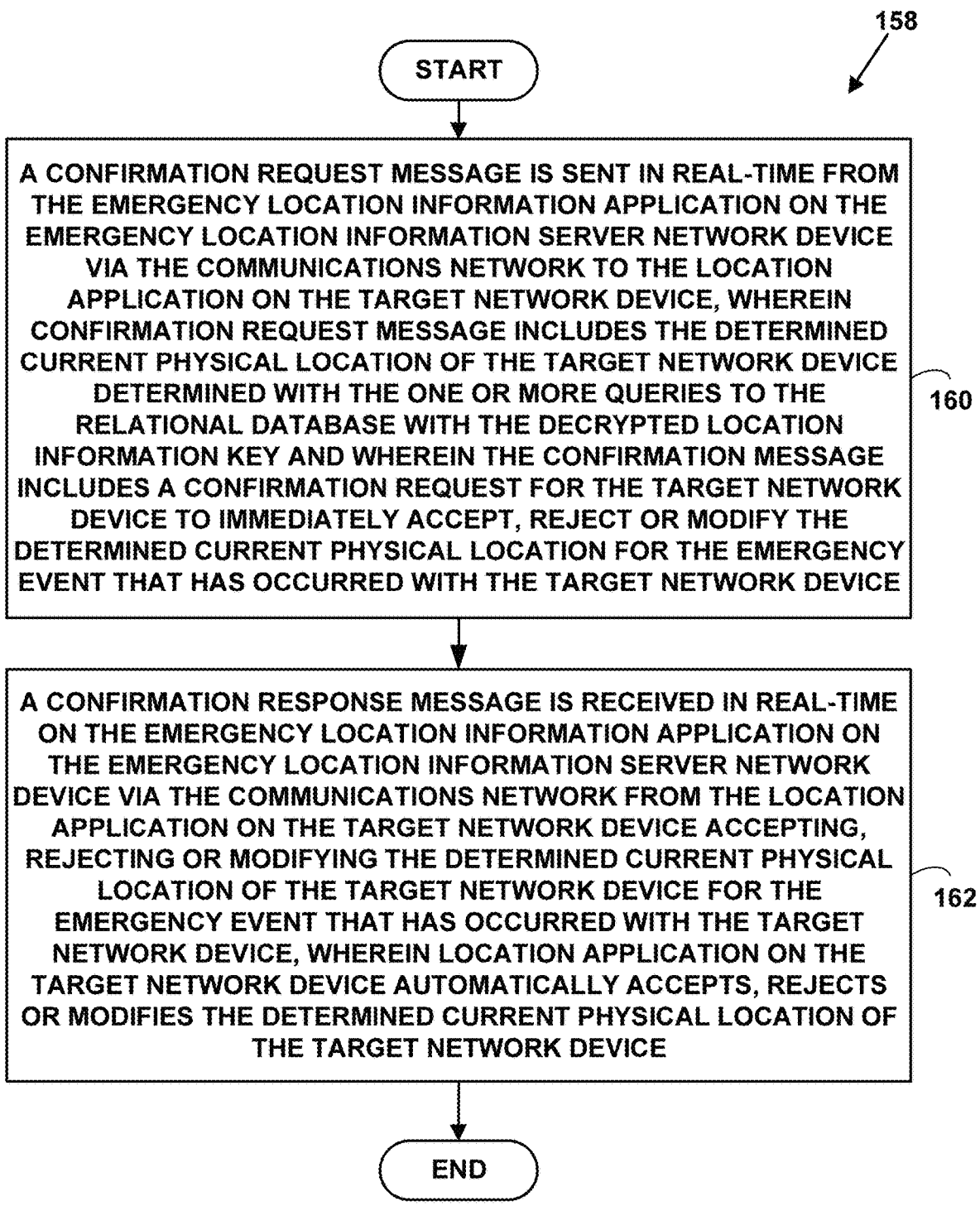

METHOD AND SYSTEM FOR LOCATING A NETWORK DEVICE IN AN EMERGENCY SITUATION INCLUDING PUBLIC LOCATION INFORMATION

CROSS REFERENCES TO RELATED APPLICATIONS

This U.S. utility patent application is a Continuation-In-Part (CIP) U.S. Utility patent application Ser. No. 15/914,078, filed on Mar. 7, 2018, which issued as U.S. Pat. No. 10,588,004, on Mar. 10, 2020, which is a CIP of U.S. utility patent application Ser. No. 15/491,608, filed Apr. 19, 2017, which is a CIP of U.S. utility patent application Ser. No. 14/806,068 filed on Jul. 22, 2015, that issued into U.S. Pat. No. 9,935,534, on Apr. 25, 2017, which is a CIP of U.S. utility patent application Ser. No. 14/579,760, filed on Dec. 22, 2014, that issued as U.S. Pat. No. 9,094,816, on Jul. 28, 2015, which is a CIP of U.S. patent application Ser. No. 14/303,842, filed on Jun. 13, 2014, that issued as U.S. Pat. No. 8,918,075, on Dec. 23, 2014, which is a CIP of U.S. utility patent application Ser. No. 13/831,426, filed Mar. 14, 2013, which issued as U.S. Pat. No. 8,755,767, on Jun. 17, 2014, which is a CIP of U.S. utility patent application Ser. No. 13/098,981, filed May 2, 2011, which issued and U.S. Pat. No. 8,442,482 on May 14, 2013, which is a CIP of U.S. utility patent application Ser. No. 11/803,671, filed May 15, 2007, which issued as U.S. Pat. No. 7,937,067, on May 3, 2011, which is an application that claims priority to U.S. Provisional patent application Nos. 60/800,774, 60/800,775, 60/800,776, and 60/800,777, all filed May 16, 2006, U.S. utility patent application Ser. No. 13/831,426, is also a CIP of U.S. utility application Ser. No. 12/844,972 filed Jul. 28, 2010, which is an application claiming priority to U.S. Provisional patent applications nos. 61/229,414 filed Jul. 29, 2009 and 61/230,154 filed Jul. 31, 2009, the contents of all of these cited applications and issued patents are incorporated herein by reference.

FIELD OF INVENTION

This application relates to automatic processing of location information. More specifically, it relates to a method and system for locating a network device in an emergency situation including public information.

BACKGROUND OF THE INVENTION

In many emergency situations it is of great importance to be able to quickly and accurately locate individuals. For example, in the event of a vehicular accident, public safety personnel may need to operate within an unfamiliar wooded area on short notice, in conditions of poor visibility due to smoke, flame or darkness. Accurate location information is vital to coordinate rescue operations and ensure the safety of rescue personnel. Police or military personnel may be faced with similar circumstances, in which accurate and timely location information can help avoid friendly-fire incidents and coordinate action against a criminal or enemy force.

Individuals faced with an emergency involving immediate danger to life or health of themselves or a colleague need to be able to accurately provide their location to emergency/rescue personnel, preferably without human intervention to enable rescue in the case where the individual in need is incapacitated, or all attention must be devoted to his/her protection. In all these circumstances, rapid and automated acquisition of the location of an individual to within a few meters can be critical in saving lives.

In addition, there are times when an individual or an object is in a rural area needs to be located in an emergency. A mobile device an individual may be carrying may not be able to communicate because of poor signal strength to the mobile device in the rural area.

Prior art methods of accomplishing such location do not simultaneously meet the requirements of rapid location determination, automation, and accuracy. Navigation employing conventional maps and visual observation or dead reckoning are not readily automated and thus require time and attention by a human observer. Manual navigation may be vitiated in the case where visibility is impacted by flame or smoke, or where personnel are under hostile fire and unable to establish their location by patient observation.

Enhanced 911, (E911) is a location technology that enables mobile, or cellular phones and other mobile device such personal digital/data assistants (PDAs) to process 911 emergency calls and enable emergency services to locate a physical geographic position of the device and thus the caller. When a person makes a 911 call using a traditional phone with wires, the call is routed to the appropriate public safety answering point (PSAP) that then distributes the emergency call to the proper emergency services. The PSAP receives the caller's phone number and the exact location of the phone from which the call was made. Prior to 1996, 911 callers using a mobile phone would have to access their service providers in order to get verification of subscription service before the call was routed to a PSAP. In 1996 the Federal Communications Commission (FCC) ruled that a 911 call must go directly to the PSAP without receiving verification of service from a specific cellular service provider. The call must be handled by any available service carrier even if it is not the cellular phone customer's specific carrier.

The FCC has rolled out E911 in two phases. In 1998, Phase I required that mobile phone carriers identify the originating call's phone number and the location of the signal tower, or cell. In 2001, Phase II required that each mobile phone company doing business in the United States must offer either handset- or network-based location detection capability so that the caller's location is determined by the geographic location of the cellular phone within 100 meter accuracy and not the location of the tower that is transmitting its signal. The FCC refers to this as Automatic Location Identification (ALI).

In addition to traditional cellular telephones, advances in technology have expanded the number and types of devices that are capable of initiating an emergency call for service that is routed to the appropriate PSAP based on the caller's location. Devices include, but are not limited to: computer programs that are executed on computing devices (Soft Phone), cellular telephones that are capable of data communications, wearable embedded devices, devices embedded into home appliances, intelligent building control and monitoring systems, and intelligent roadways. The concept of an "Internet of Things" will allow any connected device to initiate communications with another device, service, or person, including a system within a PSAP.

In the current 9-1-1 operating environment, telecommunication carriers and hosted service providers (i.e., dial tone providers) associate an end point device (e.g., a non-mobile telephone) with a static location at the time of provisioning. This location is used by the dial tone provider to determine the location appropriate 9-1-1 call center or Public Safety Answering Point (PSAP) that is responsible for answering and handling a 9-1-1 call made from the end point device.

Typically, the dial tone provider will use a third party to route and deliver both the 9-1-1 call and the associated Automatic Location Information (ALI). In the event the end point device is moved from the location it was provisioned with (e.g., into a new office, etc.), the end user is responsible to update the static location.

This is accomplished in several manners including submitting a service order to the dial tone provider, accessing and updating the static location through a web portal, or using a client application on the static end point device to update the portal. However, the problem with all of these methods is that they are all manual processes. In addition, if the static location of the end point device is not updated, in the event of any emergency situation, the end point device would not provide the correct emergency location when a 9-1-1 call is made. This endangers the health and safety of the caller.

As the 9-1-1/text-to-911 operating environment moves away from statically located devices such as non-mobile phones and allows users the ability to move their mobile end point devices, such as mobile phones, electronic tablets, wearable devices, etc. at will, there is a need for an associated automatic current physical location discovery and 9-1-1 location database update capability to locate such mobile and non-mobile, but moveable devices when an emergency event occurs.

SUMMARY OF THE INVENTION

In accordance with preferred embodiments of the invention, some of the problems associated with locating mobile network devices when an emergency call (e.g., 911, E911, text-to-911, 112, etc.) is made are overcome. A method and system to locate a network device in an emergency situation is presented.

Current physical location information is obtained for a network device every time it registers on a network or moves to a new physical location. The current physical location is sent and received in an encrypted format to and from the network device. When the network device initiates an emergency message (e.g. 911, E911, NG911, text-to-911, 112, etc.) based on an emergency event (e.g., weather, crime, fire, natural disaster, medical, terrorist, military, etc.), the emergency message includes the encrypted current physical location information for the network device. The current physical location information is decrypted. Additional information is collected from one or more public location information sources for the current physical location of the network device. The emergency message with the additional information is routed in real-time to an appropriate Public Safety Answering Point (PSAP). The appropriate PSAP is immediately notified in real-time so emergency responders (e.g., police, fire, medical, etc.) can be dispatched to the current physical location of the network device.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 3A, 3B and 3C are a flow diagram illustrating a method for locating a network device in an emergency situation;

FIGS. 9A, 9B and 9C are a flow diagram illustrating a method for locating a network device in an emergency situation; and FIG. 10 is a flow diagram illustrating a method for locating a network device in an emergency situation.

DETAILED DESCRIPTION OF THE INVENTION

Electronic Emergency Location Information Message Processing System

Figure 1:
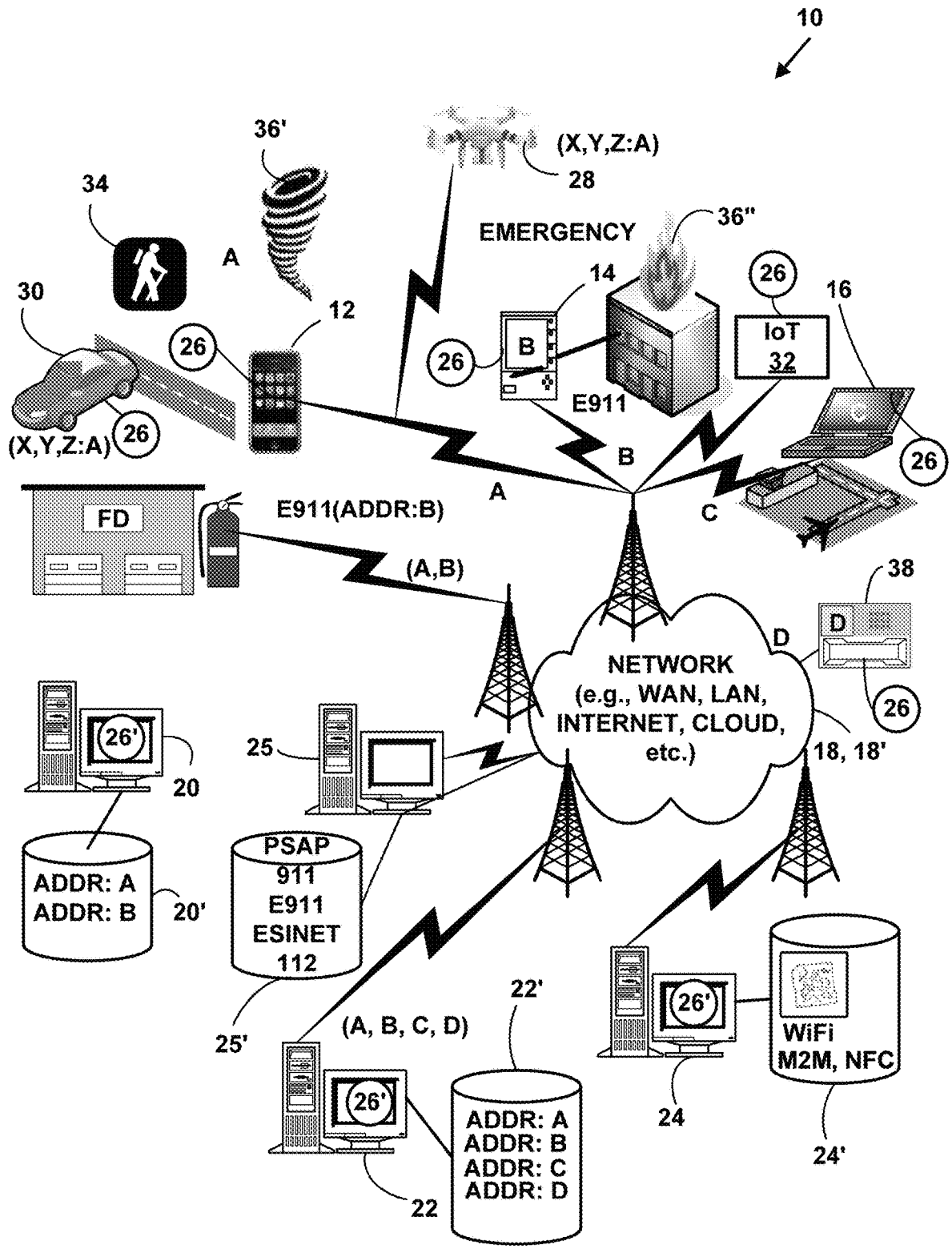
FIG. 1 is a block diagram illustrating an exemplary emergency location information processing system.

FIG. 1 is a block diagram illustrating an exemplary communications system 10. The exemplary communications system 10 includes, but is not limited to, one or more target network devices, each with one or more processors and each with a non-transitory computer readable medium. Only selected ones of the target network devices are illustrated in the drawings for simplicity.

The target network devices, include, but are not limited to, mobile phones including smart phones 12, electronic tablets 14, mobile computers 16, unmanned aerial vehicles (UAV) 28, commonly known as "drones" and also referred to as "Remotely Piloted Aircraft (RPA)," driverless vehicles 30, vehicles with a driver, aircraft (e.g., airplane, helicopter, hot air balloon, blimp, etc.) water vehicles, (e.g., ship, boat, barge, raft, canoe, kayak, personal water craft (PWC), etc.), snow machines, Internet of Things (IoT) network devices 32, and other target network devices that determine a current physical location 34 of a target network device during an emergency event 36', 36", etc. (e.g., weather event 36', fire 36", etc.).

Figure 2:
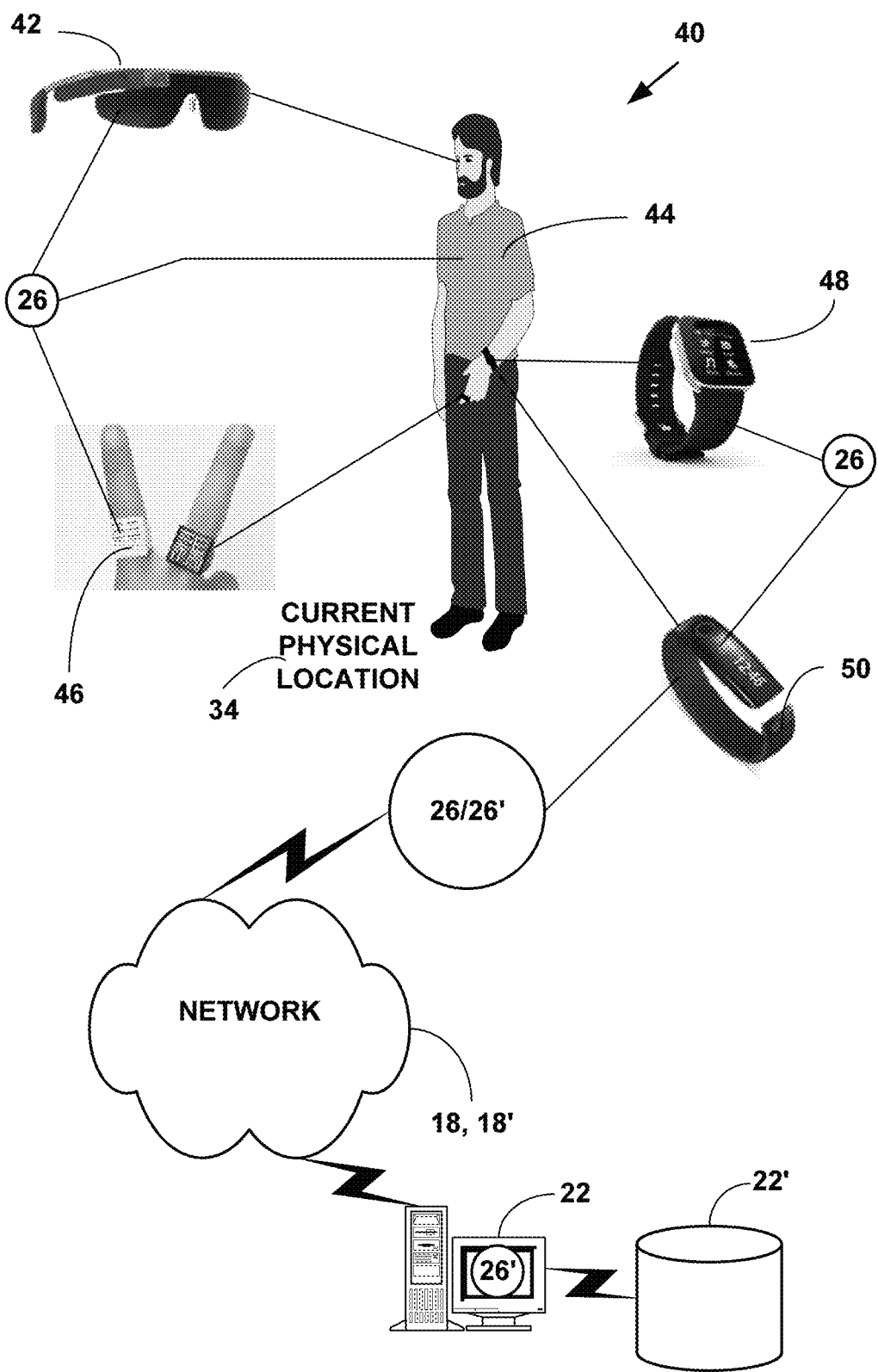
FIG. 2 is a block diagram with illustrating wearable mobile network devices.

The target network devices further include non-mobile network devices such as non-mobile phones, 38, portable gaming platforms (GAMEBOY and DSI by Nintendo, PSP by Sony, etc.), non-portable gaming platforms (e.g., XBOX by Microsoft, Wii by Nintendo, PLAY STATION, by Sony, etc.) non-mobile computers, non-mobile phones, wireless devices, wired devices, game devices, laptop computers, personal information devices, personal digital/data assistants (PDA), hand-held devices, network appliances, Internet appliances, cable television set-top boxes, Internet television set-top boxes, Internet television sticks, satellite television boxes, devices embedded into home appliances, intelligent building control and monitoring systems, intelligent roadways, etc. and/or wearable devices 42-50 (e.g., FIG. 2). However, the present invention is not limited to these target electronic devices and more, fewer or others types of target electronic devices can also be used.

The target network devices function as client devices in some instances and server devices in other instances. The target network devices include wireless or wired communications.

In one embodiment the one or more target network devices are "smart devices." A "smart device" is aware of its location in three dimensional (X, Y,Z) and/or two-dimensional (X, Y) space.

In another embodiment, the target network device are "dumb devices." A "dumb device" is not aware of its location. A dumb device is typically in contact with proxy server device that is aware of the dumb device's location. Proxy servers may serve one or more or an aggregate of devices.

In one specific exemplary embodiment, the one or more target network devices also include smart phones 12 such as the iPhone by Apple, Inc., Blackberry Storm and other Blackberry models by Research In Motion, Inc. (RIM), Droid by Motorola, Inc. HTC, Inc. Samsung, Google, other types of smart phones, other types of mobile and non-mobile phones, etc. However, the present invention is not limited to such devices, and more, fewer or other types of smart phones can be used to practice the invention.

A "smart phone" is a mobile phone that offers more advanced computing ability and connectivity than a contemporary basic feature phone. Smart phones and feature phones may be thought of as handheld computers integrated with a mobile telephone, but while most feature phones are able to run applications based on platforms such as Java ME, a smart phone usually allows the user to install and run more advanced applications. Smart phones and/or tablet computers run complete operating system software providing a platform for application developers assessable through a specialized Application Programming Interface (API).

The operating systems include the iPhone OS, Android, Windows, etc. iPhone OS is a proprietary operating system for the Apple iPhone. Android is an open source operating system platform backed by Google, along with major hardware and software developers (such as Intel, HTC, ARM, Motorola and Samsung, etc.), that form the Open Handset Alliance. Windows is an operating system for mobile device by Microsoft.

The one or more target network also include tablet computers 14 such as the iPad, by Apple, Inc., the HP Tablet, by Hewlett Packard, Inc., the Playbook, by RIM, Inc., the Tablet, by Sony, Inc., the Surface by Microsoft, etc.

In a preferred embodiment, the one or more target network devices include Internet of Things (IoT) network devices 32 with one or more processors, one or more sensors and/or one or more actuators and a network connection interface.

A "sensor" is an electronic component, module, or subsystem whose purpose is to detect events or changes in its environment (e.g., temperature, pressure, altitude, elevation, speed, acceleration, moisture, etc.) and send the information to other electronics and one or more processors. For example, an environmental sensor may detect events, such as smoke, a fire, a burst water pipe, etc.

An "actuator" is a component of the IoT network device 32 that is responsible for moving or controlling a mechanism or system.

An actuator requires a control signal and a source of energy. The control signal is relatively low energy and may be electric voltage or current, pneumatic or hydraulic pressure, or even human power. The supplied main energy source may be electric current, hydraulic fluid pressure, pneumatic pressure or other energy source. A sound wave (e.g., a gunshot, a scream, etc.) or other positive pressure wave may trigger an actuator via a control signal. When the control signal is received, the actuator responds by converting the energy into mechanical motion.

The IoT network devices 32, include but are not limited to, security cameras, doorbells with real-time video cameras, baby monitors, televisions, set-top boxes, lighting, heating (e.g., smart thermostats, etc.), ventilation, air conditioning (HVAC) systems, and appliances such as washers, dryers, robotic vacuums, air purifiers, ovens, refrigerators, freezers, toys, game platform controllers, game platform attachments (e.g., guns, googles, sports equipment, etc.), and/or other IoT devices.

The IoT network devices 32 include plural devices in smart buildings. A "smart building" is any structure that uses automated network devices and processes to automatically control the building's operations including heating, ventilation, air conditioning, lighting, security, other systems, etc. IoT network devices 32 in smart buildings can be used to determine an exact location of a person, animal, and/or an object in a smart building using the methods and systems described herein.

In one embodiment, the target network devices include a location application 26 in communications with an application 26' on a server network device. In one embodiment, the location application 26 is a software application. However, the present invention is not limited to this embodiment and the location application 26 can be firmware, hardware or a combination thereof. In one embodiment, the location application 26 exists only on the target network devices. In another embodiment, application 26' exists only on server network devices 20, 22, 24, each with one or more processors. In another embodiment, emergency location functionality is internal location application 26. In another embodiment, the internal emergency location functionality internal to the location application 26 is combined with emergency location functionality external to the location application 26.

In another embodiment, a portion of the application 26 exists on the target network devices and another portion 26' exists one or more server network devices 20, 22, 24. In another embodiment, application 26/26' includes a portion of a social media application (e.g., FACEBOOK, TWITTER, INSTAGRAM, etc.). However, the present invention is not limited to these embodiments and other embodiments and other combinations can also be used to practice the invention.

In one embodiment, the one or more target network devices include an internal accelerometer. An "accelerometer" is a device that measures an acceleration of the device and a change of velocity of the target network devices. Many smart phones, digital audio players, wearable mobile devices and personal digital assistants contain accelerometers for user interface control; often the accelerometer is used to present landscape or portrait views of the device's screen, based on the way the device is being held. The accelerometer can be used to detect crash-strength G-forces and automatically translate and provide location 3D (X, Y, Z) geo-space and/or 2D (X, Y) geo-space location into a current physical location 34 for emergency response personal.

In one embodiment, the one or more target network devices include an internal hardware temperature sensor that indicates when the device has exceeded a certain predetermined temperature. This internal temperature sensor is used with a corresponding to detect emergency events such as fires, weather (e.g., tornado, hurricane, blizzard, etc.) events, etc. that include a dramatic change in temperature. In one embodiment, the temperature sensor include and Infrared temperature sensor. However, the present invention is not limited to such embodiments and other types of internal and external temperature sensors can also be used to practice the invention.

In one embodiment, the one or more target network devices include a biometric sensor for collecting biometric identifiers. Biometric identifiers are distinctive, measurable characteristics used to label and describe individuals. Biometric identifiers include physiological and behavioral characteristics of a person. Physiological characteristics are related to the shape of the body. Examples include, but are not limited to, biometric information, including, but not limited to, fingerprints, vein patterns, facial recognition, DNA, palm print, hand geometry, iris recognition, retina recognition, heart rhythm and/or odors, scent. Behavioral characteristics are related to the pattern of behavior of a person, including but not limited to typing rhythm, gait and voice. Some researchers have coined the term "behaviometrics" to describe the latter class of biometrics.

In another embodiment, the one or more target network devices include an external device (e.g., one or more sensors and/or actuators, etc.) that is plugged into the target network device. In one embodiment, the one or more target network devices include an integration of a variety of motion, magnetic, pressure, humidity, moisture, temperature, height, depth (e.g., water, fluid, etc.), air bag deployment, and/or altimeter sensors with a processing unit and dedicated smart device application software to provide location information when an emergency event is detected via such sensors.

In one embodiment of the invention, the application 26 is a smart application for a smart phone. A smart network device application includes interactions with an operating system on a smart phone. In another embodiment, the application 26 is a smart application for the tablet computer. The interactions for the application 26 are typically completed through an Application Programming Interface (API).

The one or more target network devices are in communications with one or more communications networks 18. The communications networks 18 include, but are not limited to, the Internet, an intranet, a wired Local Area Network (LAN), a wireless LAN (WiLAN), a Wide Area Network (WAN), a Metropolitan Area Network (MAN), Public Switched Telephone Network (PSTN), mesh networks, Bluetooth networks, cloud and/or other types and combinations of wired and wireless communications networks providing voice, video and data communications with wired or wireless communication protocols.

In one embodiment, the communications network 18 includes a cloud communications network 18' comprising plural different cloud component networks, a public (e.g. Internet, PSTN, etc.), private (e.g., LAN, WAN, etc.), hybrid (e.g., Internet plus private LAN, etc.), community (e.g., Internet plus, private LAN, plus PSTN, etc.) and/or emergency (e.g., 911, E911, NG911, 112, etc.) networks.

"Cloud computing" is a model for enabling, on-demand network access to a shared pool of configurable computing resources (e.g., public and private networks, servers, storage, applications, and services) that are shared, rapidly provisioned and released with minimal management effort or service provider interaction. The cloud communications network 18' provides emergency location of mobile network devices and automated vehicles as cloud services.

This exemplary cloud computing model for emergency location information services promotes availability for shared resources and comprises: (1) cloud computing essential characteristics; (2) cloud computing service models; and (3) cloud computing deployment models. However, the present invention is not limited to this cloud computing model and other cloud computing models can also be used to practice the invention.

Exemplary cloud computing essential characteristics appear in Table 1. However, the present invention is not limited to these essential characteristics and more, fewer or other characteristics can also be used to practice the invention.

TABLE 1

1. On-demand emergency location services. Emergency location servers 20, 22, 24 can unilaterally provision computing capabilities, such as server time and network storage, as needed automatically without requiring human interaction with each network server on the cloud communications network 18'.
2. Broadband network access. Emergency location service capabilities are available over plural broadband communications networks and accessed through standard mechanisms that promote use by heterogeneous thin or thick client platforms 26, 26' (e.g., mobile phones/smart phones 12, tablet computers 14, laptops 16, UAVs 28, automated vehicles 30, IoT network devices, 32, wearable devices, 42-50, etc.). The broadband network access includes high speed network access such as 3G and/or 4G and/or 5G wireless and/or wired and broadband and/or ultra-broad band (e.g., WiMAX, etc.) network access.
3. Resource pooling. Emergency location computing resources are pooled to serve multiple target network device requesters, using a multi-tenant model, with different physical and virtual resources dynamically assigned and reassigned according to emergency location demand. There is location independence in that a requester of emergency location services has no control and/ or knowledge over the exact location of the provided by the emergency location resources but may be able to specify location at a higher level of abstraction (e.g., country, state, or data center). Examples of pooled resources include storage, processing, memory, network bandwidth, virtual server network device and virtual target network devices.
4. Rapid elasticity. Capabilities can be rapidly and elastically provisioned, in some cases automatically, to quickly scale out and rapidly released to quickly scale for emergency location services during a large emergency event (e.g., terrorist attack, weather event, natural disaster, etc.) To the emergency location system providers, the emergency location service capabilities available for provisioning appear to be unlimited and can be used in any quantity at any time.
5. Measured Services. Cloud computing systems automatically control and optimize resource use by leveraging a metering capability at some level of abstraction appropriate to the type of emergency location service (e.g., storage, processing, bandwidth, custom emergency location applications 26, 26', etc.). Emergency location service usage is monitored, controlled, and reported providing transparency for both the emergency location service providers 20, 22, 24, 25 and emergency location requesters from target network device of the utilized emergency location service.

Exemplary cloud computing service models appear in Table 2. However, the present invention is not limited to these service models and more, fewer or other service models can also be used to practice the invention.

TABLE 2

1. Cloud Computing Software Applications for Emergency Location Information Services (CCSA). The capability to use the provider's applications 26, 26' running on a cloud infrastructure 18'. The cloud computing applications, are accessible from the emergency location server network device 22 from various target devices through a thin client interface 26 such a thin application and/or a web browser, etc. The user does not manage or control the underlying cloud infrastructure including network, servers, operating systems, storage, or even individual application 26, 26' capabilities, with the possible exception of limited user-specific application configuration settings.

| | TABLE 2-continued |
|---|---|
| 2. | Cloud Computing Infrastructure for Emergency Location Information Services (CCI). The capability provided to the user is to provision processing, storage and retrieval, networks and other fundamental computing resources where the user is able to deploy and run arbitrary software, which can include operating systems and applications 26, 26'. The user does not manage or control the underlying cloud infrastructure but has control over operating systems, storage, deployed applications, and possibly limited control of select networking components (e.g., host firewalls, etc.). |
| 3. | Cloud Computing Platform for Emergency Location Information Services (CCP). The capability provided to the user to deploy onto the cloud infrastructure created or acquired applications created using programming languages and tools supported servers 20, 22, 24, 25 etc. The user not manage or control the underlying cloud infrastructure including network, servers, operating systems, or storage, but has control over the deployed applications 26, 26' and possibly application hosting environment configurations. |

In one exemplary embodiment, the application 26', offers cloud services providing emergency location information. The application 26' offers the cloud computing Infrastructure as a Service (IaaS), including a cloud software infrastructure service, a cloud Platform as a Service (PaaS) including a cloud software platform service and/or offers Specific cloud software services as a Service (SaaS) including a specific cloud software service for providing emergency location information. The IaaS, PaaS and SaaS include one or more of cloud services comprising networking, storage, server network device, virtualization, operating system, middleware, run-time, data and/or application services, or plural combinations thereof, on the cloud communications network 18'.

Plural server network devices 20, 22, 24, 25 (only four of which are illustrated) each with one or more processors, each with a non-transitory computer readable medium and include one or more associated databases 20', 22', 24', 25'. The one or more databases include relational databases and/or non-relational databases. The plural server network devices 20, 22, 24, 25 are in communications with the one or more target network devices via the communications network 18. The plural server network devices 20, 22, 24, 25 include, but are not limited to, wireless or wired or data communications servers, wireless access points, proxy servers and other types of server devices. Selected ones of the server network devices (e.g., 25, etc.) include Public Safety Answering Point (PSAP) servers, legacy 911 servers, E911 servers, 25, and/or other types of emergency servers. etc.

The communications network 18 may include one or more gateways, routers, bridges, switches. A gateway connects computer networks using different network protocols and/or operating at different transmission capacities. A router receives transmitted messages and forwards them to their correct destinations over the most efficient available route. A bridge is a device that connects networks using the same communications protocols so that information can be passed from one network device to another. A switch is a device that filters and forwards packets between network segments. Switches typically operate at the data link layer and sometimes the network layer and therefore support virtually any packet protocol.

In one embodiment, the target network devices and the server network devices 20, 22, 24, 25 include an emergency location application 26, 26' with plural software modules. The multiple software modules may be implemented in firmware, hardware or any combination thereof. In one embodiment, the target network devices may include a plug-in for a browser with plural software modules. In another embodiment, the plural target network devices and plural server devices 20, 22, 24, 25 do not include the emergency location application or browser plug-in.

The one or more target network devices and one or more server network devices 20, 22, 24, 25 communicate with each other and other network devices with near field communications (NFC) and/or machine-to-machine (M2M) communications.

"Near field communication (NFC)" is a set of standards for smartphones and similar devices to establish radio communication with each other by touching them together or bringing them into close proximity, usually no more than a few centimeters. Present include contactless transactions, data exchange, and simplified setup of more complex communications such as Wi-Fi. Communication is also possible between an NFC device and an unpowered NFC chip, called a "tag" including radio frequency identifier (RFID) tags.

NFC standards cover communications protocols and data exchange formats, and are based on existing radio-frequency identification (RFID) standards including ISO/IEC 14443 and FeliCa. These standards include ISO/IEC 1809 and those defined by the NFC Forum, all of which are incorporated by reference.

"Machine to machine (M2M)" refers to technologies that allow both wireless and wired systems to communicate with other devices of the same ability. M2M uses a device to capture an event (such as option purchase, etc.), which is relayed through a network (wireless, wired cloud, etc.) to an application (software program), that translates the captured event into meaningful information. Such communication was originally accomplished by having a remote network of machines relay information back to a central hub for analysis, which would then be rerouted into a system like a personal computer.

However, modern M2M communication has expanded beyond a one-to-one connection and changed into a system of networks that transmits data many-to-one and many-to-many to plural different types of devices and appliances. The expansion of IP networks across the world has made it far easier for M2M communication to take place and has lessened the amount of power and time necessary for information to be communicated between machines.

The communications network 18 also includes a Public Safety Answering Point (PSAP) to Automatic Location Identification (ALI) (PAM) interface. A PAM interface is an interface that uses a proprietary protocol to retrieve the caller's Automatic Network Identification (ANI) and/or Automatic Location Identification (ALI) from another ALI system or from a Dynamic ANI/ALI Provider for display at the appropriate PSAP upon the answer of a 911/E911 call.

The communications network 18 also includes a Common Alerting Protocol (CAP). CAP is an eXtensible Markup Language (XML)-based data format for exchanging public warnings and emergencies between alerting technologies. CAP allows a warning message to be consistently disseminated simultaneously over many warning systems to many applications. CAP increases warning effectiveness and simplifies the task of activating a warning for responsible officials.

The IoT devices 32 include Emergency Position Indicating Radio Beacon (EPIRBs), personal locator beacon (PLB), emergency locator beacon (ELB), and emergency locator transmitter (ELT) sensors and/or actuators.

Individuals can receive standardized alerts from many sources and configure their applications to process and respond to the alerts, as desired. Alerts from the Department of Homeland Security, the Department of the Interior's United States Geological Survey, and the Department of Commerce's National Oceanic and Atmospheric Administration (NOAA), Cospas-Sarsat and state and local government agencies can all be received in the same format, by the same application. That application can, for example, sound different alarms based on the information received.

By normalizing alert data across threats, jurisdictions, and warning systems, CAP also can be used to detect trends and patterns in warning activity, such as trends that might indicate an undetected hazard or hostile act. From a procedural perspective, CAP reinforces a research-based template for effective warning message content and structure.

The CAP data structure is backward-compatible with existing alert formats including the Specific Area Message Encoding (SAME) used in Weather radio and the broadcast Emergency Alert System as well as new technology such as the Commercial Mobile Alert System (CMAS).

ERIBs are tracking transmitters which aid in the detection and location of boats, aircraft, and people in distress. A personal locator beacon (PLB) is particular type of EPIRB that is typically smaller, has a shorter battery life and unlike a proper EPIRB is registered to a person rather than a vessel. The terms emergency locator beacon (ELB) and emergency locator transmitter (ELT) are used interchangeably with EPIRB only when used on aircraft.

EPIRB are radio beacons many of which interface with worldwide offered service of Cospas-Sarsat, the international satellite system for search and rescue (SAR). Transmitters broadcasting on 406 MHz are recognized. When manually activated, or automatically activated upon immersion or impact, such beacons send out a distress signal. The signals are monitored worldwide and the location of the distress is detected by non-geostationary satellites using the Doppler effect for trilateration, and in more recent EPIRBs also by Global Positioning System (GPS).

The communications network 18 also includes a Wireless Emergency Service Protocol E2 Interface for interoperable operation of the E2 interface over Transmission Control Protocol (TCP)/Internet Protocol (IP) (TCP/IP). This interface is between the Mobile Positioning Center (MPC)/Global Mobile Location Center (GMLC) and the Emergency Management Systems (EMSE) as defined in R45.2's TIA/EIA/J-STD-036-A.

The communications network 18 includes one or more servers or access points (AP) including wired and wireless access points (WiAP).

The communications network 18 includes data networks using the Transmission Control Protocol (TCP), User Datagram Protocol (UDP), Internet Protocol (IP) and other data protocols.

The communications network 18 includes wired interfaces connecting portions of a PSTN or cable television network that connect the target network devices via the Public Switched Telephone Network (PSTN) or a cable television network (CATV) including high definition television (HDTV) that connect the target network devices via one or more twisted pairs of copper wires, digital subscriber lines (e.g. DSL, ADSL, VDSL, etc.) coaxial cable, fiber optic cable, other connection media or other connection interfaces. The PSTN is any public switched telephone network provided by AT&T, CenturyLink, FairPoint, Frontier, Sprint, Verizon, and other Local Exchange Carriers, etc.

The communications network 18 includes digital and analog cellular services, Commercial Mobile Radio Services (CMRS), including, mobile radio, paging and other wireless services. The communications network 18 includes a cellular telephone network, Personal Communications Services network (PCS), Packet Cellular Network (PCN), Global System for Mobile Communications, (GSM), Generic Packet Radio Services (GPRS), Cellular Digital Packet Data (CDPD). The communications network 18 includes a Wireless Application Protocol (WAP) or Digital Audio Broadcasting (DAB), 802.xx.xx, Global Positioning System (GPS) and GPS map, Digital GPS (DGPS) or other type of wireless network.

The wireless network includes, but is not limited to, Code Division Multiple Access (CDMA), Time Division Multiple Access (TDMA), 3G, 4G, 5G, 6G, LTE and/or other switched wireless technologies.

PCS networks include network that cover a range of wireless, digital communications technologies and services, including cordless phones, mobile phones, voice mail, paging, faxing, mobile personal PDAs, etc. PCS devices are typically divided into narrowband and broadband categories.

Narrowband devices which operate in the 900 MHz band of frequencies, typically provide paging, data messaging, faxing, and one- and two-way electronic messaging capabilities. Broadband devices, which operate in the 1850 MHz to 1990 MHz range typically provide two-way voice, data, and video communications. Other wireless technologies such as GSM, CDMA and TDMA are typically included in the PCS category.

GSM is another type of digital wireless technology widely used throughout Europe, in Australia, India, Africa, Asia, and the Middle East. GSM use is growing in the U.S. GSM is a wireless platform based on TDMA to digitize data. GSM includes not only telephony and Short Message Services (SMS) but also voice mail, call forwarding, fax, caller ID, Internet access, and e-mail.

However, present invention is not limited to the frequencies and/or bandwidths described and slower, faster and other frequencies and/or bandwidths currently known or to be developed later, can be used to practice the invention.

SMS or "text messaging" is type of communications service that enables a user to allow private message communications with another user. GSM typically operates at three frequency ranges: 900 MHz (GSM 900) in Europe, Asia and most of the rest of the world; 1800 MHz (GSM 1800 or DCS 1800 or DCS) in a few European countries; and 1900 MHz (GSM 1900 also called PCS 1900 or PCS) in the United States. GSM also operates in a dual-band mode including 900/1800 MHz and a tri-band mode include 900/1800/1900 Mhz.

Short Message Service (SMS) is a text messaging service component of phone, Web, or mobile communication systems. It uses standardized communications protocols to allow fixed line or mobile phone or wearable mobile devices to exchange short text messages.

SMS as used on modern handsets originated from radio telegraphy in radio memo pagers using standardized phone protocols. These were defined in 1985 as part of the GSM series of standards as a means of sending messages of up to 160 characters to and from GSM mobile handsets. Though most SMS messages are mobile-to-mobile text messages, support for the service has expanded to include other mobile technologies, such as CDMA networks, as well as satellite and landline networks.

GPRS is a standard for wireless communications, which runs at speeds up to 150 kilo-bits-per-second (kbit/s). GPRS, which supports a wide range of bandwidths is an efficient use of limited bandwidth and is particularly suited for sending and receiving small bursts of data such as e-mail and Web browsing, as well as large volumes of data.

CDPD is a wireless standard providing two-way, 19.2-Kbps or higher packet data transmission over existing cellular telephone channels. A Packet Cellular Network (PCN) includes various types of packetized cellular data.

The communications network 18 includes a "mesh network" or a "mesh sensor network." A mesh network is a self-organizing networks built from plural nodes that may spontaneously create an impromptu network, assemble the network themselves, dynamically adapt to device failure and degradation, manage movement of nodes, and react to changes in task and network requirements. The plural nodes are reconfigurable smart sensor nodes that are self-aware, self-reconfigurable and autonomous.

A "mesh network" is a network that employs one of two connection arrangements, full mesh topology or partial mesh topology. In the full mesh topology, each node is connected directly to each of the others. In the partial mesh topology, nodes are connected to only some, not all, of the other nodes. A mesh network is a network where the nodes are in close proximity (e.g., about few feet to about 100 feet, or about 1 meter to about 30 meters, etc.).

Preferred embodiments of the present invention include network devices and interfaces that are compliant with all or part of standards proposed by the Institute of Electrical and Electronic Engineers (IEEE), International Telecommunications Union-Telecommunication Standardization Sector (ITU), European Telecommunications Standards Institute (ETSI), Internet Engineering Task Force (IETF), U.S. National Institute of Security Technology (NIST), American National Standard Institute (ANSI), Wireless Application Protocol (WAP) Forum, Data Over Cable Service Interface Specification (DOCSIS) Forum, Bluetooth Forum, the ADSL Forum, the Federal Communications Commission (FCC), the 3rd Generation Partnership Project (3GPP), and 3GPP Project 2, (3GPP2) and Open Mobile Alliance (OMA). However, network devices based on other standards could also be used.

An operating environment for network devices and interfaces of the present invention include a processing system with one or more high speed Central Processing Unit(s) (CPU) or other types of processors and a memory, including, but not limited to, a non-transitory computer readable medium. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU executed" or "processor executed."

It will be appreciated that acts and symbolically represented operations or instructions include the manipulation of electrical signals by the CPU. An electrical system represents data bits which cause a resulting transformation or reduction of the electrical signals, and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to the data bits.

The data bits are maintained on a non-transitory computer readable medium including magnetic disks, optical disks, organic memory, and any other volatile (e.g., Random Access Memory (RAM)) or non-volatile (e.g., Read-Only Memory (ROM)) mass storage system readable by the CPU. The non-transitory computer readable medium includes standalone or cooperating or interconnected non-transitory computer readable medium, which exist exclusively on the processing system or be distributed among multiple interconnected processing systems that may be local or remote to the processing system. In one embodiment, the data bits are stored with one or more encryption and/or security methods described herein.

The Open Systems Interconnection (OSI) reference model is a layered architecture that standardizes levels of service and types of interaction for network devices exchanging information through a communications network. The OSI reference model separates network device-to-network device communications into seven protocol layers, or levels, each building-and relying—upon the standards contained in the levels below it. The OSI reference model includes from lowest-to-highest, from Level 1 to Level 7, a physical, data link, network, transport, session, presentation and application layer. The lowest of the seven layers deals solely with hardware links; the highest deals with software interactions at the application-program level.

The Internet Protocol (IP) reference model is a layered architecture that standardizes levels of service for the Internet Protocol suite of protocols. The Internet Protocol reference model comprises in general from lowest-to-highest, a link, network, transport and application layer.

In one embodiment of the present invention, the wireless and/or wired interfaces used for the plural target network devices include but are not limited to, an IEEE 802.11a, 802.11ac, 802.11b, 802.11g, 802.11n, Wireless Fidelity (Wi-Fi), Wi-Fi Aware, Worldwide Interoperability for Microwave Access (WiMAX), ETSI High Performance Radio Metropolitan Area Network (HIPERMAN), Zigbee, Bluetooth, Infrared, Industrial, Scientific and Medical (ISM), a Radio Frequency Identifier (RFID), Real-Time Text (RTT), or other long range or short range wireless and/or wired interfaces may be used to practice the invention.

802.11b defines a short-range wireless network interface. The IEEE 802.11b standard defines wireless interfaces that provide up to 11 Mbps wireless data transmission to and from wireless devices over short ranges. 802.11a is an extension of the 802.11b and can deliver speeds up to 54M bps. 802.11g deliver speeds on par with 802.11a. However, other 802.11xx interfaces can also be used and the present invention is not limited to the 802.11 protocols defined. The IEEE 802.11a, 802.11an, 802.11b, 802.11g and 802.11n standards are incorporated herein by reference.

Wi-Fi is another type of 802.11xx interface, whether 802.11b, 802.11a, dual-band, etc. Wi-Fi devices include an RF interfaces such as 2.4 GHz for 802.11b or 802.11g and 5 GHz for 802.11a or 802.11n. The present invention is not limited to these Wi-Fi standards or frequencies.

Wi-Fi Aware is a new capability for energy-efficient, proximity-based service discovery among Wi-Fi capable devices. The technology in Wi-Fi Aware enables network devices to discover other devices, applications, and information nearby before making a Wi-Fi connection. Wi-Fi Aware makes contextual awareness more immediate and useful, enabling personalized applications (e.g., 26, 26', etc.) that continuously scan surroundings, anticipate actions, and notify of services and selected preferences. Wi-Fi Aware devices go through a process of discovery and synchronization, establishing a common "heartbeat" that enables very power efficient operation. Devices form clusters and exchange small messages about services available nearby, enabling immediate discovery. Wi-Fi Aware's ability to send and receive tiny messages before establishing a network 18, 18' connection further enables a two-way conversation among network devices in emergency and non-emergency situations whose current physical geographic locations and/or 2D/3D geo-space information may be known and available. This capability not only enables a network device to discover nearby information and services, but request additional information, such as emergency location information—all without establishing, an Internet, PSTN, or other network connections 18, 18'. The Wi-Fi Aware reference document, is incorporated herein by reference.

In one embodiment, the applications 26, 26' include Wi-Fi Aware capabilities. In one embodiment the wireless interfaces include Wi-Fi Aware wireless interface capabilities. However, the present invention is not limited to these embodiments and the invention can be practiced without Wi-Fi Aware capabilities.

WiMAX is an industry trade organization formed by communications component and equipment companies to promote and certify compatibility and interoperability of broadband wireless access equipment that conforms to the IEEE 802.16xx and ETSI HIPERMAN. HIPERMAN is the European standard for MANs.

The IEEE The 802.16a, 802.16c, 802.16d 802.16e and 802.16g standards are wireless MAN technology standard that provides a wireless alternative to cable, DSL and T1/E1 for last mile broadband access. It is also used as complimentary technology to connect IEEE 802.11xx hot spots to the Internet.

The IEEE 802.16a standard for 2-11 GHz is a wireless MAN technology that provides broadband wireless connectivity to fixed, portable and nomadic devices. It provides up to 50-kilometers of service area range, allows users to get broadband connectivity without needing direct line of sight with the base station, and provides total data rates of up to 280 Mbps per base station, which is enough bandwidth to simultaneously support hundreds of businesses with T1/E1-type connectivity and thousands of homes with DSL-type connectivity with a single base station. The IEEE 802.16g provides up to 100 Mbps.

The IEEE 802.16e standard is an extension to the approved IEEE 802.16/16a/16g standard. The purpose of 802.16e is to add limited mobility to the current standard which is designed for fixed operation.

The ESTI HIPERMAN standard is an interoperable broadband fixed wireless access standard for systems operating at radio frequencies between 2 GHz and 11 GHz.

The IEEE 802.16a, 802.16d, 802.16e and 802.16g standards are incorporated herein by reference. WiMAX can be used to provide a wireless local loop (WLP).

The ETSI HIPERMAN standards TR 101 031, TR 101 475, TR 101 493-1 through TR 101 493-3, TR 101 761-1 through TR 101 761-4, TR 101 762, TR 101 763-1 through TR 101 763-3 and TR 101 957 are incorporated herein by reference.

IEEE 802.15.4 (Zigbee) is low data rate network standard used for mesh network devices such as sensors, interactive toys, smart badges, remote controls, and home automation. The 802.15.4 standard provides data rates of 250 kbps, 40 kbps, and 20 kbps., two addressing modes; 16-bit short and 64-bit IEEE addressing, support for critical latency devices, such as joysticks, Carrier Sense Multiple Access/Collision Avoidance, (CSMA-CA) channel access, automatic network establishment by a coordinator, fully hand-shaked protocol for transfer reliability, power management to ensure low power consumption for multi-month to multi-year battery usage and up to 16 channels in the 2.4 GHz ISM band (Worldwide), 10 channels in the 915 MHz (US) and one channel in the 868 MHz band (Europe). The IEEE 802.15.4-2003 standard is incorporated herein by reference.

Bluetooth (IEEE 802.15.1a) is a short-range radio frequency technology aimed at simplifying communications among network devices and between network devices. Bluetooth wireless technology supports both short-range point-to-point and point-to-multipoint connections. The Bluetooth Specification, GL 11r02, March 2005, prepared by the Bluetooth SIG, Inc. and the IEEE 802.15.1a standard are incorporated herein by reference.

Infra data association (IrDA) is a short-range radio wireless Bluetooth or wireless infrared communications. Industrial, Scientific and Medical (ISM) are short-range radio wireless communications interfaces operating at 400 MHz, 800 MHz, and 900 Mhz. ISM sensors may be used to provide wireless information to practice the invention.

An RFID is an automatic identification method, relying on storing and remotely retrieving data using devices called RFID tags or transponders. An RFID tag is a small object that can be attached to or incorporated into a product, animal, or person. RFID tags contain antennas to enable them to receive and respond to radio-frequency queries from an RFID transceiver. Passive tags require no internal power source, whereas active tags require a power source. RFID sensors and/or RFID tags are used to provide wireless information to practice the invention.

Passive tags are powered by received radiation from a reading device and require no internal source of power; thus, they can be manufactured at very low cost and require no ongoing maintenance as long as they are not removed or physically damaged. Passive tags can only be read by a reader device in close proximity to the tag, which is an advantage in RFID-based in-building location services.

RFID Passive tags can be manufactured in a sticker-like form factor and held in place by adhesive, providing very low installation cost; however, such an arrangement is not heat-resistant, and conventional mechanical mounting employing screws or cover plates is advisable for at least a minimal subset of all installed tags.

RFID Passive tags are typically capable of providing a 96-bit number to a tag reader: 96 bits allow $2^{96}=10^{29}$ (100 billion billion billion) possible codes, ample to allow unique identification of every significant location within a building.

RFID active tags are employed for location awareness. Active tags have longer range and can include more sophisticated functionality. In the context of this invention, active tags may be programmed to validate their location from time to time, either by reference to Global Positioning System (GPS) signals using very long integration times, or by interrogation of other RFID tags in their vicinity.

A RFID tag which finds itself in an incorrect or unverified location is programmed to turn itself off, thus avoiding spurious location data being provided to a user; responses to incorrect location include emitting a distress signal which can be detected by a reader during building maintenance, or contacting a central location by direct wireless communications or mesh networking employing the multiplicity of companion ID tags, in order to induce maintenance personnel to diagnose and repair the problem with the subject tag.

RFID Active tags are also deployed in a mesh network that would allow information to pass from tag to tag. This type of network would allow tag and reader information to be passed from location to location and possibly from floor to floor to move the information to a central location or to the building wall ultimately making it easier to access. Active tag networks have significant functional advantages, but are relatively expensive and maintenance-intensive compared to passive tags.

Real-Time Text (RTT) is text transmitted instantly as it is being typed or created. Recipients can immediately read the message while it is being written, without waiting. Real-time text is used for conversational text, in collaboration, and in live captioning. RTT technologies include TDD/TTY devices for the deaf, live captioning for TV, a feature enhancement in instant messaging, captioning for telephony/video teleconferencing, telecommunications relay services including Internet Protocol-relay, transcription services including Remote CART, TypeWell, collaborative text editing, streaming text applications, and next-generation 9-1-1/1-1-2 emergency services.

In one embodiment, the current physical location 34 includes two-dimensional (2D) (e.g., X, Y) and/or three-dimensional (3D) (X, Y, Z), Global Positioning System (GPS) information, Cartesian coordinate information, Euclidean space information, geo-space coordinate information, geographic information and/or types of physical location information. The present invention is not limited to the type of current physical location information described and other types of physical location information can be used to practice the invention.

The Global Positioning System (GPS) is a space-based global navigation satellite system (GNSS) that provides reliable location and time information in all weather and at all times and anywhere on or near the Earth. A GPS receiver calculates its position by precisely timing signals sent by GPS satellites. A GPS receiver uses the messages it receives to determine a transit time of each message and computes a distance to each GPS satellite. These distances along with the satellites' locations are used with the possible aid of triangulation, depending on which algorithm is used, to compute a current physical position of the GPS receiver. This position is then displayed, perhaps with a moving map display (e.g., at a street level, etc.) and/or latitude and longitude (X, Y) and/or elevation and/or speed, height, depth, acceleration, de-acceleration, velocity, temperature, barometric pressure information, other pressure information and/or other information for the (Z) coordinate may also be included. Many GPS units also show derived information such as travel direction and speed, calculated from position changes. The GPS coordinates include standard GPS, GPS map, Digital GPS (DGPS) and/or other types of GPS information.

In one embodiment, (Z) component of the 3D current physical location information includes, but is not limited to, temperature, pressure, height, floor, depth, altitude, elevation, speed, acceleration information. For example, a target network device may be located at latitude and longitude (X, Y) and at with a temperature, pressure, depth, altitude, elevation, speed, and/or acceleration of (Z), etc.

A "Cartesian coordinate" system is a coordinate system that specifies each point uniquely in a plane by a pair of numerical coordinates, which are the signed distances to the point from two fixed perpendicular directed lines, measured in the same unit of length. Each reference line is called a coordinate axis or just axis (plural axes) of the system, and the point where they meet is its origin, at ordered pair (zero, zero). The coordinates can also be defined as the positions of the perpendicular projections of the point onto the two axes, expressed as signed distances from the origin.

The Cartesian coordinate system can be used to specify the position of any point in three-dimensional (3D) space by three Cartesian coordinates, its signed distances to three mutually perpendicular planes (or, equivalently, by its perpendicular projection onto three mutually perpendicular lines). In general, n Cartesian coordinates (an element of real n-space) specify the point in an n-dimensional Euclidean space for any dimension n. These coordinates are equal, up to sign, to distances from the point to n mutually perpendicular hyperplanes.

"Euclidean space information" includes a 2D or 3D dimensional space in which the axioms and postulates of Euclidean geometry apply. Euclidean space is a space in any finite number of dimensions, in which points are designated by coordinates (one for each dimension, e.g., 3D (X, Y, Z), etc.) and the distance between two points is given by a distance formula.

"Geo-space" information includes 2D (X, Y) and/or 3D (X, Y, Z) wherein the (X), (Y) and (Z) coordinates include, but are not limited to, latitude, longitude, altitude, elevation, speed, height, depth, acceleration, de-acceleration, velocity, temperature, barometric pressure information, other pressure information, magnetic information, and/other information.

The "geographic information" includes, but is not limited to, street address information for an urban area, fire district identifiers or other location information for rural areas, a desk, cubicle, room, suite, unit, apartment, building floor, a building floor in a building, a building on a street, enterprise, campus, university, school, village, town, city, state, country or continent or other global region, etc.

The present invention is not limited to the type of current physical location information described and other types of current physical location information can be used to practice the invention.

The target network devices include a protocol stack with multiple layers based on the Internet Protocol or OSI reference model. The protocol stack is used for, but not limited to, data networking. The protocol stack includes, but is not limited to, TCP, UDP, IP, Hypertext Transfer Protocol (HTTP), Simple Mail Transfer Protocol (SMTP), Post Office Protocol version 3 (POP3), Internet Mail Access Protocol (IMAP), Voice-Over-IP (VoIP), Session Initiation Protocol (SIP), Service Location Protocol (SLP), Session Description Protocol (SDP), Real-time Protocol (RTP), H.323, H.324, Domain Name System (DNS), Authentication Authorization and Accounting (AAA), instant-messaging (IM), Text-over-IP (ToIP), Internet Protocol version 4 (IPv4), Internet Protocol Version 6 (IPv6), Hybrid dual-stack IPv6/IPv4, Simple Network Management Protocol (SNMP), (Hyper Text Transfer Protocol (HTTP) Enabled Location Delivery) (HELD) Protocol, HELD+ (HELD Plus) Protocol and/or other protocols.

TCP provides a connection-oriented, end-to-end reliable protocol designed to fit into a layered hierarchy of protocols that support multi-network applications. For more information on TCP 58 see IETF RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference. An IP address includes four sets of numbers divided by period (e.g., x.x.x.x) in the range of zero to 255. An IP address is a unique string of numbers that identifies a device on an IP based network.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

Media Access Control (MAC) is a data link layer (e.g., Layer 2) protocol. A MAC address is a physical address of a device connected to a communications network, expressed as a 48-bit hexadecimal number. A MAC address is permanently assigned to each unit of most types of networking hardware, such as network interface cards (NICs) (e.g., Ethernet cards, etc.) by manufacturers at the factory.

VoIP is a set of facilities for managing the delivery of voice information using IP packets. In general, VoIP is used to send voice information in digital form in discrete data packets (i.e., IP packets) over data networks 18 rather than using traditional circuit-switched protocols used on the PSTN. VoIP is used on both wireless and wired data networks.

VoIP typically comprises several applications (e.g., SIP, SLP, SDP, H.323, H.324, DNS, AAA, etc.) that convert a voice signal into a stream of packets (e.g., IP packets) on a packet network and back again. VoIP allows voice signals to travel over a stream of data packets over a communications network 18.

SIP supports user mobility by proxying and re-directing requests to a mobile node's current location. Mobile nodes can register their current location. SIP is not tied to any particular conference control protocol. SIP is designed to be independent of a lower-layer transport protocol and can be extended. For more information on SIP, see IETF RFC-2543 and IETF 3261, the contents of both of which are incorporated herein by reference.

SLP provides a scalable framework for the discovery and selection of network services. Using SLP, network devices using the Internet need little or no static configuration of network services for network based applications. For more information on SLP see IETF RFC-2608, incorporated herein by reference.

SDP is a protocol for describing multimedia sessions for the purposes of session announcement, session invitation, and other forms of multimedia session initiation. For more information on SDP, see IETF RFC-2327, incorporated herein by reference.

RTP is a protocol for end-to-end network transport functions suitable for applications transmitting real-time data, such as audio, video or simulation data, over multicast or unicast network services. For more information on RTP, see IETF RFC-1889, incorporated herein by reference.

H.323 is one of main family of video conferencing recommendations for IP networks. The ITU-T H.323 standards entitled "Packet-based multimedia communications systems" dated 02/98, 09/99, 11/00 and 07/03 are incorporated herein by reference.

H.324 is a video conferencing recommendation using Plain Old Telephone Service (POTS) lines. The ITU-T H.324 standards entitled "Terminal for low bit-rate multimedia communication" dated 02/98 and 03/02 are incorporated herein by reference.

A Domain Name System (DNS) provides replicated distributed secure hierarchical databases that hierarchically store resource records under domain names. For more information on the DNS see IETF RFC-1034, RFC-1035, RFC-1591, RFC-2606 and RFC-2929, the contents of all of which are incorporated herein by reference.

Authentication Authorization and Accounting (AAA) includes a classification scheme and exchange format for accounting data records (e.g., for call billing, etc.). For more information on AAA applications, see, IETF RFC-2924, the contents of which are incorporated herein by reference.

VoIP services typically need to be able to connect to traditional circuit-switched voice networks such as those provided by the PSTN. Thus, VoIP is typically used with the H.323 protocol and other multimedia protocols. H.323 and H.324 terminals such as multimedia computers, handheld devices, PDAs or other devices such as non-mobile and mobile phones connect to existing wired and wireless communications networks 18 as well as private wired and wireless networks.

H.323 and H.324 terminals implement voice transmission functions and typically include at least one voice codec (e.g., ITU-T CODECS, G.711, G.723, G.726, G.728, G.729, GSM, etc.) that sends and receives packetized voice data and typically at least one video codec (e.g., MPEG, etc.) that sends and receives packetized video data).

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

Text-over-IP (ToIP) is defined IETF RFC 5194, the contents of which are incorporated herein by reference. ToIP is a framework for implementation of all required functions based on the Session Initiation Protocol (SIP) and the Real-Time Transport Protocol (RTP. This ToIP framework is specifically designed to be compatible with Voice-over-IP (VoIP), Video-over-IP, and Multimedia-over-IP (MoIP) environments. This ToIP framework also builds upon, and is compatible with, the high-level user requirements of deaf, hard-of-hearing and speech-impaired users as described in IETF RFC 3351. It also meets real-time text requirements of mainstream users. ToIP also offers an IP equivalent of analog text telephony services as used by deaf, hard-of-hearing, speech-impaired, and mainstream users. The Session Initiation Protocol (SIP) is the protocol of choice for all the necessary control and signaling required for the ToIP framework.

Internet Protocol version 6 (IPv6) is the latest version of the Internet Protocol (IP), the communications protocol that provides an identification and location system for computers on networks and routes traffic across the Internet. IPv6 was developed by the IETF to deal with the long-anticipated problem of IPv4 address exhaustion. IPv6 is described in IETF RFC 2460, incorporated herein by reference. IPv6 uses a 128-bit address, allowing $2^{128}$, or approximately $3.4 \times 10^{38}$ addresses, or more than $7.9 \times 10^{28}$ times as many as IPv4, which uses 32-bit addresses. IPv4 provides approximately 4.3 billion addresses.

Internet Protocol Version 4 (IPv4) was the first publicly used version of the Internet Protocol. IPv4 was developed as a research project by the Defense Advanced Research Projects Agency (DARPA), a United States Department of Defense agency, before becoming the foundation for the Internet and the World Wide Web. It is currently described by IETF publication RFC 791 (September 1981), the contents of which is incorporated by reference, which replaced an earlier definition (RFC 760, January 1980). IPv4 included an addressing system that used numerical identifiers consisting of 32 bits.

Hybrid dual-stack IPv6/IPv4 implementations recognize a special class of addresses, the IPv4-mapped IPv6 addresses. In these addresses, the first 80 bits are zero, the next 16 bits are one, and the remaining 32 bits are the IPv4 address.

Simple Network Management Protocol (SNMP) is a protocol for network management. It is used for collecting information from, and configuring, network devices, such as target network devices, servers, printers, hubs, switches, and routers on an Internet Protocol (IP) network. For more information on SNMP, see IETF RFC-1157, incorporated herein by reference.

(Hyper Text Transfer Protocol (HTTP) Enabled Location Delivery) (HELD) is a protocol to retrieve a location of a network device either directly in the form of a Presence Information Data Format Location Object (PIDF-LO) document (by value) or indirectly as a location Uniform Resource Identifier (URI) (by reference). For more information on HELD, see IETF RFC-5985, incorporated herein by reference.

HELD+ is an extension of the HELD protocol that adds additional emergency location information features. See IETF RFC-7480, and RFC-7852, both of which are incorporated by reference. In one embodiment, the HELD+ extensions to the HELD protocol are defined in IETF RFCs. In another embodiment, the HELD+ extensions to the HELD protocol are defined and used by individual companies providing emergency location services including, but limited to those extensions illustrated in Tables 3-5. However, the present invention is not limited to this embodiment and other embodiments, with other types of HELD+ extensions can be used to practice the invention.

The number 112 is a common emergency telephone number used outside of the United States in most countries in Europe that can be dialed free of charge from most mobile telephones and fixed telephones in order to reach emergency services (ambulance, fire and rescue, police). The 112 number is a part of the GSM standard and all GSM-compatible telephone handsets are able to dial 112 even when locked or, in some countries, with no Subscriber Identification Module (SIM) card present. It is also the common emergency number in India and in nearly all member states of the European Union as well as several other countries of Europe and the world. However, in some countries, calls to 112 are not connected directly but forwarded by the GSM network to local emergency numbers (e.g., 911 in North America or 000 in Australia, etc.). There are other emergency numbers that are used for emergencies, including, but not limited to the number 112, inside and outside of the United States.

Television Services

In one embodiment, the application 26, 26' provides emergency location services from television services via the communications network 18, 18'. These television services include digital television services, including, but not limited to, cable television, satellite television, high-definition television, three-dimensional, televisions and other types of network devices.

In one embodiment, the television services include NextGen TV ASTC 3.0. The ASTC 3.0 standard, commonly known as "NextGen TV" is the first major upgrade in broadcast TV since the transition to digital broadcasting (DTV) in 2009. NextGen TV is an Internet Protocol (IP) based system, which means it can carry internet content and services alongside the traditional over-the-air broadcast signal. The standard will enable never-before-available interactive features like video-on-demand and advanced emergency alerts for broadcast. TV, all delivered free with an over-the-air antenna. NextGen TV signals will be stronger and will transmit over greater distances and deeper into buildings, with higher-quality picture and better sound. However, the present invention is not limited to this embodiment and other television services can be used to practice the invention.

However, the present invention is not limited to such television services and more, fewer and/or other television services can be used to practice the invention.

Internet Television Services

In one embodiment, the application 26, 26' provides emergency location services from various Internet based television services via the communications network 18, 18'. The television services include Internet television, Web-TV, and/or Internet Protocol Television (IPTV) and/or other broadcast television services.

"Internet television" allows users to choose a program or the television show they want to watch from an archive of programs or from a channel directory. The two forms of viewing Internet television are streaming content directly to a media player or simply downloading a program to a viewer's set-top box, game console, computer, Internet television stick (e.g., AMAZON FIRE stick, GOOGLE TV stick, etc.) and/or other mesh network device.

"Web-TV" delivers digital content via non-mesh broadband and mobile networks. The digital content is streamed to a viewer's set-top box, game console, computer, or other mesh network device.

"Internet Protocol television (IPTV)" is a system through which Internet television services are delivered using the architecture and networking methods of the Internet Protocol Suite over a packet-switched network infrastructure, e.g., the Internet and broadband Internet access networks, instead of being delivered through traditional radio frequency broadcast, satellite signal, and/or cable television formats.

However, the present invention is not limited to such Internet Television services and more, fewer and/or other Internet Television services can be used to practice the invention.

Social Networking Services

In one embodiment, the application 26, 26' provides emergency location services from various social network services via the communications network 18, 18' to/from one or more social networking web-sites and/or applications (e.g., FACEBOOK, LINKEDIN, SNAPCHAT, YOUTUBE, TWITTER, MY-SPACE, MATCH.COM, E-HARMONY, GROUPON, SOCIAL LIVING, PINTREST, INSTAGRAM, etc.). The social networking web-sites also include, but are not limited to, social couponing sites, dating web-sites, blogs, RSS feeds, and other types of information web-sites in which messages can be left or posted for a variety of social activities. Such social networking sites include plural different proprietary and public social networking communications protocols for communications between a user and the social networking sites. Such social networking protocols may be used to send emergency messages.

However, the present invention is not limited to the social networking services described and other public and private social networking services can also be used to practice the invention.

Security and Encryption

Devices and interfaces of the present invention may include security and encryption for secure communications. Wireless Encryption Protocol (WEP) (also called "Wired Equivalent Privacy) is a security protocol for WiLANs defined in the IEEE 802.11b standard. WEP is cryptographic privacy algorithm, based on the Rivest Cipher 4 (RC4) encryption engine, used to provide confidentiality for 802.11b wireless data.

RC4 is cipher designed by RSA Data Security, Inc. of Bedford, Mass., which can accept encryption keys of arbitrary length, and is essentially a pseudo random number generator with an output of the generator being XORed with a data stream to produce encrypted data.

One problem with WEP is that it is used at the two lowest layers of the OSI model, the physical layer and the data link layer, therefore, it does not offer end-to-end security. One another problem with WEP is that its encryption keys are static rather than dynamic. To update WEP encryption keys, an individual has to manually update a WEP key. WEP also typically uses 40-bit static keys for encryption and thus provides "weak encryption," making a WEP device a target of hackers.

The IEEE 802.11 Working Group is working on a security upgrade for the 802.11 standard called "802.11i." This supplemental draft standard is intended to improve WiLAN security. It describes the encrypted transmission of data between systems 802.11X WiLANs. It also defines new encryption key protocols including the Temporal Key Integrity Protocol (TKIP). The IEEE 802.11i draft standard, version 4, completed Jun. 6, 2003, is incorporated herein by reference.

The 802.11i is based on 802.1x port-based authentication for user and device authentication. The 802.11i standard includes two main developments: Wi-Fi Protected Access (WPA) and Robust Security Network (RSN).

WPA uses the same RC4 underlying encryption algorithm as WEP. However, WPA uses TKIP to improve security of keys used with WEP. WPA keys are derived and rotated more often than WEP keys and thus provide additional security. WPA also adds a message-integrity-check function to prevent packet forgeries.

RSN uses dynamic negotiation of authentication and selectable encryption algorithms between wireless access points and wireless devices. The authentication schemes proposed in the draft standard include Extensible Authentication Protocol (EAP). One proposed encryption algorithm is an Advanced Encryption Standard (AES) encryption algorithm.

Dynamic negotiation of authentication and encryption algorithms lets RSN evolve with the state of the art in security, adding algorithms to address new threats and continuing to provide the security necessary to protect information that WiLANs carry.

The NIST developed a new encryption standard, the Advanced Encryption Standard (AES) to keep government information secure. AES is intended to be a stronger, more efficient successor to Triple Data Encryption Standard (3DES). More information on NIST AES can be found at the URL "www.nist.gov/aes."

DES is a popular symmetric-key encryption method developed in 1975 and standardized by ANSI in 1981 as ANSI X.3.92, the contents of which are incorporated herein by reference. 3DES is the encrypt-decrypt-encrypt (EDE) mode of the DES cipher algorithm. 3DES is defined in the ANSI standard, ANSI X9.52-1998, the contents of which are incorporated herein by reference. DES modes of operation are used in conjunction with the NIST Federal Information Processing Standard (FIPS) for data encryption (FIPS 46-3, October 1999), the contents of which are incorporated herein by reference.

The NIST approved a FIPS for the AES, FIPS-197. This standard specified "Rijndael" encryption as a FIPS-approved symmetric encryption algorithm that may be used by U.S. Government organizations (and others) to protect sensitive information. The NIST FIPS-197 standard (AES FIPS PUB 197, November 2001) is incorporated herein by reference.

The NIST approved a FIPS for U.S. Federal Government requirements for information technology products for sensitive but unclassified (SBU) communications. The NIST FIPS Security Requirements for Cryptographic Modules (FIPS PUB 140-2, May 2001) is incorporated herein by reference.

RSA is a public key encryption system which can be used both for encrypting messages and making digital signatures. The letters RSA stand for the names of the inventors: Rivest, Shamir and Adleman. For more information on RSA, see U.S. Pat. No. 4,405,829, now expired and incorporated herein by reference.

"Hashing" is the transformation of a string of characters into a usually shorter fixed-length value or key that represents the original string. Hashing is used to index and retrieve items in a database because it is faster to find the item using the shorter hashed key than to find it using the original value. It is also used in many encryption algorithms.

Secure Hash Algorithm (SHA), is used for computing a secure condensed representation of a data message or a data file. When a message of any length $<2^{64}$ bits is input, the SHA-1 produces a 160-bit output called a "message digest." The message digest can then be input to other security techniques such as encryption, a Digital Signature Algorithm (DSA) and others which generates or verifies a security mechanism for the message. SHA-512 outputs a 512-bit message digest. The Secure Hash Standard, FIPS PUB 180-1, Apr. 17, 1995, is incorporated herein by reference.

Message Digest-5 (MD-5) takes as input a message of arbitrary length and produces as output a 128-bit "message digest" of the input. The MD5 algorithm is intended for digital signature applications, where a large file must be "compressed" in a secure manner before being encrypted with a private (secret) key under a public-key cryptosystem such as RSA. The IETF RFC-1321, entitled "The MD5 Message-Digest Algorithm" is incorporated here by reference.

Providing a way to check the integrity of information transmitted over or stored in an unreliable medium such as a wireless network is a prime necessity in the world of open computing and communications. Mechanisms that provide such integrity check based on a secret key are called "message authentication codes" (MAC). Typically, message authentication codes are used between two parties that share a secret key in order to validate information transmitted between these parties.

Keyed Hashing for Message Authentication Codes (HMAC), is a mechanism for message authentication using cryptographic hash functions. HMAC is used with any iterative cryptographic hash function, e.g., MD5, SHA-1, SHA-512, etc. in combination with a secret shared key. The cryptographic strength of HMAC depends on the properties of the underlying hash function. The IETF RFC-2101, entitled "HMAC: Keyed-Hashing for Message Authentication" is incorporated here by reference.

An Electronic Code Book (ECB) is a mode of operation for a "block cipher," with the characteristic that each possible block of plaintext has a defined corresponding cipher text value and vice versa. In other words, the same plaintext value will always result in the same cipher text value. Electronic Code Book is used when a volume of plaintext is separated into several blocks of data, each of which is then encrypted independently of other blocks. The Electronic Code Book has the ability to support a separate encryption key for each block type.

Diffie and Hellman (DH) describe several different group methods for two parties to agree upon a shared secret in such a way that the secret will be unavailable to eavesdroppers. This shared secret is then converted into various types of cryptographic keys. A large number of the variants of the DH method exist including ANSI X9.42. The IETF RFC-2631, entitled "Diffie-Hellman Key Agreement Method" is incorporated here by reference.

However, the present invention is not limited to the security or encryption techniques described and other security or encryption techniques can also be used.

The HyperText Transport Protocol (HTTP) Secure (HTTPs or HTTPS), is a standard for encrypted communications on the World Wide Web. HTTPs is actually just HTTP over a Secure Sockets Layer (SSL). For more information on HTTP, see IETF RFC-2616 incorporated herein by reference.

The SSL protocol is a protocol layer which may be placed between a reliable connection-oriented network layer protocol (e.g. TCP/IP) and the application protocol layer (e.g. HTTP). SSL provides for secure communication between a source and destination by allowing mutual authentication, the use of digital signatures for integrity, and encryption for privacy.

The SSL protocol is designed to support a range of choices for specific security methods used for cryptography, message digests, and digital signatures. The security method are negotiated between the source and destination at the start of establishing a protocol session. The SSL 2.0 protocol specification, by Kipp E. B. Hickman, 1995, is incorporated herein by reference Transport Layer Security (TLS) provides communications privacy over the Internet and other networks. This encryption security protocol allows client/server applications to communicate over a transport layer (e.g., TCP) in a way that is designed to prevent eavesdropping, tampering, or message forgery. For more information on TLS see IETF RFCs 2246, and 6753, incorporated herein by reference.

Wearable Network Devices

"Wearable mobile technology" and/or "wearable devices" are clothing and accessories incorporating computer and advanced electronic technologies. Wearable mobile network devices provide several advantages including, but not limited to: (1) Quicker access to notifications. Important and/or summary notifications are sent to alert a user to view a whole new message. (2) Heads-up information. Digital eye wear allows users to display relevant information like directions without having to constantly glance down; (3) Always-on Searches. Wearable devices provide always-on, hands-free searches; and (4) Recorded data and feedback. Wearable devices also take telemetric data recordings and providing useful feedback for users for exercise, health, fitness, activities etc.

Digital eyewear, such as GOOGLE Glass, Smart watches by SONY, NIKE, GARMIN, SAMSUNG, APPLE, wrist bands and/or fitness bands by LG, NIKE, FITBIT, etc. and others are examples of wearable mobile devices. Just like mobile and non-mobiles phones, a current physical location 34 of such wearable mobile devices must be determine in an emergency situation.

The emergency situations, include, but are not limited to, accident, crime, fire, military, marine, natural disaster (e.g., earthquake, volcano, flood, landslide, etc.), medical, police, terrorist, military, marine, weather (e.g., hurricane, tornado, etc.), and/or other types of emergency situations. However, the present invention is not limited to this list of emergency situations, and more, fewer or other emergency situations can be used to practice the invention.

The wearable device clothing 160 includes "smart clothing," including but not limited to (1) smart tops; (2) smart bottoms; (3) smart swim suits; (4) smart medical clothing; (5) smart socks; (6) smart hats; (7) smart underwear; (8) smart shoes; and/or (9) smart suits. "Smart clothing" may consist of materials that have embedded sensors, embedded detection capabilities, or embedded devices.

The "smart tops" include for example, smart compression shirts and other types of smart shirts or tops with a heart rate capture point sensors on a front and and/or a pocket on the back for a GPS sensor, that tracks motion and heart rate metrics in real-time. The smart shirts allow broadcast of live training data allowing athletes and coaches to monitor conditioning and fitness levels. Other smart tops include micro-EMG sensors that detect which muscles are working and transfer this workout data to a smartphone via a Bluetooth core. Muscle effort, heart rate and breathing are all tracked.

Other smart tops include "smart jackets" including touch and gesture sensitive areas on jacket sleeves. Users interact with a variety of services including music and GPS map apps provided a smart phone included in a jacket pocket. A user will also be able to answer and dismiss phone calls, select music or get directions all without reaching for attached smart phone.

The "smart bottoms" includes for example, smart running shorts and running tights, sweat pants and with including sensors that monitors a host of metrics including GPS location information, cadence, ground contact time, pelvic rotation and stride length. The smart bottoms support real-time coaching with feedback sent through to wireless headphones to help improve running form and reduce the chances of injury.

The "smart swimsuits" includes for example, Swimsuits equipped with a removable medallion-style waterproof sensor that aims to prevent a person from staying too long in the sun. The smart swimsuits allow a user to enter a skin type in a companion application 26 (e.g., APPLE or ANDROID smartphone app, etc.) the application will continuously monitor the temperature throughout the day and will send out warnings when it's time to apply some more sunscreen or get into the shade.

The "smart medical clothing" includes for example, a smart compression sleeve that uses electrocardiogram (ECG) technology to monitor heart rate activity, blood pressure, blood sugar levels, etc. "Smart medical clothing" also has environmental sensors to detect radiation, contaminants, and other abnormal dangerous substances. The smart compression sleeve also has sensors to monitor body temperature, air quality and ultra violet (UV) sun rays. The smart medical clothing also includes smart medical socks and medical hats.

Smart watches also include technology that provides medical information including, but not limited to, technology to monitor heart rate activity, blood pressure, blood sugar levels, etc.

The "smart socks" include for example, includes a (1) baby socks as a monitor for babies that uses pulse oximetry technology used in hospitals and monitor heart rates to make sure the baby's breathing is appropriate. It pairs with an IPHONE or ANDROID companion app over Bluetooth to deliver data in real-time; and (2) running socks providing information on pace, distance and time and running style, which can lead to faster times and a reduced risk of injury. The socks feature three textile pressure sensors, which measure the pressure placed on the foot during running. The socks feature textile pressure sensors, which measure a pressure placed on the foot during running.

The "smart hats" for example include, a smart baby hat that monitors vital signs monitor for newborn babies. It can measure temperature, heart rate, respiratory rate and blood oxygen saturation. The baby hat can be wirelessly synced, via Bluetooth to smart phones and tablets. Doctors and nurses can check up on the vital signs of one or all babies a room at a glance and get alerts on any changes in temperature or heart rate, etc.

The "smart underwear" for example includes, smart sports bras that record distances runs, breathing rates, heart rate and calculates recovery time. The smart bra is synced, via Bluetooth to smart phones and tablets.

The "smart suits" for example, include business suits that that collect biometric weather and UV data. One smart suit includes an NFC smart suit, that lets the wearer unlock and answer their smart phone, swap business cards digitally and sync with other devices in an office such as a fax machine, printer, etc. via the NFC communications protocol.

The "smart shoes" include for example, smart shoes with a heart rate capture point sensors, a GPS sensor, motion sensors, and/or accelerometers, that track motion and heart rate metrics in real-time. The smart shoes allow broadcast of live training data allowing athletes and coaches to monitor conditioning and fitness levels. Other smart shoes include micro-EMG sensors that detect which muscles are working and transfer this workout data to a smartphone via a Bluetooth core. Muscle effort, heart rate and breathing are all tracked.

However, the present invention is not limited to the exemplary smart clothing described herein and more, fewer or other types of smart clothing can be used to practice the invention.

FIG. 2 is a block diagram with 40 illustrating exemplary wearable devices. The wearable devices include one or more processors and include, but are not limited to, wearable digital glasses 42 (e.g., GOOGLE Glass, etc.), clothing 44 (e.g., smart ties, smart headwear, smart tops and bottoms, etc.), jewelry 46 (e.g., smart rings, smart earrings, etc.), watches 48 (e.g., SONY, NIKE, SAMSUNG, NIKE, GARMIN, APPLE, etc.) and/or wrist bands or fitness bands 50 (e.g. GARMIN, FITBIT, POLAR, NIKE, JAWBONE, LG, etc.). The wearable mobile devices 42-50 includes application 26 and/or 26' to determine a current physical location 34, of the wearable network devices 42-50. The wearable devices are also wearable by animals (e.g., service dogs, pets, etc.) to provide emergency location information for the animals owner. All of the wearable devices 42-50 have one or more processors, a non-transitory computer readable medium and/or selected ones have other components including, but not limited to, accelerometers, altimeters, music control, phone compatibility, etc. However, the present invention is not limited to such embodiments and more, fewer and other types of wearable devices can also be used to practice the invention.

Location of a Target Network Device in an Emergency Situation

Figure 3C:
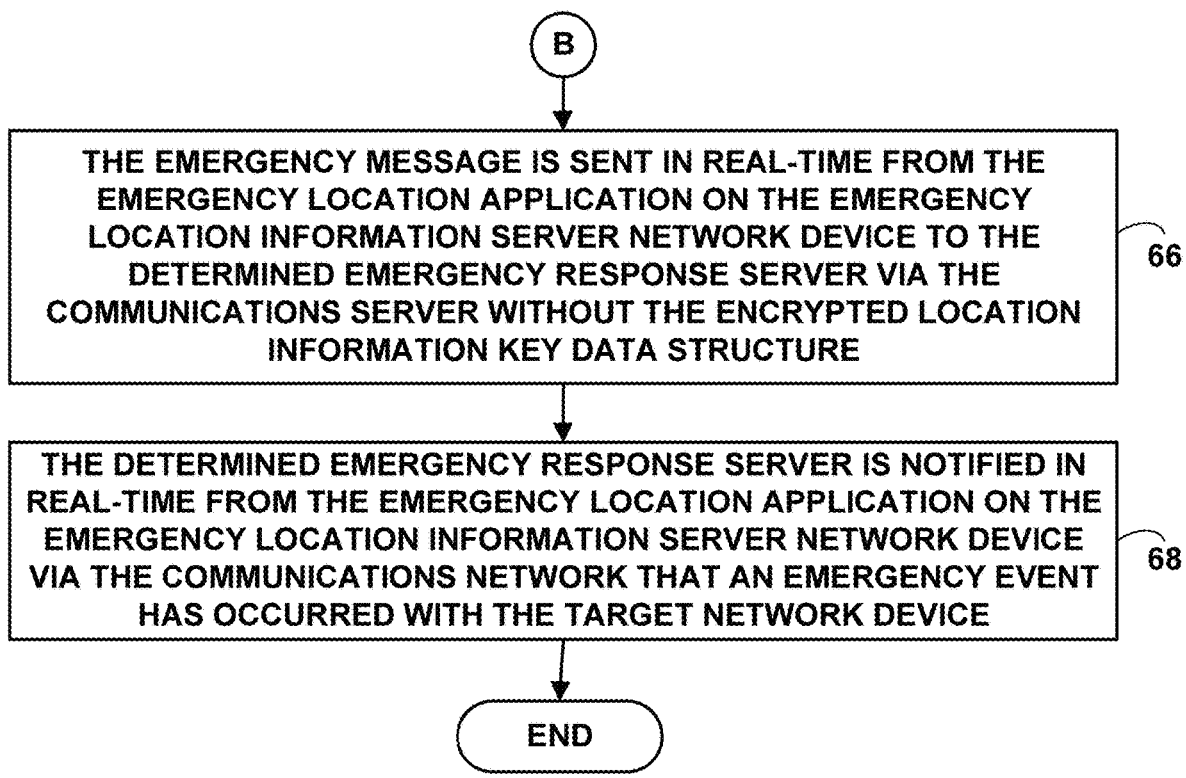

FIGS. 3A, 3B and 3C are a flow diagram illustrating a Method 52 for locating a network device in an emergency situation.

Figure 4:
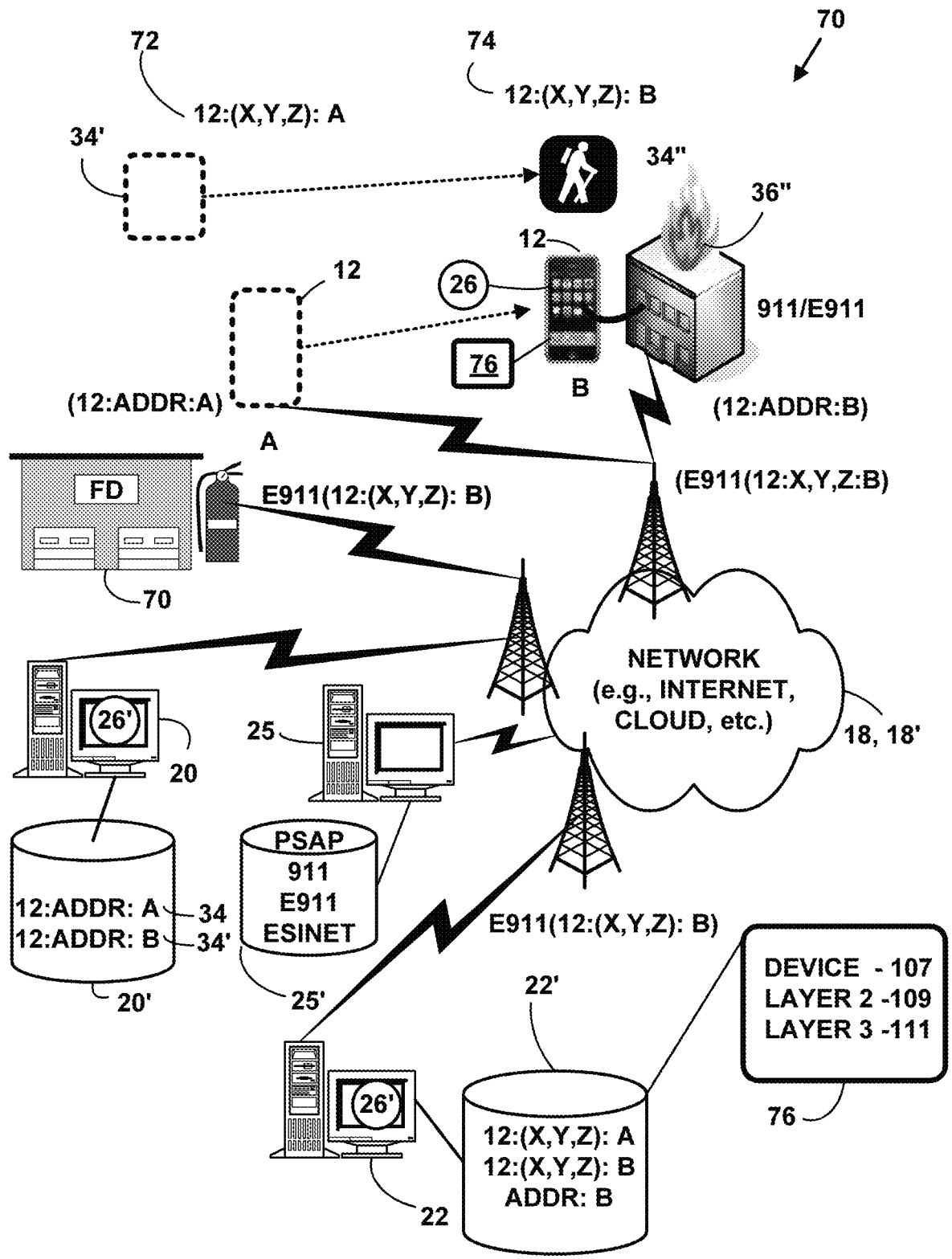
FIG. 4 is a block diagram graphically illustrating the method of FIG. 3.

FIG. 4 is a block diagram 70 graphically illustrating Method 52 of FIG. 3.

In FIG. 3A at Step 54, a first location information message is received on an emergency location application on an emergency location information server network device with one or more processors from a first server network device with one or more processors via a communications network. The first location message includes location information for a target network device with a location application and one or more processor that moved from a first physical location to a second physical location. At Step 56, the emergency location application on the emergency location information server network device determines a current physical location for the target network device at the second physical location. At Step 58, the emergency location application on the emergency location information server creates a location information key data structure for the target network device. The location information key data structure includes unique identification information for the target network device and unique identifying information for a network the target network device is currently connected to. The location information key data structure includes a database key to a relational database and is usable only by the emergency location application on the emergency location information server. In FIG. 3B at Step 60, the emergency location information application on the emergency location information server network device sends a second location information message including the location information key data structure encrypted with a pre-determined encryption method to the location application on the target network device via the communications network. At Step 62, an emergency message is received on the emergency location application on the emergency location information server network device from the first server network device via the communications network. The emergency message includes the encrypted location information key data structure and was sent to the first server network device via the communications network from the location application on the target network device upon the target network device encountering an emergency event. At Step 64, the encrypted location information key data structure is decrypted from the emergency location application on the emergency location information server network device. The emergency location application performs one or more queries to the relational database using information in decrypted location information key data structure to determine the current physical location of the target network device. The emergency location application also determines an emergency response server network device with one or more processors to send the emergency message to. In FIG. 3C at Step 66, the emergency message is sent in real-time from the emergency location application on the emergency location information server network device to the determined emergency response server via the communications network. The emergency message is sent without the encrypted location information key data structure from the emergency location application on the emergency location information server network device to the determined emergency response server. At Step 68, the determined emergency response server is notified in real-time from the emergency location application on the emergency location information server network device via the communications network that an emergency event has occurred with the target network device.

Method 52 is illustrated with one exemplary embodiment. However, the present invention is not limited to such an embodiment and other embodiments can also be used to practice the invention.

In such an exemplary embodiment at FIG. 3A at Step 54, a first location information message is received on an emergency location application 26' on an emergency location information server 22 network device with one or more processors from a first server network device 20 with one or more processors via a communications network 18, 18'. The first location message includes location information from a location application 26 on a target network device 12 with one or more processor that moved from a first physical location 34' to a second physical location 34".

In one embodiment, the first location message includes an initial location registration message for the target network device 12 at a first physical location 34' for the target network device 12. In such an embodiment, the first physical location 34' and the second physical location 34" are a same physical location. Such an embodiment is used to register the target network device 12 a first time with the system 10.

In another embodiment, first location message includes a change in location registration message for the target network device 12 as the target network device moves from the first physical location 34' to the second physical location 34".

For example in FIG. 4, target network device 12 moves from physical location A including location information (12:(X, Y, Z): A 72) to physical location B including location information (12:(X, Y, Z) :B 74).

In one embodiment, the first location information message includes dimensional (2D) (X, Y), three-dimensional (3D) (X, Y, Z), Global Positioning System (GPS) information, Cartesian coordinate information, Euclidean space information, geo-space information, geographic information and/or network information for the target network device 12. However, the present invention is not limited to this embodiment.

Returning to FIG. 3A, in one embodiment the first location information message sent from the location application 26 on the target network device 12 includes a HELD/HELD+ protocol message. However, the present invention is not limited to this embodiment and other messages and other protocols can be used to practice the invention.

In one embodiment, the location information for the target network device 12 includes Network Layer (Layer 3) Internet Protocol (IP) and/or other network information about a network the target network device 12 is currently connect to. This embodiment correlates IP address to a physical location (e.g., (X, Y), (X, Y, Z), etc.). In such an embodiment a communication network 18, 18' is typically broken up into logical subnets with each subnet having an associated current physical location. For example, all phones at 3 N. First Street., Chicago, Ill., $3^{rd}$ Floor will register and be assigned source IP addresses for the subnet on the $3^{rd}$ Floor and there will be a different subnet for each floor of the building. Each Subnet is assigned a location record and an Emergency Location Identification Number (ELIN), a ten digit phone number. When phones (e.g., mobile phones 12, non-mobile phones 38, etc.) move from one subnet to another, they re-register with the first server network device 20, get a new IP address that is associated with their new subnet, and sends a second location information message (e.g., a (Hyper Text Transfer Protocol (HTTP) Enabled Location Delivery) (HELD)/HELD+ request message, etc.) to the emergency location server network device 25 for their Location Reference Key (i.e., location information key information) data structure 76.

Since multiple networks exists on the communications network 18, 18' (e.g., wired LAN, wireless LAN, wireless LAN, Internet, WLAN, WiLAN, etc.), each individual needs a unique name. This unique network name is called a Service Set IDentifer (SSID) of the network. The target network devices can determine a SSID of an individual network.

Packets/messages bound for target network devices on an individual network need to go to the correct destination. The SSID keeps the packets within the correct network, even when overlapping networks are present. However, there are usually multiple access points within each individual network, and there has to be a way to identify those access points and their associated clients.

Another identifier is called a Basic Service Set IDentifier (BSSID) and is included in all wireless packets/messages. The BSSID is typically the MAC address of an access point on an individual network.

In one embodiment, the BSSID, is unique to a specific physical geographic location. If an enterprise is large enough to have multiple locations, the SSIDs could be identical, but the BSSID is unique to the specific physical geographic location.

An Extended Basic Service Set IDentifer (ESSID) includes of all of the BSSIDs in a network. For all practical purposes, the ESSID identifies the same network as the SSID does.

In one embodiment, the location information for the target network device 12 also includes for Logical Link Layer (Layer 2) information. This Layer 2 information is used to require precise location definition down to a desktop device such as a non-mobile phone 38 or desktop computer, etc., or have a legacy network that cannot be configured into logical subnets that correlate IP addresses to physical locations. This embodiment includes network connectivity into a local Voice over IP (VoIP) Virtual LAN (VLAN) so that it can interrogate the Layer 2 network using SNMP to find devices on Layer 2 devices and ports. This method is also used with wireless controllers (e.g., Aruba, Aerohive, and Cisco) to track devices as they move on from a communications network 18 to another network (e.g., Wi-Fi, etc.) network in real-time.

In one embodiment, only Layer 2 information is used. In another embodiment, only Layer 3 information is used. However, the present invention is not limited to these embodiments and other combinations of network device and network information and/or other layers can be used to practice the invention.

In one embodiment, a transceiver chip in the target network device 12, is used to poll existing Wi-Fi, Wi-Fi Aware, WiMax, 802.xx.xx, cellular, Bluetooth beacons, RFID, mesh and other wireless networks to determine its current physical location 34. The location application 26 on the target network device 12 with the transceiver chip uses a variety of methods to determine current location information including, signal strength, triangulation, orthogonality, etc. and the present invention is not limited to the location methods described.

"Triangulation" is the process of determining a location of a point by measuring angles to it from known points at either end of a fixed baseline, rather than measuring distances to the point directly (e.g., trilateration). The point can then be fixed as the third point of a triangle with one known side and two known angles.

"Orthogonality" is process of relating two signal at right angles to one another (i.e., perpendicularity, etc.), and the generalization of this relation into N-dimensions; and to a variety other relations non-overlapping, independent objects of some kind.

In one embodiment, plural inbound wireless signals are used by the emergency location application 26' and/or the location application 26 for Peer-to-Peer (P2P) location determination of the target network device 12 and other target network devices on the communications network 18.

In one embodiment, the first location information message includes a social media identifier (e.g., FACEBOOK, TWITTER, INSTAGRAM etc.). In another embodiment, the first location messages includes the social media identifier and associated social media based location information. Many social media platforms track a user's current physical location in real-time typically with GPS, and network information such as IP address, WiFi and/or LAN SSID, etc. Some social media platforms also include graphical map data with the location information (e.g., GOOGLE CHROME extension, MARAUDER'S MAP, used with the FACEBOOK messaging application, etc.). However, the social media location information cannot be used alone to locate a target network device 12 in an emergency situation as such social media location information does not provide an appropriate level of detail in the social media location information.

At Step 56, the emergency location application 26' on the emergency location information server network device 22 determines a current physical location 34 for the target network device 12 at the second physical location 34".

At Step 58, the emergency location application 26' on the emergency location information server network device 22 creates a location information key data structure 76 for the target network device 12. The location information key data structure 76 includes unique identification information 107 for the target network device 12 and unique identifying information for a network the target network device 12 is currently connected to 109, 111. The location information key data structure 76 also includes a database key for a relational database 22' and is usable only by the emergency location application 26' on the emergency location information server 22 and cannot be decrypted by, the target network device 12, any other target network devices or server network devices. A new location information key data structure 76 with different location information is created every time the target network device 12 changes its physical location to a new physical location.

The location information key data structure 76 is encrypted with a pre-determined encryption method (e.g., TLS, etc.) to prevent at least, including, but not limited to: (1) eavesdropping by other parties to improperly determine a location of the target network device 12 in a non-emergency situation and invade and/or compromise the privacy of a user of the target network device 12; (2) tampering by hackers who could endanger the health and safety of a user of the target device 12 in an emergency situation by altering current physical location information of the target network device 12; and (3) using the using the current location information of the target network device 12 from other target network devices and/or other server network devices without agreements with the providers of the emergency location information server 22. However, the present invention is not limited to this embodiment and other embodiments may be used to practice the invention.

The location information key data structure 76 includes a unique combination of target device 12 identification information 107 and network 18, 18' (e.g., LAN, WAN, mesh, etc.) connectivity information data 109, 111 for the target network device 12 to create a unique encrypted location key data structure 76 for the target network device 12. When encrypted, the location information key data structure 76 has no meaning to the end user of the target network device 12 and/or any other target network devices or server network device other than the emergency location information server network device 22 and cannot be encrypted/decrypted by any entity other than emergency location application 26' on the emergency location information server network device 22.

Database keys are an integral part of relational databases. They are used to establish and identify relationships between database data structures such as tables, etc. They also ensure that each record within a table can be uniquely identified with a combination of one or more fields within a table stored in the database (e.g. FIG. 5—field 88 and field 102, field 92 and field 104, etc.)

Figure 5:
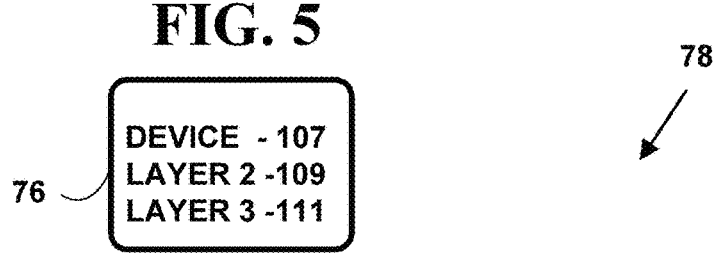
FIG. 5 is a block diagram illustrating an exemplary emergency location information table layouts.

FIG. 5 is a block diagram 78 illustrating exemplary emergency location information table layouts 80, 96 used for creating the encrypted location information key data structure 76.

However, the present invention is not limited to the data fields described and more, fewer and other XML data fields and other data structures and other layouts other than tables can be used to practice the invention.

In one embodiment, the location information key data structure 76 includes a Location Reference Key data structure 76 with an XML data structure comprising: (1) a Level 2 XML data structure component 80 (e.g., a row, column, etc.) and/or (2) a Level 3 XML data structure component 96 (e.g., a row, column, etc.) and/or a device information component 107 with current physical information (e.g., (X, Y), (X, Y, Z), etc.) for the target network device 12.

In one embodiment, the Level 2 XML data structure component includes one or more entries from a first relational database 22' table layout 80 with a network name 82 (e.g., SSID, BSSID, ESSID, etc.) switch name 84, switch port 86, target network device IP address 88, target network device MAC address 90, ELIN 92 and Emergency Response Location (ERL) 94 data fields. However, the present invention is not limited to the data fields described and more, fewer and other XML data fields and other data structures and other layouts other than tables can be used to practice the invention.

In one embodiment, the Level 3 XML data structure component includes one or more entries from second relational database 22' table layout 96 with a region 98, network name 100, IP address range 102, ELIN 104 and ERL 106 data fields. However, the present invention is not limited to the data fields described and more, fewer and other XML data fields and other data structures and other layouts other than tables can be used to practice the invention.

In one embodiment the, device information component 107 includes unique identification information for the target network devices. For example, the target network device 12 includes device information 107 comprising: (1) device type: iPhone 10; (2) owner: Sally Jones; (3) dial number: 312-552-1201; (4) current physical information (e.g., (X, Y), (X, Y, Z), GPS, geo-space etc.); and (5) social media identifier information. In another embodiment, the current physical information (e.g., (X, Y), (X, Y, Z), GPS, geo-space, etc.) is not included in the device information 107. In another embodiment, the device information component 107 further includes a social media identifier and/or social media identifier with associated location information. However, the present invention is not limited to the device information fields described and more, fewer and other device information location data fields and other data structures and other layouts other than tables can be used to practice the invention.

In this exemplary embodiment, the location information key data structure 76 includes a Layer 2 component table 80 entry, for example, including Row 1, item 109: (Network Name: P, Switch:22, Switch Port:1, Device IP address: 193.169.88.1, Device MAC address: 00-04-8B-85-80-EE, ELIN: 312-552-1201, and ERL: 3 N. First Street, Cubicle 1) and/or a Layer 3 component table 96 entry, including Row 2, item 111: (Region: 1, Network Name: Orange, IP address range: 193.169.88.1 through 193.169.88.254, ELIN of the main exchange: 312-552-1200, ERL: 3 N. First Street, Second Floor). However, the present invention is not limited to such an embodiment, and more fewer or other data fields from the relational database tables can be used to practice the invention.

Therefore, in this exemplary embodiment, the location information key data structure 76 before encryption includes device information component 107, Layer 2 component 109 and Layer 3 component 111. This key 76 is exemplary only. The present invention is not limited to the location information key data structure 76 and more, fewer and other data fields and other data structures and other data structure layouts can be used to practice the invention.

In one embodiment at Step 58, the emergency location information application 26' uses TLS encryption to encrypt/decrypt the location information key data structure 76. TLS occurs in the transport layer in the OSI network model. However, the present invention is not limited to this embodiment and other or additional encryption and/or security messages can be used to practice the invention.

Client-server location applications 26, 26' use the TLS protocol to communicate across a network 18 in a way designed to prevent eavesdropping and tampering of location information used to locate a target network device 12 in an emergency. Since applications 26, 26' can communicate either with and/or without TLS, it is necessary for the client target network device 12 to indicate to the emergency location information server network device 22 that the setup of a TLS connection is desired. One of the main ways of achieving this is to use a different port number for TLS connections, for example, using port 443 for HTTPS, etc. Another mechanism is for the client target network device 12 to make a protocol-specific request to the emergency location information server network device 22 to switch any current non-secure communications connections over the communications network 18 to communications via TLS.

Once the client target network device 12 and emergency location information server network device 22 have agreed to use TLS, they negotiate a state-based connection by using a handshaking procedure. The TLS protocols use a handshake with an asymmetric cipher to establish not only cipher settings but also a session-specific shared key with which further communication is encrypted using a symmetric cipher. During this handshake, the client target network device 12 and emergency location information server network device 22 agree on various parameters used to establish the connection's security. The handshake begins when the client target network device 12 connects to a TLS-emergency location information server network device 22 requesting a secure connection and the client target network device 12 presents a list of supported cipher suites (i.e., ciphers and/or hash functions, and/or encryption methods and/r security methods etc.). From this list, the emergency location information server network device 22 picks a cipher and hash function that it also supports and notifies the client target network device 12 of the decision.

The emergency location information server network device 22 then provides identification in the form of a digital certificate. In one embodiment, emergency location information server network device 22 provides a modified digital certificate with additional emergency location information including, but not limited to, the emergency location information included in the location information key data structure 76. However, the present invention is not limited to such an embodiment and other types of digital certificates can be used to practice the invention.

The modified digital certificate includes, but is not limited to, the emergency location information server network device 22, the trusted certificate authority (CA) that vouches for the authenticity of the certificate, the server's 22 public encryption key and the location information key data structure 76. The client target network device 12 confirms the validity of the certificate before proceeding.

In one embodiment, to generate the session keys used for the secure TLS connection, the client target network device 12 encrypts a random number with the server's 22 public key and sends the result to the emergency location information server network device 22 (which only the emergency location information server network device 22 should be able to decrypt with its private key). Both parties then use the random number to generate a unique session key for subsequent encryption and decryption of data during the session uses a key exchange method (i.e., Diffie-Hellman key exchange, etc.) to securely generate a random and unique session key for encryption and decryption that has the additional property of forward secrecy. Thus, if the emergency location information server network device's 22 private key is ever disclosed in a future event, it cannot be used to decrypt the TLS session, even if the TLS session is intercepted and recorded by a third party. This concludes the handshake and begins the secured TLS connection, which is encrypted and decrypted with the session keys until the connection closes. If any one of the above steps fails, then the TLS handshake fails and the secure TLS connection is not created.

TLS is also used for dereferencing a location Uniform Resource Identifier (URIs) unless confidentiality and integrity are provided by some other encryption or security methods. In one embodiment, target network device 12 location information recipients authenticate a network host (e.g., emergency location information server network device 22, etc.) identity with a DNS query using a domain name included in a location URI. However, the present invention is not limited to this embodiment. Pre-determined local security polices for emergency events determine what a target network device 12 and/or emergency location information server network device 22 location information recipient does if TLS authentication fails or cannot be attempted. However, the present invention is not limited to this TLS encryption method and other encryption and/or security methods (e.g., RSA, DES, WEP, etc.) at other levels (e.g., Layers 1-7, etc.) including but not limited to those described herein, can be used to practice the invention and to encrypt and decrypt the location information key data structure 76.

Returning to FIG. 3B at Step 60, the emergency location information application 26' on the emergency location information server network device 22 sends a second location information message including the encrypted location information key data structure 76 back to the location application 26 on the target network device 12 via the communications network 18. The second location information message is not sent back to the target network device 12 via the first server network device 20.

In another embodiment, the second location information message is sent back to the target network device 12 via the first server network device 20.

At Step 62, an emergency message is received on the emergency location application 26' on the emergency location information server network device 22 from the first server network device 20 via the communications network 18, 18'. The emergency message includes the encrypted location information key data structure 76 and was sent by the target network device 12 to the first server network device 20 via the communications network 18, 18' and indicates the target network device 12 has encountered an emergency event.

The emergency message includes an E911 communication message, a legacy 911 communication message, NG-911 communication message, a Common Alerting Protocol (CAP) message, a Public safety answering point (PSAP) to AutoMatic location identification (ALI) (PAM) interface protocol message, text-to-911 message, 112 message and/or other type of emergency message.

In one embodiment the target network device 12 sends the encrypted location information key data structure 76 in one or more SIP protocol messages that are used to initiate the emergency message to the first server network device 20. However, the present invention is not limited to such and embodiment and other embodiments may be used to practice the invention.

The emergency event includes an accident event, medical event, health event (e.g., disease outbreak, etc.) fire event, terrorist attack event, military event, weather event, natural disaster event (e.g., flood, earthquake, etc.) event and/or crime event. However, the present invention is not limited to such and embodiment and other embodiments including more, fewer or other emergency events may be used to practice the invention.

At Step 64, the encrypted location information key data structure 76 is decrypted from the emergency location application 26' on the emergency location information server network device 22. The emergency location application performs one or more queries to the relational database 22' using information from the decrypted location information key data structure 76 to determine the current physical location 34 of the target network device 12. The emergency location application 26' also determines an emergency response server network device 25 with one or more processors to send the emergency message to.

In FIG. 3C at Step 66, the emergency message is sent immediately in real-time from the emergency location application 26' on the emergency location information server network device 22 to the determined emergency response server 25 via the communications network 18, 18'. The emergency message is sent without the encrypted location information key data structure 76 from the emergency location application 26' on the emergency location information server network device 22 to the determined emergency response server 25.

The desired emergency response server 25 includes an E911 or 911 emergency response server, a text-to-911 server, a Public Safety Answering Point (PSAP) server, an Emergency Services IP networks (ESInet) server and/or other emergency gateway network server device and/or other emergency server network device.

In one embodiment at Step 66, emergency location application 26' on the emergency location information server network device 22 determines a desired emergency response server 25 that is closest geographically to the target network device 12 which is in turn used to notify emergency responders (e.g., police, fire, ambulance, etc.) closest to the current physical location 34 of the target network device 12. However, the present invention is not limited to such and embodiment and other embodiments may be used to practice the invention including selecting other desired emergency response server 25 with other methods.

In another embodiment, a desired emergency response server 25 is not the closest geographically to the target network device 12. In such an embodiment, the a desired emergency response server 25 closest geographically to the target network device 12 may be out of service due to the same emergency event the occurred for the target network device 12 (e.g., fire, weather event, earthquake, etc.). In such an embodiment, the emergency location application 26' on the emergency location information server network device 22 determines the closest active emergency response server 25. However, the present invention is not limited to such and embodiment and other embodiments may be used to practice the invention including selecting other desired emergency response server 25 with other methods.

At Step 68, the determined emergency response server 25 is notified in real-time from the emergency location application 26' on the emergency location information server network device 22 via the communications network 18, 18' that an emergency event has occurred with the target network device 12.

"Real-time" relates to a system 10 in which input data (e.g., emergency messages, etc.) is processed within a few milliseconds or less to a few seconds or less in time so that the input data is available immediately for use and display as output data.

In one embodiment, information is displayed in real-time on the determined emergency response server network device 25 about the emergency event (e.g., fire 36", etc.) that has occurred with the target network device 12.

In another embodiment, emergency information displayed in real-time on the emergency location information server network device 22 about the emergency event (e.g., fire 36", etc.) that has occurred with the target network device 12.

In another embodiment, emergency information displayed in real-time on both the determined emergency response server network device 25 and the on the emergency location information server network device 22 about the emergency event (e.g., fire 36", etc.) that has occurred with the target network device 12.

It has been determined based on data collected from emergency calls in the United States that for every minute emergency help does not arrive in a medical emergency, survivability of a person is reduced by ten percent. Method 52 helps improve response time by notifying emergency security and administrative personnel the instant someone dials 911 and/or texts 911 by sending a "screen popup" alert with a loud audio and/or audio/video alarm to security network devices and other network devices associated with the determined emergency response server 25 that includes the full current physical location information for the target network device 12. SMS/text messages are also sent to mobile security response teams and email notifications sent to administrators. The entire process is time-stamped and logged for audit purposes.

Figure 6:
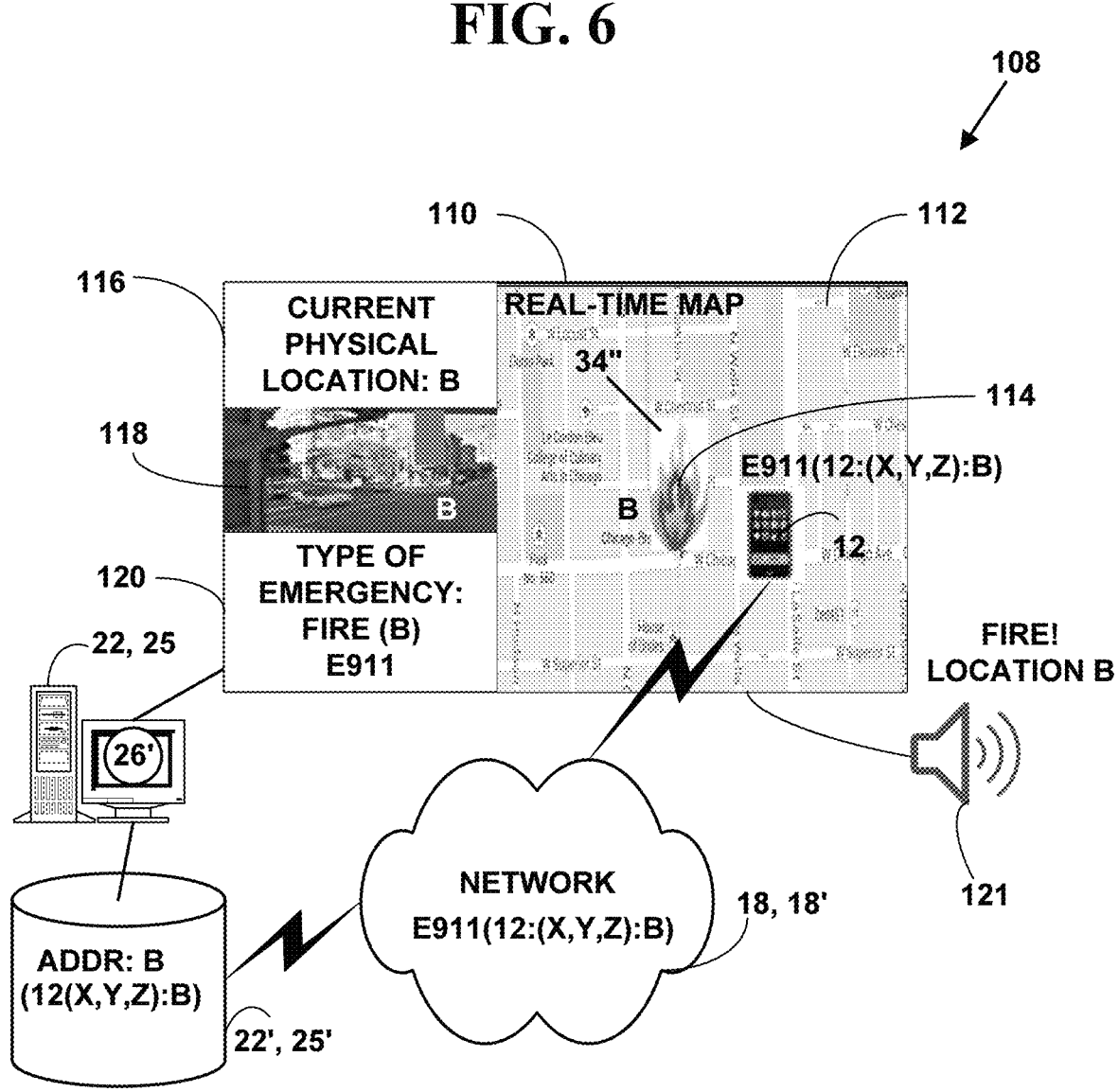
FIG. 6 is a block diagram illustrating a graphical emergency location information system graphical display interface.

FIG. 6 is a block diagram 108 illustrating a graphical emergency location information system graphical display interface 110 for displaying information determined by the method of FIG. 3 and FIG. 9 and the other emergency location methods described herein.

The graphical display system interface 110, includes, but is not limited to a real-time map portion 112 including a graphical location marker 114 (e.g., for the target device 12, etc.) including a location of a type of emergency (e.g. fire, accident, etc.), a determined current physical location portion 116 including the determined currently physical location 34 of the target network device 12, a picture portion 118 including a digital picture of the determined currently physical location 34, of the target network device 12 and an emergency information portion 120 including information about the type of emergency event and an audio component 121 for sending out audio emergency alerts or tones. However, the present invention is not limited to such an embodiment and more, fewer and other types of portions can be used to display emergency information on the display system interface 110.

Method 52 allows a current physical location of any type of target network device to be accurately determine during an emergency event.

In one exemplary embodiment, for example, all employees of a business are assigned a non-mobile desk phone 38. Method 52 enables non-mobile desk phones 38 (e.g., target network device 38 with location application 26, etc.) to ask for its current physical location 34 whenever it moves from a first physical location 34' to second physical location 34" within a selected enterprise (e.g., when an employee moves to a new office, is assigned to a new group, starts working as a new employee, etc.) The desk phone 38 sends its new second physical location 34" (i.e., new current physical location) when it dials 911. Method 52 intelligently routes all emergency calls/message to their correct Public Safety Answering Point (PSAP) based on the current physical location of the non-mobile desk phone 38 a caller is making an emergency call from.

In another exemplary embodiment, for example, all employees of a business are assigned mobile smart phones 12. Method 52 enables mobile smart phones 12 (e.g., target network device 12 with location application 26, etc.) to ask for its current physical location 34 when it moves from a first physical location 34' to second physical location 34" within a selected enterprise (e.g., anytime during any day the employee moves to a new location at work, to a floor, cubicle, cafeteria, conference room, etc.). The mobile smart phones 12 send their new second physical location (i.e., new current physical location 34) when it dials 911 or texts 911. Method 52 intelligently routes all emergency calls/texts to their correct Public Safety Answering Point (PSAP) based on the current physical location of a mobile phone a caller is making an emergency call from.

In another exemplary embodiments, the employees of a company are assigned a mix of non-mobile desk phone 38 and mobile smart phones 12.

In another exemplary embodiment, for example, all employees of a business are assigned a wearable network device 42-50 comprising, for example, wearable watch 48 including telephone capabilities. Method 52 enables the wearable watch 48 (with location application 26, etc.) to ask for its current physical location 34 when it moves from a first physical location 34' to second physical location 34" within a selected enterprise (e.g., anytime during any day the employee moves to a new location at work). The wearable watches 48 send their new second physical location 34" (i.e., new current physical location 34) when it dials 911 or texts 911. Method 52 intelligently routes all 911 calls to their correct Public Safety Answering Point (PSAP) based on the current physical location of a wearable watch a caller is making an emergency call from.

However, the present invention is not limited to such exemplary embodiments and more, fewer and other types combinations of mobile and non-mobile network devices can be used to practice the invention.

Figure 7:
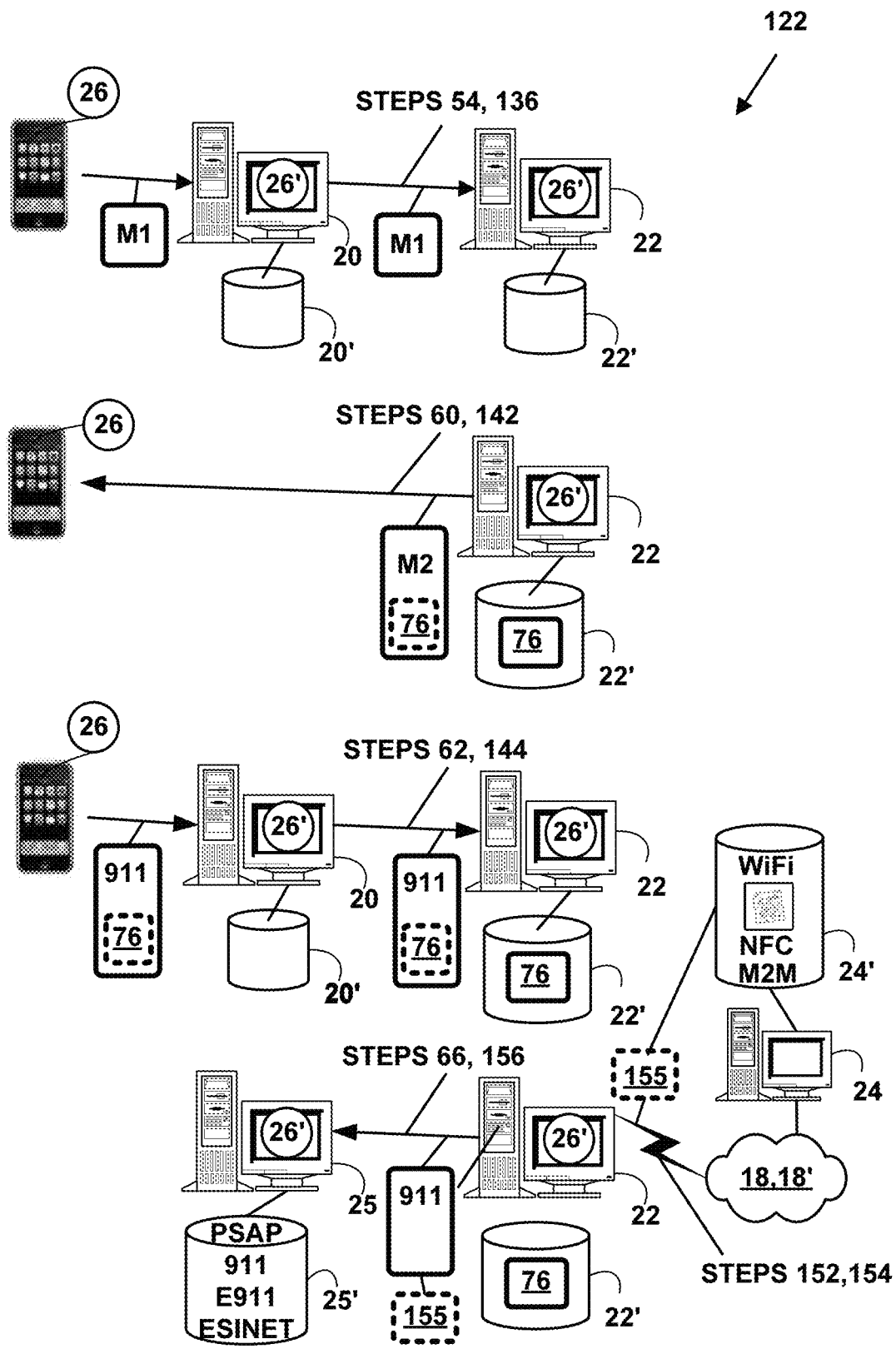
FIG. 7 is a block diagram visually illustrating a data flow for the method of FIG. 3.

FIG. 7 is a block diagram 122 visually illustrating a data flow for the methods of FIG. 3 and FIG. 9.

Figure 8:
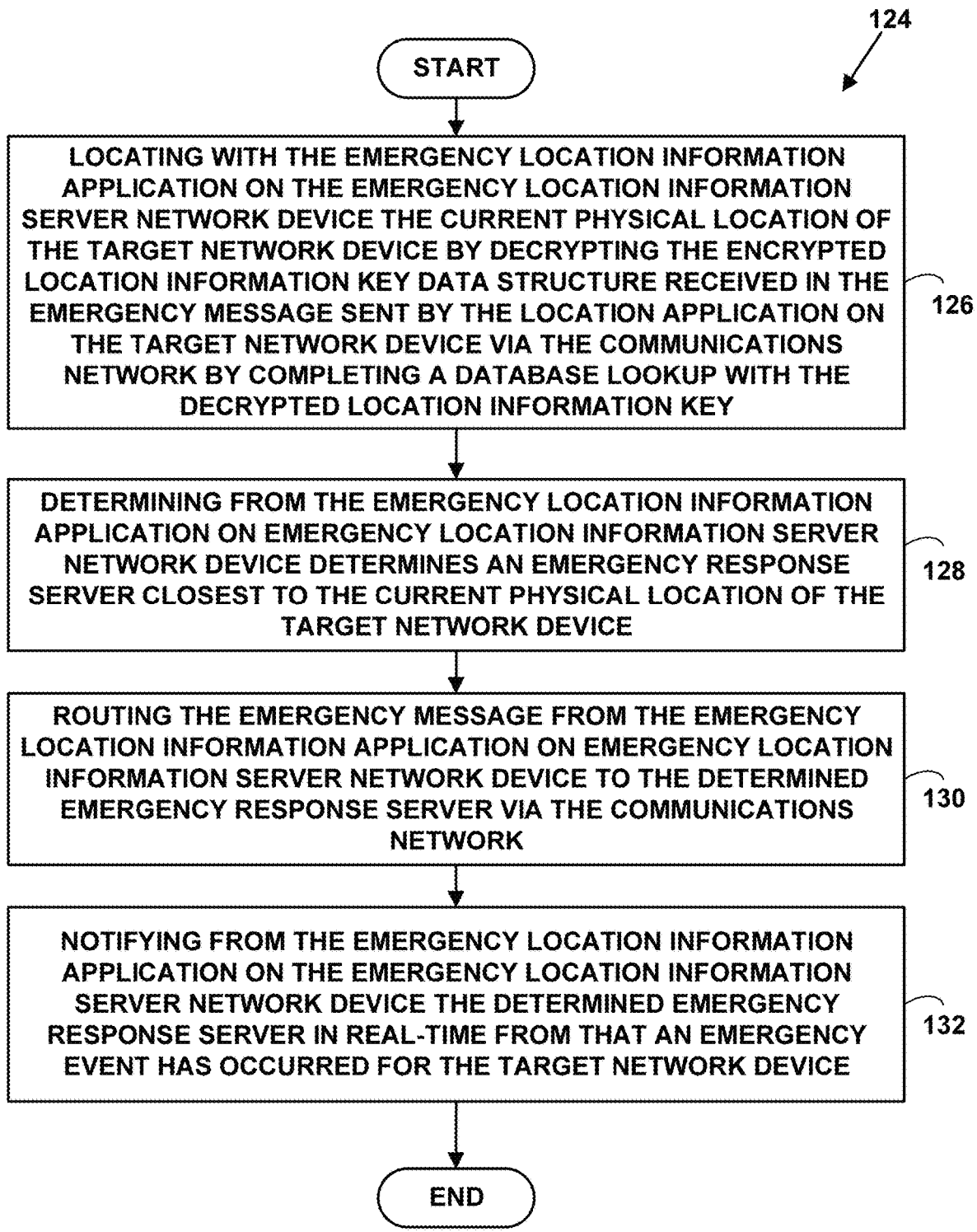
FIG. 8 is a flow diagram illustrating a method for locating a network device in an emergency situation.

FIG. 8 is a flow diagram illustrating a Method 124 for locating a network device in an emergency situation.

In FIG. 8 at Step 126, the emergency location information application on the emergency location information server network device locates the current physical location of the target network device by decrypting the encrypted location information key data structure received in the emergency message sent by the location application on the target network device via the communications network by completing a database lookup with the decrypted location information key. At Step 128, the emergency location information application on emergency location information server network device determines an emergency response server closest to the current physical location of the target network device. At Step 130, the emergency location information application on emergency location information server network device routes the emergency message to the determined emergency response server via the communications network. At Step 132, the emergency location information application on the emergency location information server network device notifies the determined emergency response server in real-time from that an emergency event has occurred for the target network device.

Method 124 is illustrated with one exemplary embodiment. However, the present invention is not limited to such an embodiment and other embodiments can also be used to practice the invention.

In such an exemplary embodiment at Step 126, the emergency location information application 26' on the emergency location information server network device 22 locates the current physical location 34 of the target network device 12 by decrypting the encrypted location information key data structure 76 received in the emergency message sent by the location application 26 on the target network device 12 via the communications network 18, 18' by completing a database 22' lookup with the decrypted location information key 76.

At Step 128, the emergency location information application 26' on emergency location information server network device 22 determines an emergency response server 25 closest to the current physical location 34 of the target network device 12.

In one embodiment at Step 128, emergency location application 26' on the emergency location information server network device 22 determines a desired emergency response server 25 that is closest geographically to the target network device 12 which is in turn used to notify emergency responders (e.g., police, fire, ambulance, etc.) closest to the current physical location 34 of the target network device 12. However, the present invention is not limited to such and embodiment and other embodiments may be used to practice the invention including selecting other desired emergency response server 25 with other methods.

In another embodiment at Step 128, a desired emergency response server 25 is not the closest geographically to the target network device 12. In such an embodiment, the a desired emergency response server 25 closest geographically to the target network device 12 may be out of service due to the same emergency event the occurred for the target network device 12 (e.g., fire, weather event, earthquake, etc.). The desired emergency response server 25 may also not be a server anywhere close to the current physical location 34 of the target network device as a result of how routing of emergency messages is completed on the communications network 18, 18'. In such an embodiment, the emergency location application 26' on the emergency location information server network device 22 determines a desired active emergency response server 25. However, the present invention is not limited to such and embodiment and other embodiments may be used to practice the invention including selecting other desired emergency response server 25 with other methods.

At Step 130, the emergency location information application 26' on emergency location information server network device 22 routes the emergency message to the determined emergency response server 25 via the communications network 18, 18'

At Step 132, the emergency location information application 26' on the emergency location information server network device 22 notifies the determined emergency response server 25 in real-time from that an emergency event has occurred for the target network device 12.

Methods 52 and 124 provide secure "Find, Route, Notify®" technologies to accurately notify and dispatch emergency responders after an emergency event has occurred with a target network device.

Enhanced Emergency Location Information for Emergency Situations

Figure 9B:
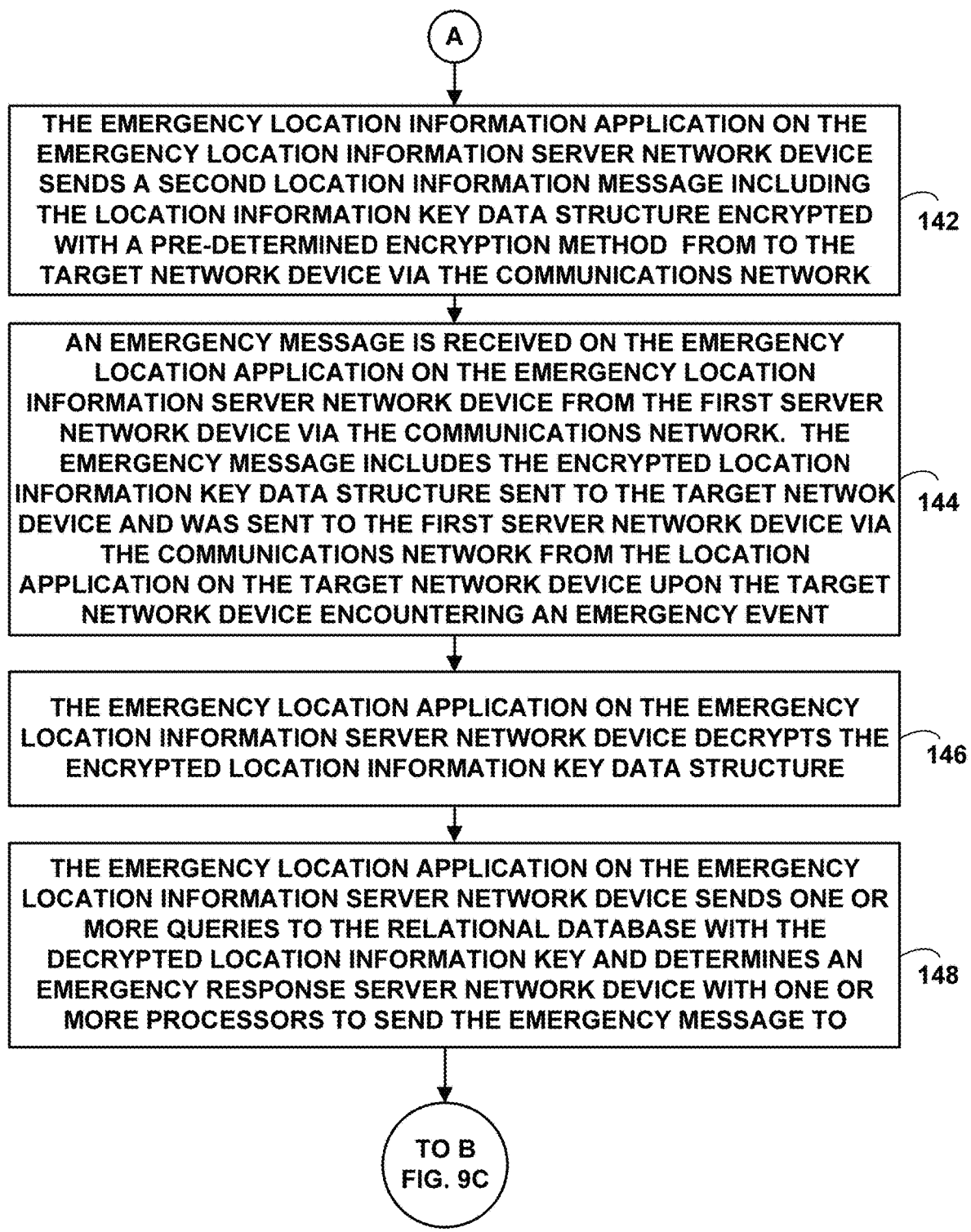
Figure 9C:
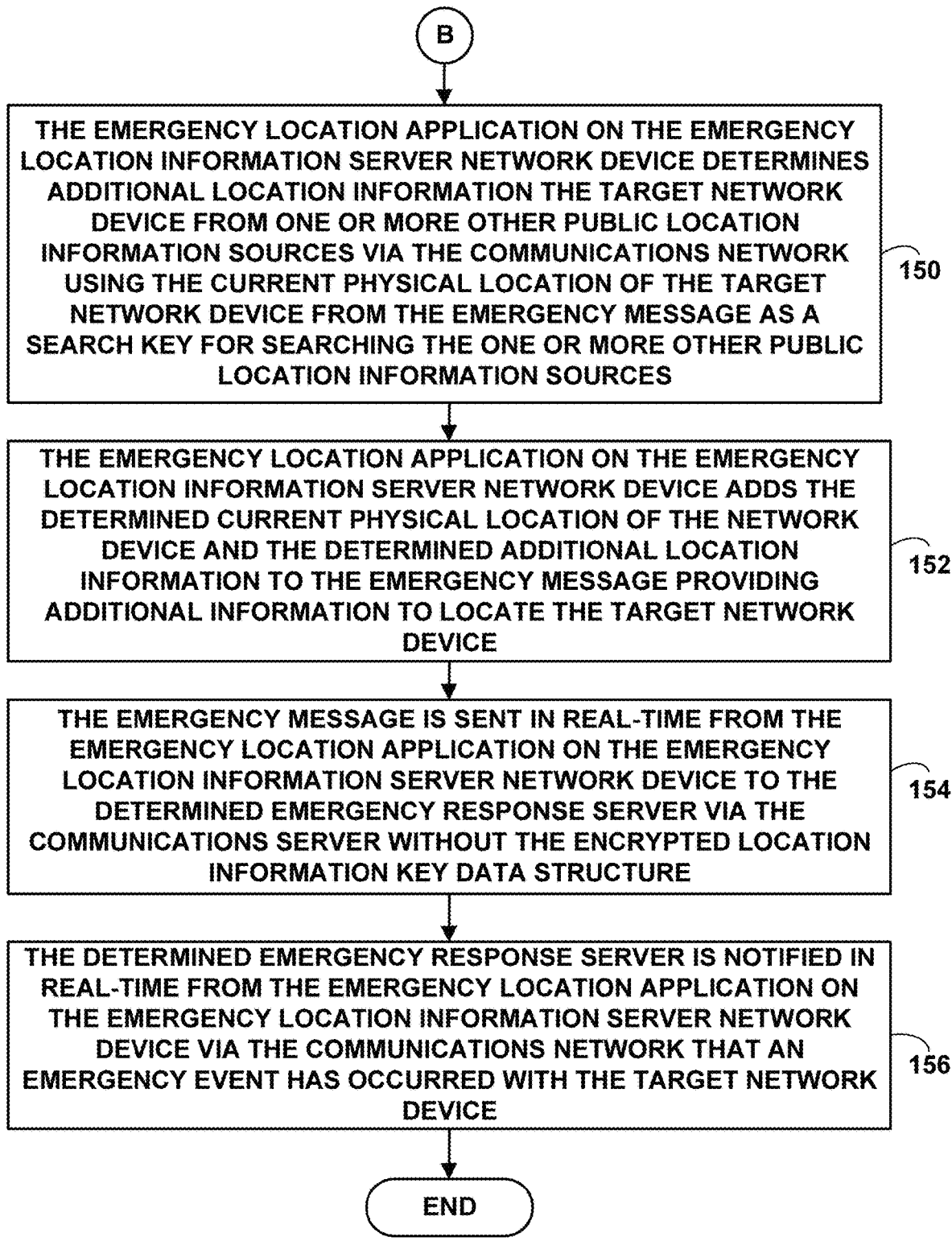

FIGS. 9A, 9B and 9C are a flow diagram illustrating a Method 134 for locating a network device in an emergency situation.

The emergency situations, include, but are not limited to, accident, crime, fire, military, marine, natural disaster (e.g., earthquake, volcano, flood, landslide, etc.), medical, police, terrorist, military, marine, weather (e.g., hurricane, tornado, etc.), and/or other types of emergency situations. However, the present invention is not limited to this list of emergency situations, and more, fewer or other emergency situations can be used to practice the invention.

In FIG. 9A at Step 136, a first location information message is received on an emergency location application on an emergency location information server network device with one or more processors from a first server network device with one or more processors via a communications network. The first location message includes location information for a target network device with a location application and one or more processor that moved from a first physical location to a second physical location. At Step 138, the emergency location application on the emergency location information server network device determines a current physical location for the target network device at the second physical location. At Step 140, the emergency location application on the emergency location information server creates a location information key data structure for the target network device. The location information key data structure includes unique identification information for the target network device and unique identifying information for a network the target network device is currently connected to. The location information key data structure includes a database key to a relational database and is usable only by the emergency location application on the emergency location information server. In FIG. 9B at Step 142, the emergency location information application on the emergency location information server network device sends a second location information message including the location information key data structure encrypted with a pre-determined encryption method to the location application on the target network device via the communications network. At Step 144, an emergency message is received on the emergency location application on the emergency location information server network device from the first server network device via the communications network. The emergency message includes the encrypted location information key data structure and was sent to the first server network device via the communications network from the location application on the target network device upon the target network device encountering an emergency event. At Step 146, the encrypted location information key data structure is decrypted from the emergency location application on the emergency location information server network device. At Step 148, the emergency location application performs one or more queries to the relational database using information in decrypted location information key data structure to determine the current physical location of the target network device. The emergency location application also determines an emergency response server network device with one or more processors to send the emergency message to. In FIG. 9C at Step 150, the emergency location application on the emergency location information server network device determines additional location information the target network device from one or more other public location information sources via the communications network using the current physical location of the target network device from the emergency message as a search key for searching the one or more other public location information sources. At Step 152, the emergency location application on the emergency location information server network device adds the determined current physical location of the network device and the determined additional location information to the emergency message providing additional information to locate the target network device. At Step 154, the emergency message with the determined additional location information is sent in real-time from the emergency location application on the emergency location information server network device to the determined emergency response server via the communications network. The emergency message is sent without the encrypted location information key data structure from the emergency location application on the emergency location information server network device to the determined emergency response server. At Step 156, the determined emergency response server is notified in real-time from the emergency location application on the emergency location information server network device via the communications network that an emergency event has occurred with the target network device.

Method 134 is illustrated with one exemplary embodiment. However, the present invention is not limited to such an embodiment and other embodiments can also be used to practice the invention.

In such an exemplary embodiment at FIG. 9A at Step 136, a first location information message is received on an emergency location application 26' on an emergency location information server 22 network device with one or more processors from a first server network device 20 with one or more processors via a communications network 18, 18'. The first location message includes location information from a location application 26 on a target network device 12 with one or more processor that moved from a first physical location 34' to a second physical location 34".

In one embodiment, the first location message includes an initial location registration message for the target network device 12 at a first physical location 34' for the target network device 12. In such an embodiment, the first physical location 34' and the second physical location 34" are a same physical location. Such an embodiment is used to register the target network device 12 a first time with the system 10.

In another embodiment, first location message includes a change in location registration message for the target network device 12 as the target network device moves from the first physical location 34' to the second physical location 34".

For example in FIG. 4, target network device 12 moves from physical location A including location information (12:(X, Y, Z): A 72) to physical location B including location information (12:(X, Y, Z): B 74).

In one embodiment, the first location information message includes dimensional (2D) (X, Y), three-dimensional (3D) (X, Y, Z), Global Positioning System (GPS) information, Cartesian coordinate information, Euclidean space information, geo-space information, geographic information and/or network information for the target network device 12. However, the present invention is not limited to this embodiment.

Returning to FIG. 9A, in one embodiment the first location information message sent from the location application 26 on the target network device 12 includes a HELD and/or a HELD+ protocol message. However, the present invention is not limited to this embodiment and other messages and other protocols can be used to practice the invention.

In one embodiment, the location information for the target network device 12 includes Network Layer (Layer 3) Internet Protocol (IP) and/or other network information about a network the target network device 12 is currently connect to. This embodiment correlates IP address to a physical location (e.g., (X, Y), (X, Y, Z), etc.). In such an embodiment a communication network 18, 18' is typically broken up into logical subnets with each subnet having an associated current physical location. For example, all phones at 3 N. First Street, Chicago, Ill., 3$^{rd}$ Floor will register and be assigned source IP addresses for the subnet on the 3$^{rd}$ Floor and there will be a different subnet for each floor of the building. Each Subnet is assigned a location record and an Emergency Location Identification Number (ELIN), a ten digit phone number. When phones (e.g., mobile phones 12, non-mobile phones 38, etc.) move from one subnet to another, they re-register with the first server network device 20, get a new IP address that is associated with their new subnet, and sends a second location information message (e.g., a (Hyper Text Transfer Protocol (HTTP) Enabled Location Delivery) (HELD)/HELD+ request message, etc.) to the emergency location server network device 25 for their Location Reference Key (i.e., location information key information) data structure 76.

Since multiple networks exists on the communications network 18, 18' (e.g., wired LAN, wireless LAN, wireless LAN, Internet, WLAN, WiLAN, etc.), each individual needs a unique name. This unique network name is called a Service Set IDentifer (SSID) of the network. The target network devices can determine a SSID of an individual network.

Packets/messages bound for target network devices on an individual network need to go to the correct destination. The SSID keeps the packets within the correct network, even when overlapping networks are present. However, there are usually multiple access points within each individual network, and there has to be a way to identify those access points and their associated clients. This identifier is called a Basic Service Set IDentifier (BSSID) and is included in all wireless packets/messages. The BSSID is typically the MAC address of an access point on an individual network.

An Extended Basic Service Set IDentifer (ESSID) includes of all of the BSSIDs in a network. For all practical purposes, the ESSID identifies the same network as the SSID does.

In one embodiment, the location information for the target network device 12 also includes for Logical Link Layer (Layer 2) information. This Layer 2 information is used to require precise location definition down to a desktop device such as a non-mobile phone 38 or desktop computer, etc., or have a legacy network that cannot be configured into logical subnets that correlate IP addresses to physical locations. This embodiment includes network connectivity into a local Voice over IP (VoIP) Virtual LAN (VLAN) so that it can interrogate the Layer 2 network using SNMP to find devices on Layer 2 devices and ports. This method is also used with wireless controllers (e.g., Aruba, Aerohive, and Cisco) to track devices as they move on from a communications network 18 to another network (e.g., Wi-Fi, etc.) network in real-time.

In one embodiment, only Layer 2 information is used. In another embodiment, only Layer 3 information is used. However, the present invention is not limited to these embodiments and other combinations of network device and network information and/or other layers can be used to practice the invention.

In one embodiment, a transceiver chip in the target network device 12, is used to poll existing Wi-Fi, Wi-Fi Aware, WiMax, 802.xx.xx, cellular, Bluetooth beacons, RFID, mesh and other wireless networks to determine its current physical location 34. The location application 26 on the target network device 12 with the transceiver chip uses a variety of methods to determine current location information including, signal strength, triangulation, orthogonality, etc. and the present invention is not limited to the location methods described.

"Triangulation" is the process of determining a location of a point by measuring angles to it from known points at either end of a fixed baseline, rather than measuring distances to the point directly (e.g., trilateration). The point can then be fixed as the third point of a triangle with one known side and two known angles.

"Orthogonality" is process of relating two signal at right angles to one another (i.e., perpendicularity, etc.), and the generalization of this relation into N-dimensions; and to a variety other relations non-overlapping, independent objects of some kind.

In one embodiment, plural inbound wireless signals are used by the emergency location application 26' and/or the location application 26 for Peer-to-Peer (P2P) location determination of the target network device 12 and other target network devices on the communications network 18.

In one embodiment, the first location information message includes a social media identifier (e.g., FACEBOOK, TWITTER, INSTAGRAM etc.). In another embodiment, the first location messages includes the social media identifier and associated social media based location information. Many social media platforms track a user's current physical location in real-time typically with GPS, and network information such as IP address, WiFi and/or LAN SSID, etc. Some social media platforms also include graphical map data with the location information (e.g., GOOGLE GHROME extension, MARAUDER'S MAP, used with the FACEBOOK messaging application, etc.). However, the social media location information cannot be used alone to locate a target network device 12 in an emergency situation as such social media location information does not provide an appropriate level of detail in the social media location information.

Returning to FIG. 9A at Step 138, the emergency location application 26' on the emergency location information server network device 22 determines a current physical location 34 for the target network device 12 at the second physical location 34". 1003101 In one embodiment, Step 138, further includes the functionality of Step 150 to obtain additional public location information 155 (FIG. 7) from public location information sources 24 about a current physical location 34, 34', 34" for the target network device 12. In such an embodiment, the additional public location information 155 is added to the location information key data structure 76 created at Step 140 (and Step 150). However, the present invention is not limited to this embodiment and the invention can be practiced with obtained additional public information at Step 138.

At Step 140, the emergency location application 26' on the emergency location information server network device 22 creates a location information key data structure 76 for the target network device 12. The location information key data structure 76 includes unique identification information 107 for the target network device 12 and unique identifying information for a network the target network device 12 is currently connected to 109, 111. The location information key data structure 76 also includes a database key for a relational database 22' and is usable only by the emergency location application 26' on the emergency location information server 22 and cannot be decrypted by, the target network device 12, any other target network devices or server network devices. A new location information key data structure 76 with different location information is created every time the target network device 12 changes its physical location to a new physical location.

In one embodiment, Step 140, further includes the functionality of Step 152 to store the additional location information 155 obtained from public location information data sources 24 about the current physical location 34, 34', 34" for the target network device 12 in the created location information key data structure 76. However, the present invention is not limited to this embodiment and the invention can be practiced with obtained additional public information at Step 140.

The location information key data structure 76 is encrypted with a pre-determined encryption method (e.g., TLS, etc.) to prevent at least, including, but not limited to: (1) eavesdropping by other parties to improperly determine a location of the target network device 12 in a non-emergency situation and invade and/or compromise the privacy of a user of the target network device 12; (2) tampering by hackers who could endanger the health and safety of a user of the target device 12 in an emergency situation by altering current physical location information of the target network device 12; and (3) using the using the current location information of the target network device 12 from other target network devices and/or other server network devices without agreements with the providers of the emergency location information server 22. However, the present invention is not limited to this embodiment and other embodiments may be used to practice the invention.

The location information key data structure 76 includes a unique combination of target device 12 identification information 107 and network 18, 18' (e.g., LAN, WAN, mesh, etc.) connectivity information data 109, 111 for the target network device 12 to create a unique encrypted location key data structure 76 for the target network device 12. When encrypted, the location information key data structure 76 has no meaning to the end user of the target network device 12 and/or any other target network devices or server network device other than the emergency location information server network device 22 and cannot be encrypted/decrypted by any entity other than emergency location application 26' on the emergency location information server network device 22.

Database keys are an integral part of relational databases. They are used to establish and identify relationships between database data structures such as tables, etc. They also ensure that each record within a table can be uniquely identified with a combination of one or more fields within a table stored in the database (e.g. FIG. 5—field 88 and field 102, field 92 and field 104, etc.)

FIG. 5 is a block diagram 78 illustrating exemplary emergency location information table layouts 80, 96 used for creating the encrypted location information key data structure 76.

However, the present invention is not limited to the data fields described and more, fewer and other XML data fields and other data structures and other layouts other than tables can be used to practice the invention.

In one embodiment, the location information key data structure 76 includes a Location Reference Key data structure 76 with an XML data structure comprising: (1) a Level 2 XML data structure component 80 (e.g., a row, column, etc.) and/or (2) a Level 3 XML data structure component 96 (e.g., a row, column, etc.) and/or a device information component 107 with current physical information (e.g., (X, Y), (X, Y, Z), etc.) for the target network device 12.

In one embodiment, the Level 2 XML data structure component includes one or more entries from a first relational database 22' table layout 80 with a network name 82 (e.g., SSID, BSSID, ESSID, etc.) switch name 84, switch port 86, target network device IP address 88, target network device MAC address 90, ELIN 92 and Emergency Location Name (ELN) 94 data fields. However, the present invention is not limited to the data fields described and more, fewer and other XML data fields and other data structures and other layouts other than tables can be used to practice the invention.

In one embodiment, the Level 3 XML data structure component includes one or more entries from second relational database 22' table layout 96 with a region 98, network name 100, IP address range 102, ELIN 104 and ELN 106 data fields. However, the present invention is not limited to the data fields described and more, fewer and other XML data fields and other data structures and other layouts other than tables can be used to practice the invention.

In one embodiment the, device information component 107 includes unique identification information for the target network devices. For example, the target network device 12 includes device information 107 comprising: (1) device type: iPhone 10; (2) owner: Sally Jones; (3) dial number: 312-552-1201; (4) current physical information (e.g., (X, Y), (X, Y, Z), GPS, geo-space etc.); and (5) social media identifier information. In another embodiment, the current physical information (e.g., (X, Y), (X, Y, Z), GPS, geo-space, etc.) is not included in the device information 107. In another embodiment, the device information component 107 further includes a social media identifier and/or social media identifier with associated location information. However, the present invention is not limited to the device information fields described and more, fewer and other device information location data fields and other data structures and other layouts other than tables can be used to practice the invention.

In this exemplary embodiment, the location information key data structure 76 includes a Layer 2 component table 80 entry, for example, including Row 1, item 109: (Network Name: P, Switch:22, Switch Port:1, Device IP address: 193.169.88.1, Device MAC address: 00-04-8B-85-80-EE, ELIN: 312-552-1201, and ERL: 3 N. First Street, Cubicle 1) and/or a Layer 3 component table 96 entry, including Row 2, item 111: (Region: 1, Network Name: Orange, IP address range: 193.169.88.1 through 193.169.88.254, ELIN of the main exchange: 312-552-1200, ERL: 3 N. First Street, Second Floor). However, the present invention is not limited to such an embodiment, and more fewer or other data fields from the relational database tables can be used to practice the invention.

Therefore, in this exemplary embodiment, the location information key data structure 76 before encryption includes device information component 107, Layer 2 component 109 and Layer 3 component 111. This key 76 is exemplary only. The present invention is not limited to the location information key data structure 76 and more, fewer and other data fields and other data structures and other data structure layouts can be used to practice the invention.

In one embodiment at Step 58, the emergency location information application 26' uses TLS encryption to encrypt/decrypt the location information key data structure 76. TLS occurs in the transport layer in the OSI network model. However, the present invention is not limited to this embodiment and other or additional encryption and/or security messages can be used to practice the invention.

Client-server location applications 26, 26' use the TLS protocol to communicate across a network 18 in a way designed to prevent eavesdropping and tampering of location information used to locate a target network device 12 in an emergency. Since applications 26, 26' can communicate either with and/or without TLS, it is necessary for the client target network device 12 to indicate to the emergency location information server network device 22 that the setup of a TLS connection is desired. One of the main ways of achieving this is to use a different port number for TLS connections, for example, using port 443 for HTTPS, etc. Another mechanism is for the client target network device 12 to make a protocol-specific request to the emergency location information server network device 22 to switch any current non-secure communications connections over the communications network 18 to communications via TLS.

Once the client target network device 12 and emergency location information server network device 22 have agreed to use TLS, they negotiate a state-based connection by using a handshaking procedure. The TLS protocols use a handshake with an asymmetric cipher to establish not only cipher settings but also a session-specific shared key with which further communication is encrypted using a symmetric cipher. During this handshake, the client target network device 12 and emergency location information server network device 22 agree on various parameters used to establish the connection's security. The handshake begins when the client target network device 12 connects to a TLS-emergency location information server network device 22 requesting a secure connection and the client target network device 12 presents a list of supported cipher suites (i.e., ciphers and/or hash functions, and/or encryption methods and/r security methods etc.). From this list, the emergency location information server network device 22 picks a cipher and hash function that it also supports and notifies the client target network device 12 of the decision.

The emergency location information server network device 22 then provides identification in the form of a digital certificate. In one embodiment, emergency location information server network device 22 provides a modified digital certificate with additional emergency location information including, but not limited to, the emergency location information included in the location information key data structure 76. However, the present invention is not limited to such an embodiment and other types of digital certificates can be used to practice the invention.

The modified digital certificate includes, but is not limited to, the emergency location information server network device 22, the trusted certificate authority (CA) that vouches for the authenticity of the certificate, the server's 22 public encryption key and the location information key data structure 76. The client target network device 12 confirms the validity of the certificate before proceeding.

In one embodiment, to generate the session keys used for the secure TLS connection, the client target network device 12 encrypts a random number with the server's 22 public key and sends the result to the emergency location information server network device 22 (which only the emergency location information server network device 22 should be able to decrypt with its private key). Both parties then use the random number to generate a unique session key for subsequent encryption and decryption of data during the session uses a key exchange method (i.e., Diffie-Hellman key exchange, etc.) to securely generate a random and unique session key for encryption and decryption that has the additional property of forward secrecy. Thus, if the emergency location information server network device's 22 private key is ever disclosed in a future event, it cannot be used to decrypt the TLS session, even if the TLS session is intercepted and recorded by a third party. This concludes the handshake and begins the secured TLS connection, which is encrypted and decrypted with the session keys until the connection closes. If any one of the above steps fails, then the TLS handshake fails and the secure TLS connection is not created.

TLS is also used for dereferencing a location Uniform Resource Identifier (URIs) unless confidentiality and integrity are provided by some other encryption or security methods. In one embodiment, target network device 12 location information recipients authenticate a network host (e.g., emergency location information server network device 22, etc.) identity with a DNS query using a domain name included in a location URI. However, the present invention is not limited to this embodiment. Pre-determined local security polices for emergency events determine what a target network device 12 and/or emergency location information server network device 22 location information recipient does if TLS authentication fails or cannot be attempted. However, the present invention is not limited to this TLS encryption method and other encryption and/or security methods (e.g., RSA, DES, WEP, etc.) at other levels (e.g., Layers 1-7, etc.) including but not limited to those described herein, can be used to practice the invention and to encrypt and decrypt the location information key data structure 76.

Returning to FIG. 9B at Step 140, the emergency location information application 26' on the emergency location information server network device 22 sends a second location information message including the encrypted location information key data structure 76 back to the location application 26 on the target network device 12 via the communications network 18. The second location information message is not sent back to the target network device 12 via the first server network device 20.

In another embodiment, the second location information message is sent back to the target network device 12 via the first server network device 20.

At Step 144, an emergency message is received on the emergency location application 26' on the emergency location information server network device 22 from the first server network device 20 via the communications network 18, 18'. The emergency message includes the encrypted location information key data structure 76 and was sent by the target network device 12 to the first server network device 20 via the communications network 18, 18' and indicates the target network device 12 has encountered an emergency event.

The emergency message includes an E911 communication message, a legacy 911 communication message, NG-911 communication message, a Common Alerting Protocol (CAP) message, a Public Safety Answering Point (PSAP) to Automatic Location Identification (ALI) (PAM) interface protocol message, text-to-911 message, 112 message and/or other type of emergency message.

In one embodiment the target network device 12 sends the encrypted location information key data structure 76 in one or more SIP protocol messages that are used to initiate the emergency message to the first server network device 20. However, the present invention is not limited to such and embodiment and other embodiments may be used to practice the invention.

The emergency event includes an accident event, medical event, health event (e.g., personal health emergency, disease outbreak, etc.) fire event, terrorist attack event, military event, marine event, weather event (e.g., hurricane, tornado, etc.), natural disaster event (e.g., flood, earthquake, volcano, etc.) event, police event, crime event and/or other emergency events. However, the present invention is not limited to such and embodiment and other embodiments including more, fewer or other emergency events may be used to practice the invention.

At Step 146, the encrypted location information key data structure 76 is decrypted from the emergency location application 26' on the emergency location information server network device 22.

At Step 148, the emergency location application 26' performs one or more queries to the relational database 22' using information from the decrypted location information key data structure 76 to determine the current physical location 34, 34', 34" of the target network device 12. The emergency location application 26' also determines an emergency response server network device 25 with one or more processors to send the emergency message to.

In FIG. 9C at Step 150, the emergency location application 26' on the emergency location information server network device 22 determines additional location information 155 for the target network device 12 from one or more other public location information sources via the communications network 18, 18' using the current physical location 34, 34', 34" of the target network device 12 from the emergency message as a search key for searching the one or more other public location information sources 24.

In one embodiment, the additional location information from the one or more public location information sources 24 includes, but is not limited to, online mapping site information, cellular telephone tower information, Bluetooth protocol wireless beacon information, Wireless Fidelity (Wi-Fi) wireless beacon information, Radio Frequency Identifier (RFID) information, Internet of Things (IoT) device sensor information or IoT actuator information, National Emergency Database (NEAD) information, Near field communication (NFC) protocol information and/or machine-to-machine (M2M) communications information. However, the present invention is not limited to the public information sources listed and more, fewer or other information sources can be used to practice the invention.

The public information sources 24 includes plural network devices, IoT devices, communications networks 18, 18' (e.g., cellular, cloud, WiFi, Bluetooth, RFID, NFC, M2M, etc.) at known and fixed physical locations (e.g., street address, floor in a building, rooms and hallways in a building, retail location, restaurant, coffee shop, etc.) The known and fixed physical locations are used to: (1) provide additional verifiable information about a current physical location 34, 34', 34" for the target network device 12; and (2) confirm and verify the target network device 12 is at a current physical location 34, 34', 34". Such known and fixed locations are stored in one or more public databases 22', 24', etc. In another embodiment, the known and fixed and locations are stored in one or more private databases 20', etc. However, the present invention is not limited to such embodiments and other embodiments can be used to practice the invention.

For example, a restaurant or coffee shop includes at a known street address and has a WiFi network with a known and fixed SSID sent out in a WiFi beacon that can be used to further verify and confirm a current physical location 34, 34', 34" of the target network device 12, etc.

In one embodiment, the cellular tower information includes cell tower information. A cell tower houses the electronic communications equipment along with an antenna to support cellular communication in a communications network 18, 18'. A cell tower is an elevated structure with the antenna, transmitters and receivers located at the top. A cell tower also known as cellular tower or cell site. Cell tower information includes, but is not limited to, signal strength, triangulation, orthogonality, cell tower pinging, and other types of cell tower information used to determine a current physical location 34, 34', 34" of the target network device 12. To "ping" a cell tower in this context means to send a signal to a particular cell phone 12 and have it respond with the requested data. The cell towers are typically 6 to 12 miles apart (less in cities) and a cell phone 12 is usually within range of at least three of them.

However, the present invention is not limited such cell tower information and other cell tower information can be used to practice the invention.

In one embodiment, the Bluetooth protocol wireless beacon is generated from small Bluetooth radio transmitters, powered by batteries or other electrical source. Bluetooth beacons are similar to a lighthouse in functionality. These small hardware devices transmit Bluetooth Low Energy (BLE) signals. The Bluetooth enabled smartphones 12 and other network devices are capable of scanning and displaying these signals. Bluetooth Low Energy transmits less data over a smaller range, hence consuming much less power. BLE beacons transfers small amounts of data at regular intervals of time. However, the present invention is not limited to such Bluetooth beacons and other beacons can be used to practice the invention.

In one embodiment, the WiFi wireless beacon includes, but is not limited to, WiFi beacon frames. WiFi networks include unique SSIDs. Every SSID on each band broadcasts its own unique WiFi beacon frame. This is a periodic advertisement broadcast out to tell any listening devices 12 that this SSID is available and has particular features and capabilities. Target network devices 12 depend upon these beacon frames to discover what networks 18,18' are available (passive scanning), and to ensure that the networks 18,18' that they are associated with are actually still present and available. A client network device 12 also has the option to perform active scanning, where a client device sends a broadcast request to see what networks are available, and each SSID from each wireless access point in range will send out a unicast probe response that has the same information as a beacon frame. However, the present invention is not limited to such WiFi beacons and other beacons can be used to practice the invention.

In one embodiment, the National Emergency Database (NEAD) information, includes, but is not limited to, The NEAD stores the physical addresses of WiFi and Bluetooth beacons to determine the emergency responder dispatchable location of the beacon itself. NEAD includes two parts: the NEAD database and NEAM administration, including data provisioning management, validation. The NEAD database includes MAC/Universal Unique Identifier (UUID) addresses entered by: (1) service-orders from wireline/cable/fiber carriers; (2) customers provisioning when supplying their own devices; (3) building owner provisioning for devices (e.g., IOT devices, smoke detectors, exit signs, etc.); and (4) address Location Validation Function (LVF) validated to street address. However, the present invention is not limited to such NEAD information and other emergency location information can be used to practice the invention.

The NFC protocol information includes NFC unique tag identifiers (TIDs). A NFC reader accepts a TID from a target network device 12 and validates it against a database 20', 22'. The formal scan record includes the TID, date, time, capture method (e.g., NFC read, TID lookup, etc.) and any other data collected at that point of service. However, the present invention is not limited to such an embodiment, and other types of NFC information can be used to practice the invention.

In one embodiment, M2M communications information includes, but is not limited to, time of arrival (TOA) and time difference of arrival (TDOA) based localization information. M2M information is used to estimate a location of unknown target network device 12 using TOA and TDOA from the location information of anchor M2M devices. In one embodiment, the TOA and TDOA are used via a cellular telephone network. However, the present invention is not limited to such an embodiment and the M2M information can be used on other communications networks 18, 18' to practice the invention.

In one embodiment, the online (i.e., available via the communications network 18, 18' (e.g., Internet, etc.)) mapping site information includes, but is not limited to, APPLE map location information, BING map location information, GOOGLE map location information, MAPQUEST map location information, ROADTRIPPERS, map location information, TERRASERVERS-USA map location information, HERE map location information, aviation flight tracker map location information, marine vessel locator map location information, UNITED STATES GEOGLOGICAL SURVEY (USGS) NATIONAL map location information, NATIONAL OCEANIC ATMOSPHERIC ADMINISTRATION (NOAA) map location information, Geographic Information System (GIS) map location information and/or other types of online mapping information. However, the present invention is not limited to the public information sources listed and more, fewer or other information sources can be used to practice the invention.

Such online mapping site information, includes, but is not limited to, locations or extents (i.e., natural features of the earth's surface, including topography, climate, soil, vegetation, etc.) in earth space—time recorded as dates/times of occurrence, and (X, Y, Z) coordinates representing, longitude, latitude, and elevation, respectively. All earth-based spatial—temporal location and extent references are relatable to one another and ultimately to a "real" current physical location or extents.

Such online mapping site information, also includes, but is not limited to, motion, magnetic, barometric pressure, humidity, moisture, temperature, precipitation, wind, height, depth, altimeter, GPS, traffic, flight, shipping, and/or other types of mapping information.

In one embodiment, the online mapping site information, includes, but is not limited to, real-time traffic information, real-time weather information, construction information, route planning information, satellite photograph information, building floor plan, and/or other types of mapping site information. The online mapping site information is used by emergency responders: (1) to more precisely locate the target network device at the currently physical location 34, 34', 34"; and (2) to provide emergency responders with additional information that may affect a travel route selected by the emergency responder such as traffic jams, construction projects, weather related events (e.g., flooding, etc.), etc.

At Step 152, the emergency location application emergency location information server 20 network device adds the determined current physical location 34, 34', 34" of the target network device 12 and the determined additional location information 155 to the emergency message providing additional information to locate the target network device 12.

In another embodiment, the determined additional location information 155 is sent in real-time in another message after the emergency message is sent. However, the present invention is not limited to this embodiment.

In one embodiment, the determined additional location information is include in an XML data structure component. In one embodiment, the additional location information is included in a XML Presence Information Data Format Location Object (PIDF-LO). However, the present invention is not limited to such embodiments and other embodiments can be used to practice the invention.

Table 3 illustrates an exemplary XML Presence Information Data Format Location Object (PIDF-LO) layout. However, the present invention is not limited to this layout and other XML layouts and other types of target network device 12 location information objects can be used to practice the invention.

TABLE 3

```
<presence xmlns="urn:ietf:params:xml:ns:pidf"
xmlns:dm="urn:ietf:params:xml:ns:pidf:data-model"
xmlns:gp="urn:ietf:params:xml:ns:pidf:geopriv10"
                    xmlns:gml="http://www.opengis.net/gml"
                    xmlns:cl="urn:ietf:params:xml:ns:pidf:geopriv10:civicAddr
                    entity="pres:312.431.4321">
        <dm:device id="android-cell-phone">
            <gp:geopriv>
                <gp:location-info>
                    <gml:Point srsName="urn:ogc:def:crs:EPSG::4326">
                        <gml:pos41.881832, -87.623177</gml:pos>
                    </gml:Point>
                    <cl:civicAddress>333 N. Michigan Avenue, Chicago, IL
60601</cl:civiAddress>
                        <cl:FLR>9th</cl:FLR>
                        <cl:ROOM>Conference Room 3</cl:ROOM>
                    <gp:location-info>41.881832, -87.623177</gp:location-info>
                    <gp:usage-rules/>
                    <gp:method>Wiremap</gp:method>
            </gp:geopriv>
            <dm:deviceID>mac:8asd7d7d70cf</dm:deviceID>
            <dm:timestamp>2020-01-22T20:57:29Z</dm:timestamp>
        </dm:device>
</presence>
```

Table 4 illustrates an exemplary data structure including the determined additional location information. This data structure is exemplary only and other data structures and other embodiments can be used to practice the invention. Table 4 illustrates determined additional location information including an electronic links for online maps to GOOGLE maps, GOOGLE real-time traffic maps, and BING maps for the street address of 333 N. Michigan Avenue, Chicago, Ill. 60601.

In another embodiment, the determined additional location information is added in additional fields of the XML Presence Information Data Format Location Object (PIDF-LO) layout (Table 3). This determined additional location information is exemplary only and other embodiments can be used to practice the invention. The data structures described in Tables 3-5 are exemplary only and other data structures layouts, with more, fewer and other fields and other mark-up and non-mark-up languages can be used to practice the invention.

TABLE 4

Exemplary determined additional location
information message field layout

```
{
"tn":"312.432.4321",
"locationName":"Conference Room 3",
"street":"333 N Michigan Ave",
"locationInfo":"9th floor",
"city":"Chicago",
"state":"IL",
"postalCode":"60601",
"companyID" : 6f2f2d50-c385-,b72-b8,a-ce0ca3a77cb7
"google-maps": //goo.gl/maps/aCALrpR1tw8z9DH66
"google-traffic": //goo.gl/traffic-maps/aCALrpR1tw8z9DH66
"bing-maps": //binged.it/38YO3Tj
}
```

In one embodiment, the data structures described in Tables 3-5 are used in HELD+ protocol messages. However, the present invention is not limited to such an embodiment and other embodiments can be used to practice the invention.

At Step 154, the emergency message with the determined additional location information 155 is sent in real-time from the emergency location application 26' on the emergency location information server network device 22 to the determined emergency response server 25 via the communications network 18, 18'. The emergency message is sent without the encrypted location information key data structure 76 from the emergency location application 26' on the emergency location information server network device 22 to the determined emergency response server 25.

The desired emergency response server 25 includes an E911 or 911 emergency response server, a text-to-911 server, a Public Safety Answering Point (PSAP) server, an Emergency Services IP networks (ESInet) server and/or other emergency gateway network server device and/or other emergency server network device.

In one embodiment at Step 154, emergency location application 26' on the emergency location information server network device 22 determines a desired emergency response server 25 that is closest geographically to the target network device 12 which is in turn used to notify emergency responders (e.g., police, fire, ambulance, etc.) closest to the current physical location 34 of the target network device 12. However, the present invention is not limited to such and embodiment and other embodiments may be used to practice the invention including selecting other desired emergency response server 25 with other methods.

In another embodiment, a desired emergency response server 25 is not the closest geographically to the target network device 12. In such an embodiment, the a desired emergency response server 25 closest geographically to the target network device 12 may be out of service due to the same emergency event the occurred for the target network device 12 (e.g., fire, weather event, earthquake, etc.). In such an embodiment, the emergency location application 26' on the emergency location information server network device 22 determines the closest active emergency response server 25. However, the present invention is not limited to such and embodiment and other embodiments may be used to practice the invention including selecting other desired emergency response server 25 with other methods.

At Step 156, the determined emergency response server 25 is notified in real-time from the emergency location application 26' on the emergency location information server network device 22 via the communications network 18, 18' that an emergency event has occurred with the target network device 12.

"Real-time" relates to a system 10 in which input data (e.g., emergency messages, etc.) is processed within a few milliseconds or less to a few seconds or less in time so that the input data is available immediately for use and display as output data.

In one embodiment, information is displayed in real-time on the determined emergency response server network device 25 about the emergency event (e.g., fire 36", etc.) that has occurred with the target network device 12.

In another embodiment, emergency information displayed in real-time on the emergency location information server network device 22 about the emergency event (e.g., fire 36", etc.) that has occurred with the target network device 12.

In another embodiment, emergency information displayed in real-time on both the determined emergency response server network device 25 and the on the emergency location information server network device 22 about the emergency event (e.g., fire 36", etc.) that has occurred with the target network device 12.

It has been determined based on data collected from emergency calls in the United States that for every minute emergency help does not arrive in a medical emergency, survivability of a person is reduced by ten percent. Methods 52 and 134 help improve response time by notifying emergency security and administrative personnel the instant someone dials 911 and/or texts 911 by sending a "screen popup" alert with or without a loud audio and/or audio/video alarm to security network devices and other network devices associated with the determined emergency response server 25 that includes the full current physical location information for the target network device 12. SMS/text messages are also sent to mobile security response teams and email notifications sent to administrators. The entire process is time-stamped and logged for audit purposes.

FIG. 6 is a block diagram 108 illustrating a graphical emergency location information system graphical display interface 110 for displaying information determined by the methods of FIG. 3 and FIG. 9 and the other emergency location methods described herein.

The graphical display system interface 110, includes, but is not limited to a real-time map portion 112 including a graphical location marker 114 (e.g., for the target device 12, etc.) including a location of a type of emergency (e.g. fire, accident, etc.), a determined current physical location portion 116 including the determined currently physical location 34 of the target network device 12, a picture portion 118 including a digital picture of the determined currently physical location 34, of the target network device 12 and an emergency information portion 120 including information about the type of emergency event and an audio component 121 for sending out audio emergency alerts or tones. However, the present invention is not limited to such an embodiment and more, fewer and other types of portions can be used to display emergency information on the display system interface 110.

Methods 52 and 134 allow a current physical location of any type of target network device to be accurately determine during an emergency event.

In one exemplary embodiment, for example, all employees of a business are assigned a non-mobile desk phone 38. Methods 52 and 134 enables non-mobile desk phones 38 (e.g., target network device 38 with location application 26, etc.) to ask for its current physical location 34 whenever it moves from a first physical location 34' to second physical location 34" within a selected enterprise (e.g., when an employee moves to a new office, is assigned to a new group, starts working as a new employee, etc.) The desk phone 38 sends its new second physical location 34" (i.e., new current physical location) when it dials 911. Methods 52 and 134 intelligently routes all emergency calls/message to their correct Public Safety Answering Point (PSAP) based on the current physical location of the non-mobile desk phone 38 a caller is making an emergency call from.

In another exemplary embodiment, for example, all employees of a business are assigned mobile smart phones 12. Methods 52 and 134 enable mobile smart phones 12 (e.g., target network device 12 with location application 26, etc.) to ask for its current physical location 34 when it moves from a first physical location 34' to second physical location 34" within a selected enterprise (e.g., anytime during any day the employee moves to a new location at work, to a floor, cubicle, cafeteria, conference room, etc.). The mobile smart phones 12 send their new second physical location (i.e., new current physical location 34) when it dials 911 or texts 911. Methods 52 and 134 intelligently routes all emergency calls/texts to their location appropriate Public Safety Answering Point (PSAP) based on the current physical location of a mobile phone a caller is making an emergency call from.

In another exemplary embodiments, the employees of a company are assigned a mix of non-mobile desk phone 38 and mobile smart phones 12.

In another exemplary embodiment, for example, all employees of a business are assigned a wearable network device 42-50 comprising, for example, wearable watch 48 including telephone capabilities. Methods 52 and 134 enable the wearable watch 48 (with location application 26, etc.) to ask for its current physical location 34 when it moves from a first physical location 34' to second physical location 34" within a selected enterprise (e.g., anytime during any day the employee moves to a new location at work). The wearable watches 48 send their new second physical location 34" (i.e., new current physical location 34) when it dials 911 or texts 911. Methods 52 and 134 intelligently routes all 911 calls to their location appropriate Public Safety Answering Point (PSAP) based on the current physical location 34 of a wearable watch a caller is making an emergency call from.

However, the present invention is not limited to such exemplary embodiments and more, fewer and other types combinations of mobile and non-mobile network devices can be used to practice the invention.

FIG. 10 is a flow diagram illustrating a Method 158 for locating a network device in an emergency situation.

In FIG. 10 at Step 160, a confirmation request message is sent in real-time from the emergency location information application on the emergency location information server network device via the communications network to the location application on the target network device. The confirmation request message includes the determined current physical location of the target network device determined with the one or more queries to the relational database with the decrypted location information key. The confirmation message includes a confirmation request for the target network device to immediately accept, reject or modify the determined current physical location for the emergency event that has occurred with the target network device. At Step 162, a confirmation response message is received in real-time on the emergency location information application on the emergency location information server network device via the communications network from the location application on the target network device accepting, rejecting or modifying the determined current physical location of the target network device for the emergency event that has occurred with the target network device. The location application on the target network device automatically accepts, rejects or modifies the determined current physical location of the target network device.

Method 158 is illustrated with one exemplary embodiment. However, the present invention is not limited to such an embodiment and other embodiments can also be used to practice the invention.

In such an exemplary embodiment at FIG. 10 at Step 160, a confirmation request message is sent in real-time from the emergency location information application 26' on the emergency location information server network device 20 via the communications network 18, 18' to the location application 26 on the target network device 12. The confirmation request message includes the determined current physical location 34 of the target network device determined with the one or more queries to the relational database 25' with the decrypted location information key 76. The confirmation message includes a confirmation request for the target network device 12 to immediately accept, reject or modify the determined current physical location 34 for the emergency event that has occurred with the target network device 12.

At Step 162, a confirmation response message is received in real-time on the emergency location information application 26' on the emergency location information server network device 20 via the communications network 18, 18' from the location application 26 on the target network device 12 accepting, rejecting or modifying the determined current physical location 34 of the target network device 34 for the emergency event that has occurred with the target network device 12. The location application 26 on the target network device 12 automatically accepts, rejects or modifies the determined current physical location 34 of the target network device 12.

In one embodiment, Method 158, is executed in associated with Step 154 of Method 134 of FIG. 9C. Method 158 would be executed before the emergency message is sent at Step 154 in Method 134 of FIG. 9C. However, the present invention is not limited to this embodiment, and the Method 134 can be practiced without Method 154 of FIG. 10. In addition, Method 158 of FIG. 10 is practiced in addition to Method 134 of FIG. 9. However, the present invention is not limited to these embodiments and other embodiments can be used to practice the invention.

Table 5 illustrates exemplary messages sent and received by Method 158. However, the present invention is not limited to these exemplary message and other messages can be used to practice the invention. Table 5 includes a confirmation request message, a confirmation response message that has been accepted, a confirmation response message that has been modified and a confirmation response message that has been rejected.

The target network device 12 (e.g., mobile phone 12) starts out on $9^{th}$ floor in Conference Room 3 at 333 N. Michigan Avenue, Chicago, Ill. 60601. It then moves to a different floor and conference room at the same street address. It then moves to a new street address.

The Confirmation Response Message with Modifications indicates, the target network device 12 has moved to the $11^{th}$ Floor and into Conference Room 7 at the same street address when it is sent the Confirmation Request Message in Table 4. The target network device 12 then moves to a coffee shop on the first floor, unit 2, with a street address at 179 N. Michigan Chicago, Ill. 60601. So when the confirmation request message is sent, the Confirmation Response Message is rejected because the target network device 12 has moved to the new street address at 1 N. Michigan Chicago, Ill. 60601.

TABLE 5

Exemplary Confirmation Request Message
{
"tn":"312.432.4321",
"locationName":"Conference Room 3",
"street":"333 N Michigan Ave",
"locationInfo":"$9^{th}$ floor",
"city":"Chicago",
"state":"IL",
"postalCode":"60601",
"companyID" : 6f2f2d50-c385-,b72-b8,a-ce0ca3a77cb7
}
Exemplary Confirmation Response Message
{
"tn":"312.432.4321",
"status": "Success",
"statusCode": "200",
"Msg":"VALID",
"locationName":"Conference Room 3",
"street":"333 N Michigan Ave",
"locationInfo":"$9^{th}$ floor",
"city":"Chicago",
"state":"IL",
"postalCode":"60601",
"companyID" : 6f2f2d50-c385-,b72-b8,a-ce0ca3a77cb7
}
Exemplary Confirmation Response Message with Modification
{
"tn":"312.432.4321",
"status": "Success",
"statusCode": "201",
"Msg":"MODIFIED",
"locationName":"Conference Room 7",
"street":"333 N Michigan Ave",
"locationInfo":"$11^{th}$ floor",
"city":"Chicago",
"state":"IL",
"postalCode":"60601",
"companyID" : 6f2f2d50-c385-,b72-b8,a-ce0ca3a77cb7
}
Exemplary Confirmation Response Message with Rejection
{
"tn":"312.432.4321",
"status": "Success",
"statusCode": "202",
"Msg":"REJECTED",
"locationName":"Coffee Shop",
"street":"179 N. Michigan Ave",
"locationInfo":"$1^{st}$ floor", "Unit 2",
"city":"Chicago",
"state":"IL",
"postalCode":"60601",
"companyID" : 6f2f2d50-c385-,b72-b8,a-df1db4b88dc8
}

The methods and system presented herein locate a network device in an emergency situation. Current physical location information is obtained for a network device every time it registers on a network or moves to a new physical location. The current physical location is sent and received in an encrypted format to and from the network device. When the network device initiates an emergency message (e.g. 911, E911, NG911, text-to-911, 112, etc.) based on an emergency event (e.g., weather, crime, fire, natural disaster, medical, terrorist, military, etc.), the emergency message includes the encrypted current physical location information for the network device. The current physical location information is decrypted. Additional information is collected from one or more public location information sources for the current physical location of the network device. The emergency message with the additional information is routed in real-time to an appropriate Public Safety Answering Point (PSAP). The appropriate PSAP is immediately notified in real-time so emergency responders (e.g., police, fire, medical, etc.) can be dispatched to the current physical location of the network device.

It should be understood that the architecture, programs, processes, methods and systems described herein are not related or limited to any particular type of computer or network system (hardware and/or software and/or firmware, etc.), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware and/or firmware implementations may alternatively be used, and vice-versa.

The claims should not be read as limited to the described order or elements unless stated to that effect. In addition, use of the term "means" in any claim is intended to invoke 35 U.S.C. § 112, paragraph 6, and any claim without the word "means" is not so intended.

Therefore, all embodiments that come within the scope and spirit of the following claims and equivalents thereto are claimed as the invention.

I claim:

1. A method for locating a network device in an emergency situation, comprising:
   receiving a first location information message on an emergency location application on an emergency location information server network device with one or more processors from a first server network device with one or more processors via a communications network,
   wherein the first location message includes private location information determined with a location application on a target network device and one or more processors that moved from a first physical location to a second physical location;
   determining from the emergency location application on the emergency location information server network device a current physical location for the target network device at the second physical location with the private location information provided by the target network device;
   creating from the emergency location application on the emergency location information server network device a location information key data structure for the target network device,
   wherein the location information key data structure includes unique identification information for the target network device and unique identifying location information for a network the target network device is currently connected to and the determined current physical location information, and
   wherein the location information key data structure includes a database key to a relational database and is usable only by the emergency location application on the emergency location information server;
   sending a second location information message including the location information key data structure encrypted with a pre-determined encryption method from the emergency location information application on the emergency location information server network device back to the location application on the target network device via the communications network;
   receiving an emergency message on the emergency location application on the emergency location information server network device from the first server network device via the communications network,
   wherein the emergency message includes the encrypted location information key data structure sent to the target network device, and
   wherein the emergency message was sent to the first server network device via the communications network from the location application on the target network device upon the target network device encountering an emergency event;
   decrypting the encrypted location information key data structure from the emergency location application on the emergency location information server network device;
   determining the current physical location of the target network device with one or more queries to the relational database with the decrypted location information key and also determining an emergency response server network device with one or more processors to send the emergency message based on the determined current physical location of the target network device;
   determining from the emergency location application on the emergency location information server network device, additional location information for the target network device from one or more other public location information sources via the communications network using the determined current physical location of the target network device as a search key for searching the one or more other public location information sources;
   adding from the emergency location application on the emergency location information server network device, the determined current physical location of the network device and the determined additional location information to the emergency message providing additional information to locate the target network device;
   sending in real-time the emergency message from the emergency location application on the emergency location information server network device to the determined emergency response server network device via the communications network,
   wherein the emergency message is sent from the emergency location application on the emergency location information server network device to the determined emergency response server network device via the communications network without the encrypted location information key data structure; and
   notifying in real-time from the emergency location application on the emergency location information server network device via the communications network the determined emergency response server network device that an emergency event has occurred with the target network device.

2. The method of claim 1 wherein the pre-determined encryption method includes: a Wireless Encryption Protocol (WEP), Temporal Key Integrity Protocol (TKIP), Data Encryption Standard (DES), Triple Data Encryption Standard (3DES) or Rivest-Shamir-Adleman (RSA), encryption method.

3. The method of claim 2 wherein the pre-determined encryption method further includes generating a unique session key for encryption and decryption of message data with a pre-determined key exchange method to securely generate a random and unique session key for encryption and decryption.

4. The method of claim 1 wherein first location message includes an initial location registration message for the target network device at the first physical location.

5. The method of claim 1 wherein the first location information message includes unique identifying information for the target network device and unique identifying location information for a network the target network device is currently connected to.

6. The method of claim 1 wherein the first location information message includes a social media identifier, a social media identifier with associated location information, Internet Protocol (IP) address, IP subnet, Network Address Translated (NAT) IP address, Media Access Control (MAC) address, port identifier, local network location reference key, network identifier name, cable television set-top box identifier, Internet television set-top box identifier, Internet television stick identifier, satellite television box identifier, a Service Set Identifier (SSID), a Basic Service Set Identifier (BSSID) or an Extended Basic Service Set Identifier (EBSSID) associated with the target network device.

7. The method of claim 1, wherein the first location information message includes a (Hypertext transfer protocol (HTTP) Enabled Location Delivery) (HELD) protocol request message or a HELD+ protocol request message.

8. The method of claim 1, wherein the first location information message includes current physical location information comprising: two dimensional (2D) (X, Y) location information, three-dimensional (3D) (X, Y, Z), location information wherein the (Z) component includes temperature, wind speed, pressure, depth, height, altitude, elevation, magnetic, speed or acceleration information, Global Positioning System (GPS) information, Cartesian coordinate information, Euclidean space information, geo-space information, geographic information or network connection information for the target network device.

9. The method of claim 1 wherein the current physical location includes two-dimensional (2D) (X, Y) location information, three-dimensional (3D) (X, Y, Z) location information, Global Positioning System (GPS) information, Cartesian coordinate information, Euclidean space information, geo-space information, geographic information or network information for the target network device.

10. The method of claim 1 wherein the encrypted location information key data structure includes a Location Reference Key with an eXtensible Markup Language (XML) data structure comprising a Level 2 data structure component and a Level 3 data structure component, each with a plurality of individual data fields including one or more database key entries for a relational database comprising unique identification information for the target network device, unique identifying location information for a network the target network device is currently connected to and current physical location information for the target network device comprising two-dimensional (2D) (X, Y), three-dimensional (3D) (X, Y, Z), Global Positioning System (GPS) information, Cartesian coordinate information, Euclidean space information, geo-space information, geographic information or network information for the target network device.

11. The method of claim 1 wherein location information key data structure is encrypted and decrypted using a Transport Layer Security (TLS) protocol encryption method.

12. The method of claim 1 wherein the emergency message includes an E911 communication message, legacy 911 communication message, Next Generation NG-911 communication message, Common Alerting Protocol (CAP) message, Public Safety Answering Point (PSAP) to Automatic Location Identification (ALI) (PAM) interface protocol message, text-to-911 message or 112-message.

13. The method of claim 1 wherein the emergency message includes one or more Session Initiation Protocol (SIP) messages including the encrypted location information key data structure.

14. The method of claim 1 wherein emergency response server network device includes an E911 or 911 emergency response server, a text-to-911 server, 112 server, a Public Safety Answering Point (PSAP) server, or an Emergency Services IP networks (ESlnet) server.

15. The method of claim 1 wherein the emergency event includes an accident event, fire event, medical event, health event, terrorist attack event, military event, weather event, natural disaster event, environmental event, or crime event.

16. The method of claim 1 wherein the target network device includes a mobile phone, smart phone, electronic tablet, mobile computer, unmanned aerial vehicle (UAV), driverless vehicle, vehicle with a driver, aircraft, water vehicles, snow machines, Internet of Things (IoT) network device, wearable network device, portable gaming platform, non-portable gaming platform, non-mobile computer, non-mobile phone, Internet appliance, cable television set-top box, Internet television set-top box, satellite television box, and network devices embedded into home appliances or intelligent building control and monitoring systems.

17. The method of claim 1 wherein the target network device includes a wireless interface for communicating with the communications network comprising: an IEEE 802.11a, 802.11ac, 802.11b, 802.11g, 802.11n, Wireless Fidelity (Wi-Fi), Wi-Fi Aware, Worldwide Interoperability for Microwave Access (WiMAX), ETSI High Performance Radio Metropolitan Area Network (HIPERMAN), Zigbee, Bluetooth, Infrared, Industrial Scientific and Medical (ISM), Radio Frequency Identifier (RFID), Real-Time Text (RTT), Near Field Communications (NFC) or Machine-to-Machine (M2M), wireless interface.

18. The method of claim 1 wherein the communication network includes a cloud communications network and the emergency location application on the emergency location server network device offers a plurality of cloud services comprising a cloud computing Infrastructure as a Service (IaaS), a cloud Platform as a Service (PaaS) and offers an emergency location information Specific cloud software service as a Service (SaaS) including one or more different software services for providing emergency location information to the location application on the target network device and a plurality of other target network devices and server network devices on the cloud communications network.

19. The method of claim 1 further comprising:
displaying in real-time on the determined emergency response server network device or on the emergency location information server network device, audio, visual or text information about the emergency event that has occurred with the target network device.

20. The method of claim 1 further comprising:
locating with the emergency location information application on the emergency location information server network device the current physical location of the target network device by decrypting the encrypted location information key data structure received in the emergency message sent by the location application on the target network device via the communications network and by completing a database lookup with the decrypted location information key;

determining from the emergency location information application on emergency location information server network device determines an emergency response server closest to the current physical location of the target network device;

routing the emergency message from the emergency location information application on emergency location information server network device to the determined emergency response server via the communications network; and notifying from the emergency location information application on the emergency location information server network device the determined emergency response server in real-time from that an emergency event has occurred for the target network device.

21. The method of claim 1
wherein the pre-determined encryption method further includes a pre-determined hashing method.

22. A non-transitory computer readable medium have stored therein a plurality of instructions for causing one or more processors on one or more network devices to execute the steps, comprising:

receiving a first location information message on an emergency location application on an emergency location information server network device with one or more processors from a first server network device with one or more processors via a communications network, wherein the first location message includes private location information determined with a location application on a target network device and one or more processors that moved from a first physical location to a second physical location;

determining from the emergency location application on the emergency location information server network device a current physical location for the target network device at the second physical location with the private location information provided by the target network device;

creating from the emergency location application on the emergency location information server network device a location information key data structure for the target network device, wherein the location information key data structure includes unique identification information for the target network device and unique identifying location information for a network the target network device is currently connected to and the determined current physical location information, and wherein the location information key data structure includes a database key to a relational database and is usable only by the emergency location application on the emergency location information server;

sending a second location information message including the location information key data structure encrypted with a pre-determined encryption method from the emergency location information application on the emergency location information server network device back to the location application on the target network device via the communications network;

receiving an emergency message on the emergency location application on the emergency location information server network device from the first server network device via the communications network, wherein the emergency message includes the encrypted location information key data structure sent to the target network device, and wherein the emergency message was sent to the first server network device via the communications network from the location application on the target network device upon the target network device encountering an emergency event;

decrypting the encrypted location information key data structure from the emergency location application on the emergency location information server network device;

determining the current physical location of the target network device with one or more queries to the relational database with the decrypted location information key and also determining an emergency response server network device with one or more processors to send the emergency message based on the determined current physical location of the target network device;

determining from the emergency location application on the emergency location information server network device, additional location information for the target network device from one or more other public location information sources via the communications network using the determined current physical location of the target network device as a search key for searching the one or more other public location information sources;

adding from the emergency location application on the emergency location information server network device, the determined current physical location of the network device and the determined additional location information to the emergency message providing additional information to locate the target network device;

sending in real-time the emergency message from the emergency location application on the emergency location information server network device to the determined emergency response server network device via the communications network, wherein the emergency message is sent from the emergency location application on the emergency location information server network device to the determined emergency response server network device via the communications network without the encrypted location information key data structure; and notifying in real-time from the emergency location application on the emergency location information server network device via the communications network the determined emergency response server network device that an emergency event has occurred with the target network device.

23. A system for locating a network device in an emergency situation, comprising, in combination:

a plurality of target network devices, each with a location application, one or more processors and a non-transitory computer readable medium;

a plurality of server network devices each with one or more processors and a non-transitory computer readable medium;

one or more emergency response server network devices with an emergency location application, one or more processors and a non-transitory computer readable medium;

a communications network, configured;

for receiving a first location information message on an emergency location application on an emergency location information server network device with one or more processors from a first server network device with one or more processors via a communications network, wherein the first location message includes private location information determined with a location application on a target network device and one or more processors that moved from a first physical location to a second physical location;

for determining from the emergency location application on the emergency location information server network device a current physical location for the target network device at the second physical location with the private location information provided by the target network device;

for creating from the emergency location application on the emergency location information server network device a location information key data structure for the target network device, wherein the location information key data structure includes unique identification information for the target network device and unique identifying location information for a network the target network device is currently connected to and the determined current physical location information, and wherein the location information key data structure includes a database key to a relational database and is usable only by the emergency location application on the emergency location information server;

for sending a second location information message including the location information key data structure encrypted with a pre-determined encryption method from the emergency location information application on the emergency location information server network device back to the location application on the target network device via the communications network;

for receiving an emergency message on the emergency location application on the emergency location information server network device from the first server network device via the communications network, wherein the emergency message includes the encrypted location information key data structure sent to the target network device, and wherein the emergency message was sent to the first server network device via the communications network from the location application on the target network device upon the target network device encountering an emergency event;

for decrypting the encrypted location information key data structure from the emergency location application on the emergency location information server network device;

for determining the current physical location of the target network device with one or more queries to the relational database with the decrypted location information key and also determining an emergency response server network device with one or more processors to send the emergency message based on the determined current physical location of the target network device;

for determining from the emergency location application on the emergency location information server network device, additional location information for the target network device from one or more other public location information sources via the communications network using the determined current physical location of the target network device as a search key for searching the one or more other public location information sources;

for adding from the emergency location application on the emergency location information server network device, the determined current physical location of the network device and the determined additional location information to the emergency message providing additional information to locate the target network device;

for sending in real-time the emergency message from the emergency location application on the emergency location information server network device to the determined emergency response server network device via the communications network, wherein the emergency message is sent from the emergency location application on the emergency location information server network device to the determined emergency response server network device via the communications network without the encrypted location information key data structure;

for notifying in real-time from the emergency location application on the emergency location information server network device via the communications network the determined emergency response server network device that an emergency event has occurred with the target network device; and for displaying in real-time on the determined emergency response server network device or on the emergency location information server network device information about the emergency event that has occurred with the target network device.

24. A method for locating a network device in an emergency situation, comprising:

receiving a first location information message on an emergency location application on an emergency location information server network device with one or more processors from a first server network device with one or more processors via a communications network, wherein the first location message includes private location information determined with a location application on a target network device and one or more processors that moved from a first physical location to a second physical location;

determining from the emergency location application on the emergency location information server network device a current physical location for the target network device at the second physical location with the private location information provided by the target network device;

creating from the emergency location application on the emergency location information server network device a location information key data structure for the target network device, wherein the location information key data structure includes unique identification information for the target network device and unique identifying location information for a network the target network device is currently connected to and the determined current physical location information, and wherein the location information key data structure includes a database key to a relational database and is usable only by the emergency location application on the emergency location information server;

sending a second location information message including the location information key data structure encrypted with a pre-determined encryption method from the emergency location information application on the emergency location information server network device back to the location application on the target network device via the communications network;

receiving an emergency message on the emergency location application on the emergency location information server network device from the first server network device via the communications network,
wherein the emergency message includes the encrypted location information key data structure sent to the target network device, and
wherein the emergency message was sent to the first server network device via the communications network from the location application on the target network device upon the target network device encountering an emergency event;
decrypting the encrypted location information key data structure from the emergency location application on the emergency location information server network device;
determining the current physical location of the target network device with one or more queries to the relational database with the decrypted location information key and also determining an emergency response server network device with one or more processors to send the emergency message based on the determined current physical location of the target network device;
determining from the emergency location application on the emergency location information server network device, additional location information for the target network device from one or more other public location information sources via the communications network using the determined current physical location of the target network device as a search key for searching the one or more other public location information sources,
wherein the additional location information from the one or more public location information sources includes: online mapping site information, cellular telephone tower information, Bluetooth protocol wireless beacon information, Wireless Fidelity (Wi-Fi) wireless beacon information, Radio Frequency Identifier (RFID) information, Internet of Things (IoT) device sensor information, IoT actuator information, Near field communication (NFC) protocol information or machine-to-machine (M2M) communications information;
adding from the emergency location application on the emergency location information server network device, the determined current physical location of the network device and the determined additional location information to the emergency message providing additional information to locate the target network device;
sending in real-time the emergency message from the emergency location application on the emergency location information server network device to the determined emergency response server network device via the communications network,
wherein the emergency message is sent from the emergency location application on the emergency location information server network device to the determined emergency response server network device via the communications network without the encrypted location information key data structure; and
notifying in real-time from the emergency location application on the emergency location information server network device via the communications network the determined emergency response server network device that an emergency event has occurred with the target network device.

25. A method for locating a network device in an emergency situation, comprising:
receiving a first location information message on an emergency location application on an emergency location information server network device with one or more processors from a first server network device with one or more processors via a communications network,
wherein the first location message includes private location information determined with a location application on a target network device and one or more processors that moved from a first physical location to a second physical location;
determining from the emergency location application on the emergency location information server network device a current physical location for the target network device at the second physical location with the private location information provided by the target network device;
creating from the emergency location application on the emergency location information server network device a location information key data structure for the target network device,
wherein the location information key data structure includes unique identification information for the target network device and unique identifying location information for a network the target network device is currently connected to and the determined current physical location information, and
wherein the location information key data structure includes a database key to a relational database and is usable only by the emergency location application on the emergency location information server;
sending a second location information message including the location information key data structure encrypted with a pre-determined encryption method from the emergency location information application on the emergency location information server network device back to the location application on the target network device via the communications network;
receiving an emergency message on the emergency location application on the emergency location information server network device from the first server network device via the communications network,
wherein the emergency message includes the encrypted location information key data structure sent to the target network device, and
wherein the emergency message was sent to the first server network device via the communications network from the location application on the target network device upon the target network device encountering an emergency event;
decrypting the encrypted location information key data structure from the emergency location application on the emergency location information server network device;
determining the current physical location of the target network device with one or more queries to the relational database with the decrypted location information key and also determining an emergency response server network device with one or more processors to send the emergency message based on the determined current physical location of the target network device;
determining from the emergency location application on the emergency location information server network device, additional location information for the target network device from one or more other public location information sources via the communications network using the determined current physical location of the target network device as a search key for searching the one or more other public location information sources,
wherein the additional location information from the one or more public location information sources includes:

online mapping site information, cellular telephone tower information, Bluetooth protocol wireless beacon information, Wireless Fidelity (Wi-Fi) wireless beacon information, Radio Frequency Identifier (RFID) information, Internet of Things (IoT) device sensor information, IoT actuator information, Near field communication (NFC) protocol information or machine-to-machine (M2M) communications information, and wherein the online mapping site information includes: APPLE map location information, BING map location information, GOOGLE map location information, MAPQUEST map location information, ROADTRIPPERS, map location information, TERRASERVERS-USA map location information, HERE map location information, aviation flight tracker map location information, marine vessel locator map location information, UNITED STATES GEOGLOGICAL SURVEY (USGS) NATIONAL map location information, NATIONAL OCEANIC ATMOSPHERIC ADMINISTRATION (NOAA) map location information or GEOGRAPHIC INFORMATION SYSTEM (GIS) map location information;

adding from the emergency location application on the emergency location information server network device, the determined current physical location of the network device and the determined additional location information to the emergency message providing additional information to locate the target network device;

sending in real-time the emergency message from the emergency location application on the emergency location information server network device to the determined emergency response server network device via the communications network, wherein the emergency message is sent from the emergency location application on the emergency location information server network device to the determined emergency response server network device via the communications network without the encrypted location information key data structure; and notifying in real-time from the emergency location application on the emergency location information server network device via the communications network the determined emergency response server network device that an emergency event has occurred with the target network device.

26. A method for locating a network device in an emergency situation, comprising:

receiving a first location information message on an emergency location application on an emergency location information server network device with one or more processors from a first server network device with one or more processors via a communications network, wherein the first location message includes private location information determined with a location application on a target network device and one or more processors that moved from a first physical location to a second physical location;

determining from the emergency location application on the emergency location information server network device a current physical location for the target network device at the second physical location with the private location information provided by the target network device;

creating from the emergency location application on the emergency location information server network device a location information key data structure for the target network device, wherein the location information key data structure includes unique identification information for the target network device and unique identifying location information for a network the target network device is currently connected to and the determined current physical location information, and wherein the location information key data structure includes a database key to a relational database and is usable only by the emergency location application on the emergency location information server;

sending a second location information message including the location information key data structure encrypted with a pre-determined encryption method from the emergency location information application on the emergency location information server network device back to the location application on the target network device via the communications network;

receiving an emergency message on the emergency location application on the emergency location information server network device from the first server network device via the communications network, wherein the emergency message includes the encrypted location information key data structure sent to the target network device, and wherein the emergency message was sent to the first server network device via the communications network from the location application on the target network device upon the target network device encountering an emergency event;

decrypting the encrypted location information key data structure from the emergency location application on the emergency location information server network device;

determining the current physical location of the target network device with one or more queries to the relational database with the decrypted location information key and also determining an emergency response server network device with one or more processors to send the emergency message based on the determined current physical location of the target network device;

determining from the emergency location application on the emergency location information server network device, additional location information for the target network device from one or more other public location information sources via the communications network using the determined current physical location of the target network device as a search key for searching the one or more other public location information sources;

adding from the emergency location application on the emergency location information server network device, the determined current physical location of the network device and the determined additional location information to the emergency message providing additional information to locate the target network device;

sending in real-time the emergency message from the emergency location application on the emergency location information server network device to the determined emergency response server network device via the communications network, wherein the emergency message is sent from the emergency location application on the emergency location information server network device to the determined emergency response server network device via the communications network without the encrypted location information key data structure;

notifying in real-time from the emergency location application on the emergency location information server network device via the communications network the determined emergency response server network device that an emergency event has occurred with the target network device;

sending a confirmation request message in real-time from the emergency location information application on the emergency location information server network device via the communications network to the location application on the target network device, wherein the confirmation request message includes the determined current physical location of the target network device determined with the one or more queries to the relational database with the decrypted location information key, and wherein the confirmation message includes a confirmation request for the target network device to immediately accept, reject or modify the determined current physical location for the emergency event that has occurred with the target network device; and receiving a confirmation response message in real-time on the emergency location information application on the emergency location information server network device via the communications network from the location application on the target network device accepting, rejecting or modifying the determined current physical location of the target network device for the emergency event that has occurred with the target network device, wherein the location application on the target network device automatically accepts, rejects or modifies the determined current physical location of the target network device.

\* \* \* \* \*